(12) United States Patent
Williams et al.

(10) Patent No.: US 7,532,798 B2
(45) Date of Patent: May 12, 2009

(54) OPTICAL WAVEGUIDE

(75) Inventors: David Philip Williams, Bath (GB);
Timothy Adam Birks, Bath (GB);
Philip St. John Russell, Bath (GB);
Peter John Roberts, Bath (GB);
Hendrik Sabert, Stelle (DE);
Alexander Onischenko, Surrey (GB)

(73) Assignee: Crystal Fibre A/S, Birkerod (DK)

( * ) Notice: Subject to any disclaimer, the term of this patent is extended or adjusted under 35 U.S.C. 154(b) by 0 days.

(21) Appl. No.: 11/934,231

(22) Filed: Nov. 2, 2007

(65) Prior Publication Data

US 2008/0138023 A1    Jun. 12, 2008

Related U.S. Application Data

(63) Continuation of application No. 11/155,648, filed on Jun. 20, 2005, now Pat. No. 7,321,712, which is a continuation-in-part of application No. PCT/GB2004/001288, filed on Mar. 22, 2004, and a continuation-in-part of application No. PCT/GB2003/005591, filed on Dec. 22, 2003.

(30) Foreign Application Priority Data

| Dec. 20, 2002 | (GB) | ................................. 0229826.3 |
| Feb. 5, 2003 | (GB) | ................................. 0302632.5 |
| Mar. 21, 2003 | (GB) | ................................. 0306593.5 |
| Mar. 21, 2003 | (GB) | ................................. 0306606.5 |
| Jun. 20, 2003 | (GB) | ................................. 0314485.4 |
| Sep. 19, 2003 | (GB) | ................................. 0321991.2 |
| Sep. 19, 2003 | (GB) | ................................. 0322024.1 |
| Jun. 21, 2004 | (GB) | ................................. 0413843.4 |

(51) Int. Cl.
*G02B 6/02* (2006.01)
*G02B 6/00* (2006.01)

(52) U.S. Cl. ....................... 385/125; 385/122; 385/123; 385/146

(58) Field of Classification Search .................. 385/125
See application file for complete search history.

(56) References Cited

U.S. PATENT DOCUMENTS 6,404,966 B1    6/2002    Kawanishi et al.

(Continued)

FOREIGN PATENT DOCUMENTS

DE            44 11 330 A1       9/1995

(Continued)

OTHER PUBLICATIONS

Great Britain Search Report dated Feb. 19, 2003.

(Continued)

*Primary Examiner*—Frank G Font
*Assistant Examiner*—Ryan Lepisto
(74) *Attorney, Agent, or Firm*—Buchanan Ingersoll & Rooney PC

(57) ABSTRACT

An elongate waveguide for guiding light including a core having an elongate region of relatively low refractive index; a microstructured region around the core comprising elongate regions of relatively low refractive index interspersed with elongate regions of relatively high refractive index; and a boundary at the interface between the core and the microstructured region, the boundary including, in the transverse cross-section, a region of relatively high refractive index, which is connected to the microstructured region at a plurality of nodes, and at least one relatively enlarged region around the boundary, the enlarged region having a major dimension and a minor dimension, wherein the length of the major dimension divided by the length of the minor dimension is more than 3.0.

24 Claims, 48 Drawing Sheets

U.S. PATENT DOCUMENTS

| | | |
|---|---|---|
| 6,418,258 B1 | 7/2002 | Wang |
| 6,444,133 B1 | 9/2002 | Fajardo et al. |
| 6,778,749 B2 * | 8/2004 | Allan et al. ............ 385/125 |
| 2002/0136516 A1 | 9/2002 | Allan et al. |

FOREIGN PATENT DOCUMENTS

| | | |
|---|---|---|
| WO | 99/64903 A1 | 12/1999 |
| WO | 00/22466 A1 | 4/2000 |
| WO | 00/49436 A1 | 8/2000 |
| WO | 01/88578 A2 | 11/2001 |
| WO | 02/16980 A1 | 2/2002 |
| WO | 02/16983 A1 | 2/2002 |
| WO | 02/41050 A2 | 5/2002 |
| WO | 02/072489 A2 | 9/2002 |
| WO | 02/075392 A2 | 9/2002 |
| WO | 00/60388 A1 | 10/2002 |
| WO | 02/084347 A2 | 10/2002 |
| WO | 02/088801 A2 | 11/2002 |

OTHER PUBLICATIONS

Great Britain Search Report dated Apr. 8, 2003.
Great Britain Search Report dated Jul. 28, 2003.
Great Britain Search Report dated Apr. 10, 2003.
Great Britain Search Report dated Jan. 28, 2004.
Great Britain Search Report dated Oct. 12, 2004.
T.A.Birks et al., "Full 2-D photonic bandgaps in silica/air structures", Electronics Letters, Oct. 26, 1995, vol. 31., No. 22, pp. 1941-1942.
Jes Broeng et al., "Analysis of air-guiding photonic bandgap fibers", Optics Letters, vol. 25, No. 2, Jan. 15, 2000.
Douglas C. Allan et al., "Photonic Crystal Fibers: Effective Index and Band-Gap Guidance", from the book "Photonic Crystal and Light Localization in the 21st Century", C.M. Soukoulis (ed.), © 2001 Kluwer Academic Publishers, pp. 305-320.
John D. Joannopoulos et al., "Photonic Crystals: Molding the Flow of Light", Princeton University Press, ISBN 0-691-03744, Chapter 2.
N. Venkataraman et al., "Low Loss (13dB) Air Core Photonic Bandgap Fibre", ECOC 2002, vol. Conf. 28, p. PD11.
Douglas C. Allan et al., "Surface modes and loss in air-core photonic band-gap fibers", Photonic Crystal Materials and Devices, Proceedings of SPIE, vol. 5000, Jan. 28-30, 2003.
N.M. Litchinitser et al., "Antiresonant reflecting photonic crystal optical waveguides", Optics Letters, vol. 27, No. 18, Sep. 15, 2002, pp. 1592-1594.
Smith et al. "Low-loss hollow-core silica/air photonic bandgap fibre", Nature, vol. 424, pp. 657-659, Aug. 7, 2003.
Muller et al., "Interferometric Chromatic Dispersion Measurement of Photonic Band-gap Fiber", Proc. SPIE 2002, vol. 4870, Boston.
West et al., "Photonic Crystal Fibres", Proc. ECOC 2001, paper ThA22, vol. 4, Amsterdam.
Dimitre G. Ouzounov et al., "Dispersion and nonlinear propagation in air-core photonic band-gap fibers", CLEO 2003.
Dirk Muller et al., "Measurement of photonic band-gap fiber transmission from 1.0 to 3.0 µm and impact of surface mode coupling", QTuL2 Proc. CLEO 2003.
B.J. Mangan et al., "Low loss (1.7 dB/km) hollow core photonic bandgap fiber", Post-deadline paper presented at OFC 2004.
J.C. Knight et al., "Photonic band gap guidance in optical fibers", American Association for the Advancement of Science, vol. 282, No. 5393, pp. 1476-1778, 1998.
J.A. West et al., "Photonic band-gap fiber—fiber of the future?", XP010653076, pp. 9-10, 2003.
N.M. Litchinitser et al., "Antiresonant reflecting photonic crystal optical waveguides", Optics Letters, vol. 27, No. 18, Sep. 15, 2002, pp. 1592-1594, p. 1594, right col. Second paragraph.
T.A. Birks et al., "Full 2-D photonics bandgaps in silica/air structures", Electronics Letters, vol. 31, No. 22, Oct. 26, 1995, pp. 1941-1943, penultimate paragraph left col. p. 1942.

* cited by examiner

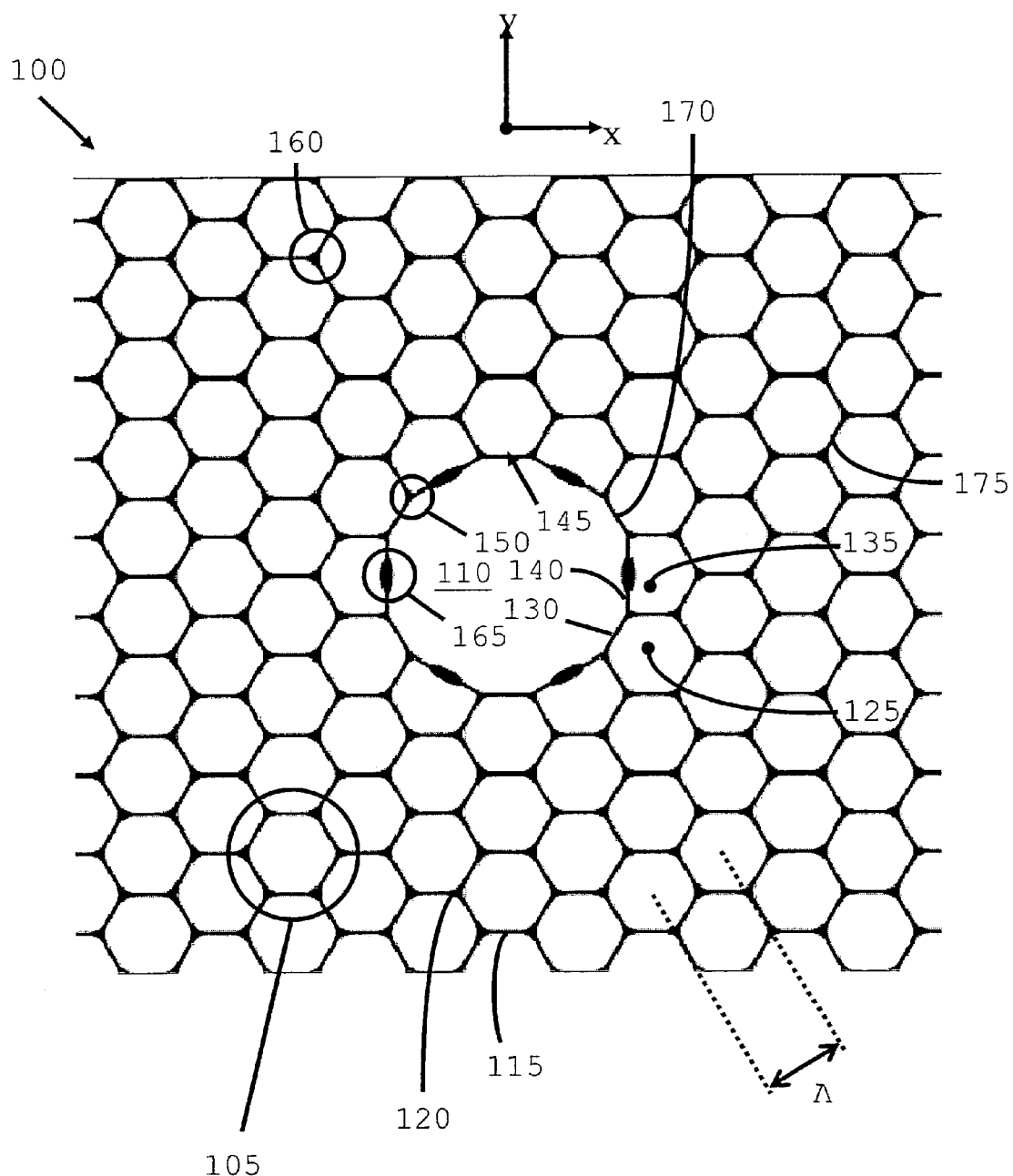
PRIOR ART Figure 1

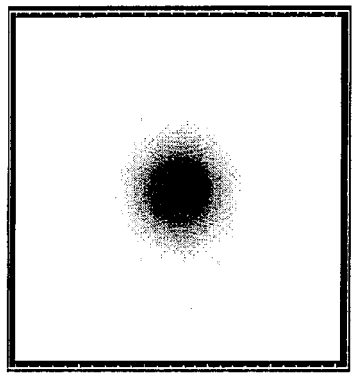
D7-1
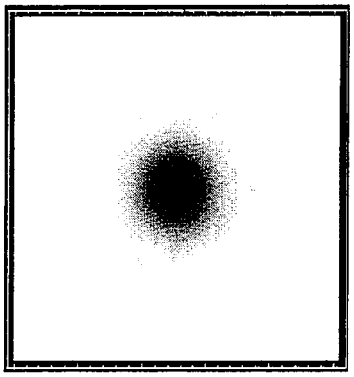
D7-2
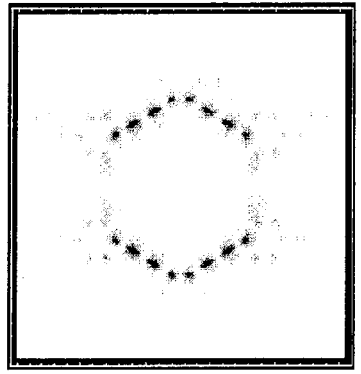
D7-3
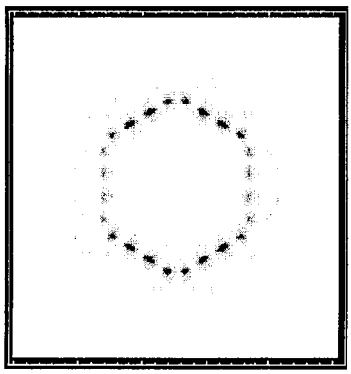
D7-4
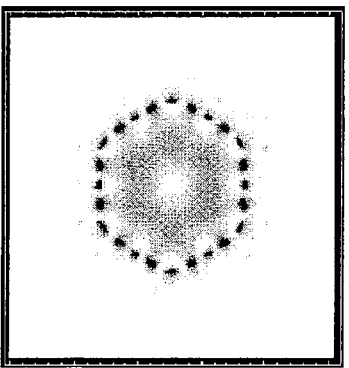
D7-5
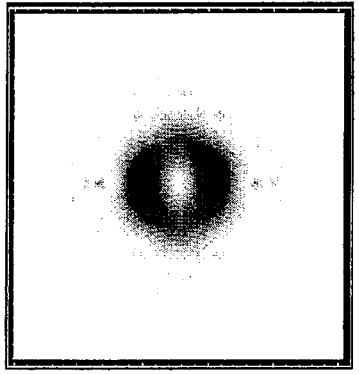
D7-6
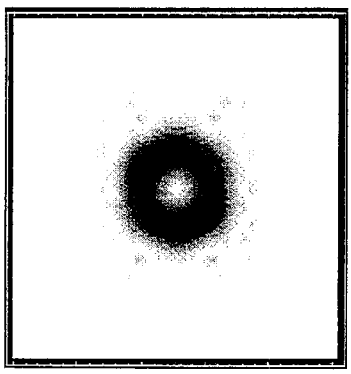
D7-7
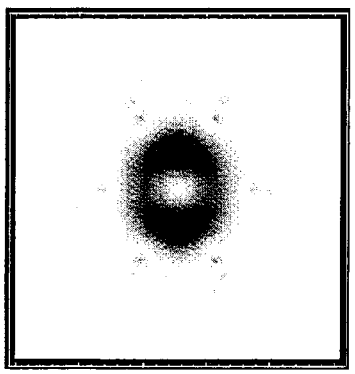
D7-8
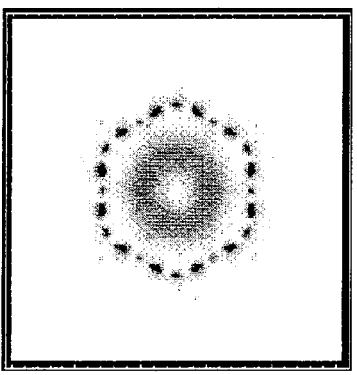
D7-9
*Figure 12*

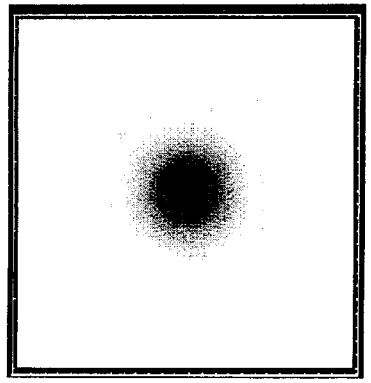
D8-1
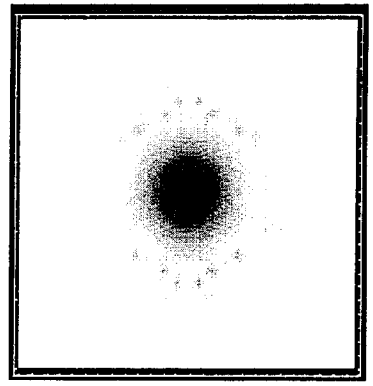
D8-2
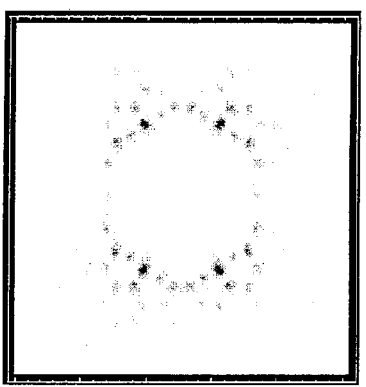
D8-3
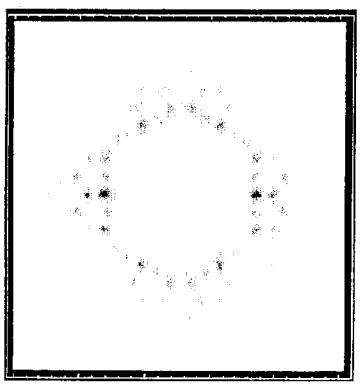
D8-4
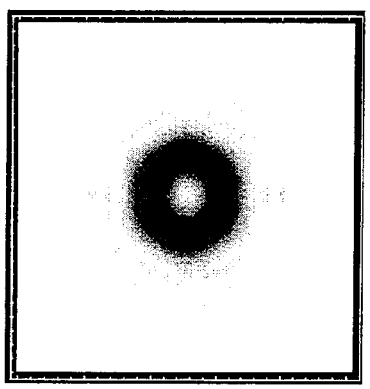
D8-5
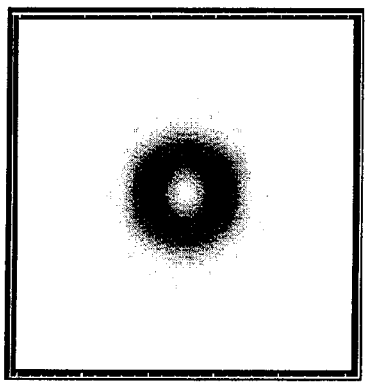
D8-6
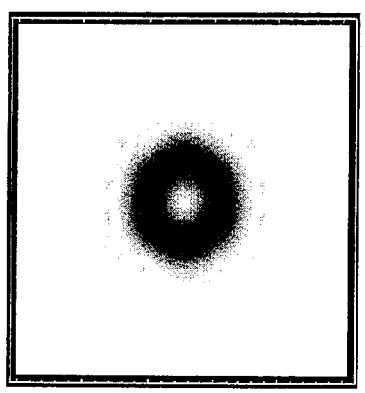
D8-7
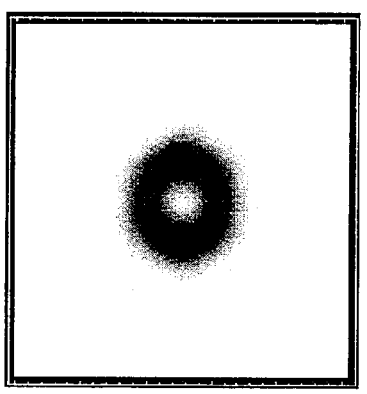
D8-8
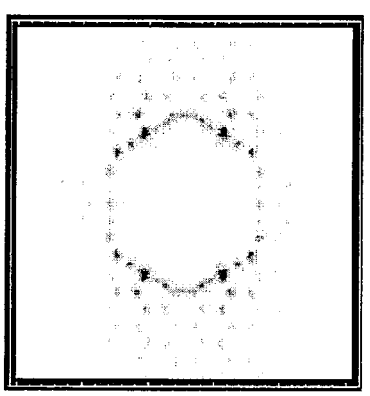
D8-9
*Figure 13*

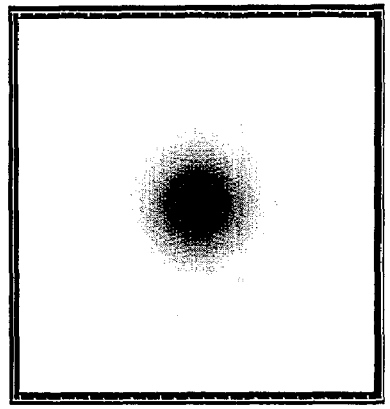
D9-1
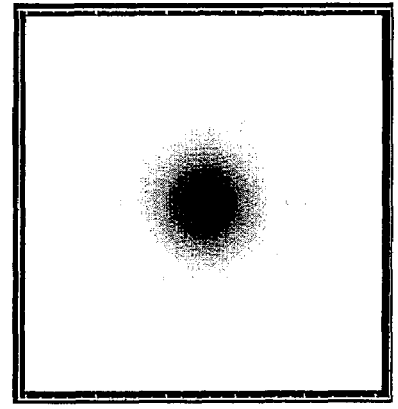
D9-2
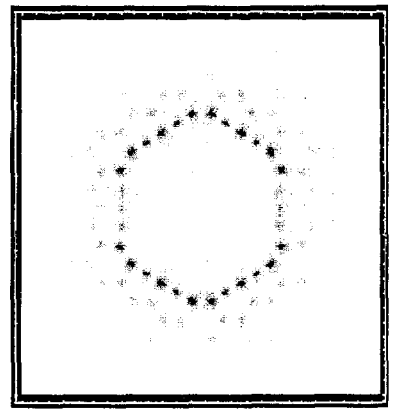
D9-3
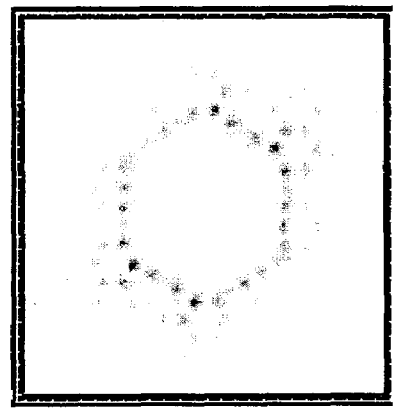
D9-4
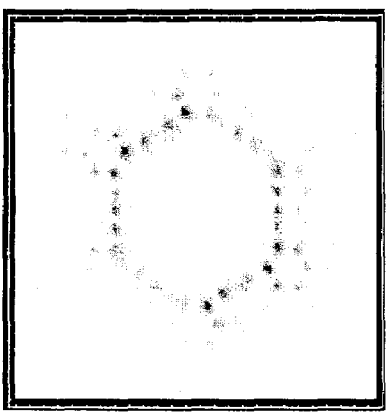
D9-5
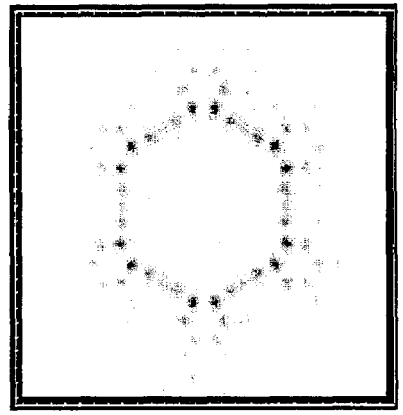
D9-5
*Figure 14*

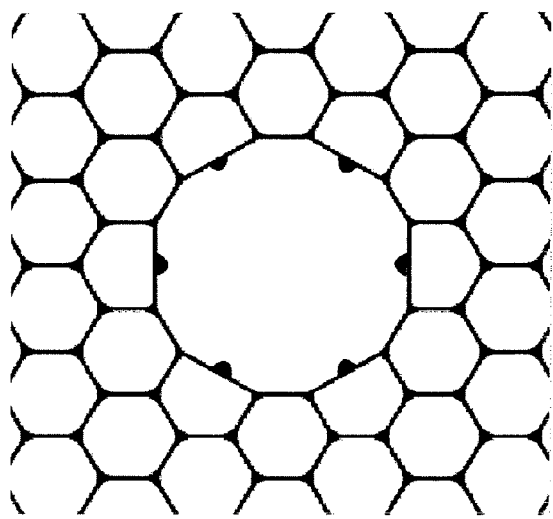 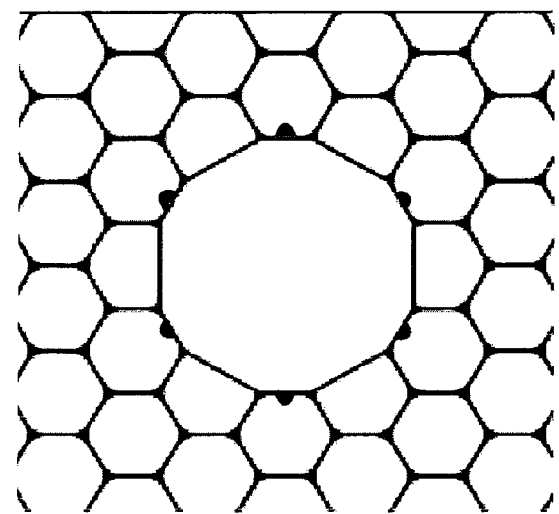
Figure 15a    Figure 15b
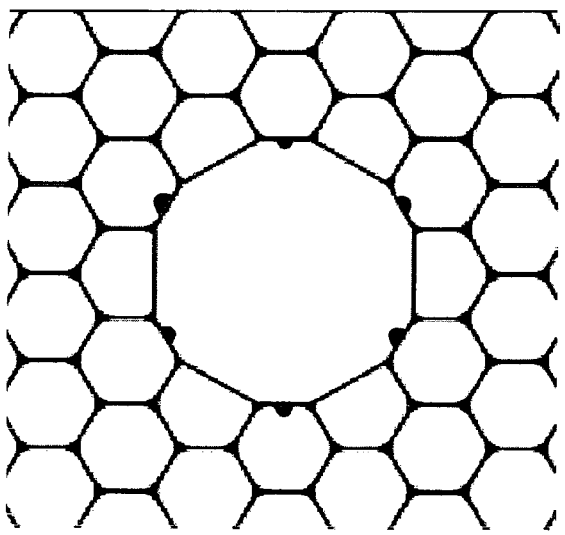 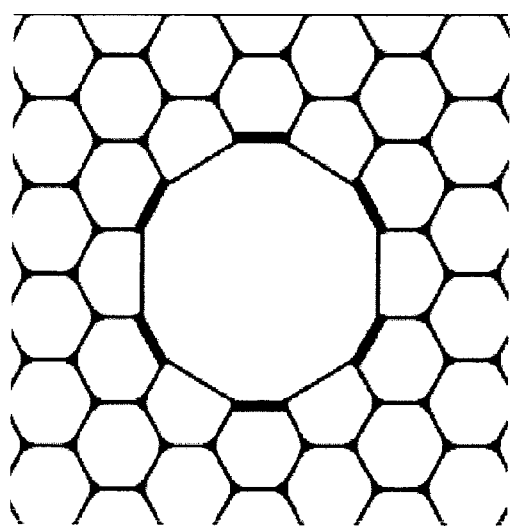
Figure 15c    Figure 15d

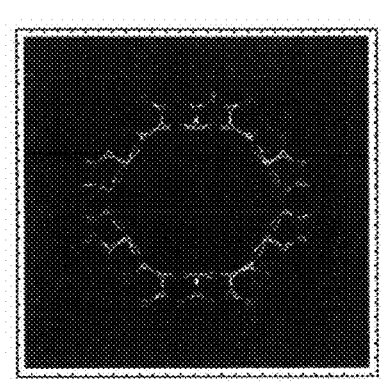
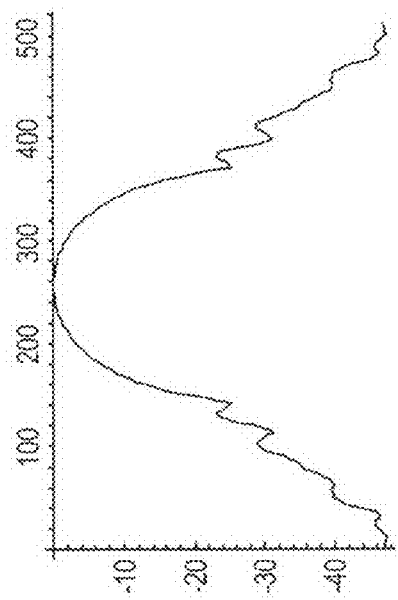
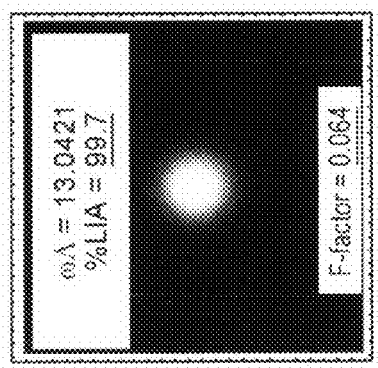
*Figure 43(a)*
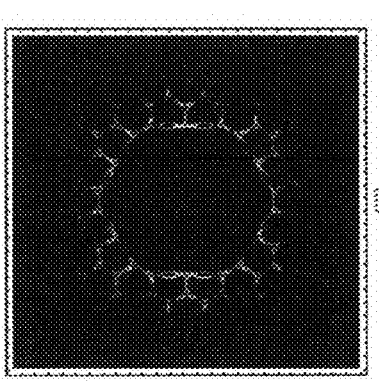
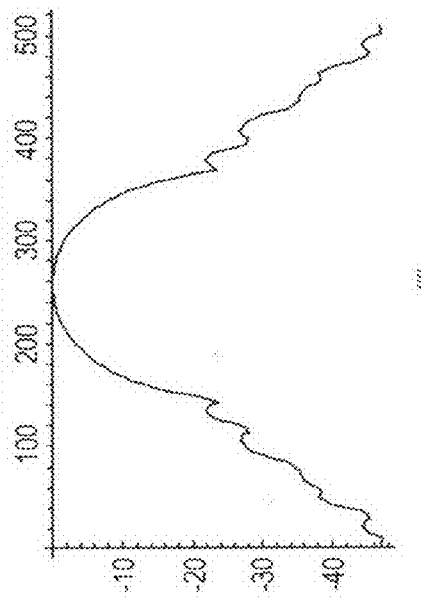
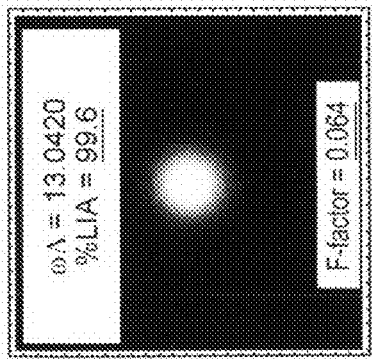
*Figure 43(b)*

OPTICAL WAVEGUIDE

CROSS-REFERENCE TO RELATED APPLICATIONS

The present application is a continuation of U.S. Ser. No. 11/155,648, filed on Jun. 20, 2005, which is a continuation-in-part of PCT-application no. PCT/GB2003/005591 filed on Dec. 22, 2003 and PCT-application no. PCT/GB2004/001288 filed on Mar. 22, 2004, and also claims the priority of GB-0229826.3, GB-0302632.5, GB-0306606.5, GB-0306593.5, GB-0314485.4, GB-0321991.2, GB-0322024.1, and GB-0413843.4, the subject matter of all of the aforementioned applications being incorporated herein in their entirety.

TECHNICAL FIELD

The present invention is in the field of optical waveguides and relates in particular, but not exclusively, to optical waveguides that guide light by virtue of a photonic bandgap.

BACKGROUND ART

Optical fiber waveguides, which are able to guide light by virtue of a so-called photonic bandgap (PBG), were first proposed in 1995.

In, for example, "Full 2-D photonic bandgaps in silica/air structures", Birks et al., Electronics Letters, 26 Oct. 1995, Vol. 31, No. 22, pp. 1941-1942, it was proposed that a PBG may be created in an optical fiber by providing a dielectric cladding structure, which has a refractive index that varies periodically between high and low index regions, and a core defect in the cladding structure in the form of a hollow core. In the proposed cladding structure, periodicity was provided by an array of air holes that extended through a silica glass matrix material to provide a PBG structure through which certain wavelengths and propagation constants of light could not pass. It was proposed that light coupled into the hollow core defect would be unable to escape into the cladding due to the PBG and, thus, the light would remain localized in the core defect.

It was appreciated that light travelling through a hollow core defect, for example filled with air or even under vacuum, would suffer significantly less from undesirable effects, such as non-linearity and loss, compared with light travelling through a solid silica or doped silica fiber core. As such, it was appreciated that a PBG fiber may find application as a transmission fiber to transmit light over extremely long distances, for example across the Atlantic Ocean, without undergoing signal regeneration, or as a high optical power delivery waveguide. In contrast, for standard index-guiding, single mode optical fiber, signal regeneration is typically required approximately every 80 kilometers.

The first hollow core PBG fibers that were attempted by the inventors had a periodic cladding structure formed by a triangular array of circular air holes embedded in a solid silica matrix and surrounding a central air core defect. Such fibers were formed by stacking circular or hexagonal capillary tubes, incorporating a core defect into the cladding by omitting a central capillary of the stack, and then heating and drawing the stack, in a one or two step process, to form a fiber having the required structure. The first fibers made by this process had a core defect formed by the omission of a single capillary from the center of the cladding structure.

U.S. Pat. No. 6,404,966 describes what is stated therein to be a PBG fiber having a hollow core region, which has an area of several times the optical wavelength, and a PBG cladding having a pitch equal to half the optical wavelength. The suggested advantage of the fiber is that it exhibits single mode behaviour.

International patent application PCT/GB00/01249 (The Secretary of State for Defence, UK), filed on 21 Mar. 2000, proposed the first PBG fiber to have a so-called seven-cell core defect, surrounded by a cladding comprising a triangular array of air holes embedded in an all-silica matrix. The core defect was formed by omitting an inner capillary and, in addition, the six capillaries surrounding the inner capillary. This fiber structure appeared to guide one or two modes in the core defect, in contrast to the previous, single-cell core defect fiber, which appeared not to support any guided modes in the core defect.

According to PCT/GB00/01249, it appeared that the single-cell core defect fiber, by analogy to the density-of-states calculations in solid-state physics, would only support approximately 0.23 modes. That is, it was not surprising that the single-cell core defect fiber appeared to support no guided modes in its core defect. In contrast, based on the seven-fold increase in core defect area (increasing the core defect radius by a factor of $\sqrt{7}$), the seven-cell core defect fiber was predicted to support approximately 1.61 spatial modes in the core defect. This prediction was consistent with the finding that the seven-cell core defect fiber did indeed appear to support at least one guided mode in its core defect.

A preferred fiber in PCT/GB00/01249 was described as having a core defect diameter of around 15 μm and an air-filling fraction (AFF)—that is, the proportion by volume of air in the cladding—of greater than 15% and, preferably, greater than 30%. Herein, AFF (or any equivalent measure for air or vacuum or other materials) is intended to mean the fraction by volume of air in a microstructured, or holey, portion of the cladding, which is representative of a substantially perfect and unbounded cladding. That is, imperfect regions of the cladding, for example near to or abutting a core defect and at an outer periphery of a microstructured region, would not be used in calculating the AFF. Likewise, a calculation of AFF does not take into account over-cladding or jacketing layers, which may surround the microstructured region.

In "Analysis of air-guiding photonic bandgap fibers", Optics Letters, Vol. 25, No. 2, Jan. 15, 2000, Broeng et al. provided a theoretical analysis of PBG fibers. For a fiber with a seven-cell core defect and a cladding comprising a triangular array of near-circular holes, providing an AFF of around 70%, the structure was shown to support one or two air guided modes in the core defect. This agreed with the finding in PCT/GB00/01249.

In the book chapter entitled "Photonic Crystal Fibers: Effective Index and Band-Gap Guidance" from the book "Photonic Crystal and Light Localization in the 21$^{st}$ Century", C. M. Soukoulis (ed.), ©2001 Kluwer Academic Publishers, the authors presented further analysis of PBG fibers based primarily on a seven-cell core defect fiber. The optical fiber was fabricated by stacking and drawing hexagonal silica capillary tubes. The authors suggested that a core defect must be large enough to support at least one guided mode but that, as in conventional fibers, increasing the core defect size would lead to the appearance of higher order modes. This statement appears to contradict the position presented in the aforementioned U.S. Pat. No. 6,404,966, which prescribes a large core region and single mode behaviour. The authors of the chapter also went on to suggest that there are many parameters that can have a considerable influence on the performance of bandgap fibers: choice of cladding lattice, lattice spacing, index filling fraction, choice of materials, size and shape of core defect, and structural uniformity (both in-plane and along the axis of propagation).

WO 02/075392 (Corning, Inc.) identifies a general relationship in PBG fibers between the number of so-called surface modes that exist at the boundary between the cladding and core defect of a PBG fiber and the ratio of the radial size of the core defect and a pitch of the cladding structure, where pitch is the center to center spacing of nearest neighbor holes in the triangular array of the exemplified cladding structure. It is suggested that when the core defect boundary, together with the photonic bandgap crystal pitch, are such that surface modes are excited or supported, a large fraction of the "light power" propagated along the fiber is essentially not located in the core defect. Accordingly, while surface states exist, the suggestion was that the distribution of light power is not effective to realize the benefits associated with the low refractive index core defect of a PBG crystal optical waveguide. The mode energy fraction in the core defect of the PBG fiber was shown to vary with increasing ratio of core defect size to pitch. In other words, it was suggested that the way to increase mode energy fraction in the core defect is by decreasing the number of surface modes, in turn, by selecting an appropriate ratio of the radial size of the core defect and a pitch of the cladding structure. In particular, WO 02/075392 states that, for a circular core structure, a ratio of core radius to pitch of around 1.07 to 1.08 provides a high mode power fraction of not less than 0.9 and is single mode. Other structures are considered, for example in FIG. 7 (of WO 02/075392), wherein the core defect covers an area equivalent to 16 cladding holes.

The reason why varying the ratio of the radial size of the core defect and a pitch of the cladding structure affects the nature of the surface modes supported by a PBG fiber can be explained with reference to the book "Photonic Crystals: Molding the Flow of Light", Joannopoulos et al., Princeton University Press, ISBN 0-691-03744. The text describes in detail the nature of surface modes and, in particular, the reasons why they form at an interface between a PBG structure and a defect (or other termination of the PBG structure). In brief, surface modes occur when there are electromagnetic modes near the surface, but they are not permitted to extend into the PBG crystal at the respective frequency due to the PBG. The book goes on to describe that the characteristics, and indeed the presence at all, of the surface modes can be tuned by varying the termination position of the PBG structure. For example, a PBG structure that terminates by cutting through air holes has different surface mode characteristics than the same PBG structure that terminates by cutting through only solid material around holes. WO 02/075392 is consistent with this since varying the core defect size of a PBG fiber naturally varies the termination position of the PBG structure.

In a Post-deadline paper presented at ECOC 2002, "Low Loss (13 dB) Air core defect Photonic Bandgap Fiber", N. Venkataraman et al. reported a PBG fiber having a seven-cell core defect that exhibited loss as low as 13 dB/km at 1500 nm over a fiber length of one hundred meters. The structure of this fiber closely matches the structure considered in the aforementioned book chapter. The authors attribute the relatively small loss of the fiber as being due to the high degree of structural uniformity along the length of the fiber.

The present applicant's post-deadline paper presented at OFC 2004, "Low loss (1.7 dB/km) hollow core photonic bandgap fiber", Mangan et al, reported the lowest ever reported loss for a PBG fiber, which had a nineteen cell core defect and exhibited loss below 2 dB/km at 1565 nm, and goes on to propose that scaling the fiber to operate at a longer wavelength should reduce loss even further. In conventional state-of-the-art solid silica fibers, attenuation is dominated by Rayleigh scattering and multi-phonon absorption at short and long wavelengths, respectively, resulting in an attenuation minimum at around 1550 nm. In hollow-core PBG fibers most of the light does not travel in glass, and therefore the effects of Rayleigh scattering and multi-phonon absorption in the bulk material are significantly reduced, while the internal surfaces of the fiber become a potentially much more important contributor to loss. Theoretical considerations indicate that the attenuation due to mode coupling and scattering at the internal air/glass interfaces, which dominate the loss in the fiber reported, should scale with the wavelength $\lambda$ as $\lambda$-3. This was confirmed by the empirical data showing the minimum loss of hollow-core PBG fibers designed for various operating wavelengths in a wavelength range where IR absorption is negligible. It is likely that silica hollow-core PBG fibers will achieve their lowest loss somewhere in the 1800-2000 nm wavelength range, well beyond the wavelength at which bulk silica assumes its minimum loss.

An alternative kind of PBG fiber, which does not have a cladding comprising a lattice of high and low refractive index regions, is described in WO00/22466. These PBG fibers typically comprise, in a transverse cross section, concentric, increasingly large, annuli of varying high and low refractive index material, which create an omni-directional reflector capable of confining light to a core region of the fiber.

PBG fiber structures are typically fabricated by first forming a pre-form and then heating and drawing an optical fiber from that pre-form in a fiber-drawing tower. It is known either to form a pre-form by stacking capillaries and fusing the capillaries into the appropriate configuration of pre-form, or to use extrusion.

For example, in PCT/GB00/01249, identified above, a seven-cell core defect pre-form structure was formed by omitting from a stack of capillaries an inner capillary and, in addition, the six capillaries surrounding the inner capillary. The capillaries around the core defect boundary in the stack were supported during formation of the pre-form by inserting truncated capillaries, which did not meet in the middle of the stack, at both ends of the capillary stack. The stack was then heated in order to fuse the capillaries together into a pre-form suitable for drawing into an optical fiber. Clearly, only the fiber drawn from the central portion of the stack, with the missing inner seven capillaries, was suitable for use as a hollow core defect fiber.

U.S. Pat. No. 6,444,133 (Corning, Inc.), describes a technique of forming a PBG fiber pre-form comprising a stack of hexagonal capillaries in which the inner capillary is missing, thus forming a core defect of the eventual PBG fiber structure that has flat inner surfaces. In contrast, the holes in the capillaries are round. U.S. Pat. No. 6,444,133 proposes that, by etching the entire pre-form, the flat surfaces of the core defect dissolve away more quickly than the curved surfaces of the outer capillaries. The effect of etching is that the edges of the capillaries that are next to the void fully dissolve, while the remaining capillaries simply experience an increase in hole-diameter. Overall, the resulting pre-form has a greater fraction of air in the cladding structure and a core defect that is closer to a seven-cell core defect than a single cell core defect.

PCT patent application number WO 02/084347 (Corning, Inc.) describes a method of making a pre-form comprising a stack of hexagonal capillaries of which the inner capillaries are preferentially etched by exposure to an etching agent. Each capillary has a hexagonal outer boundary and a circular inner boundary. The result of the etching step is that the centers of the edges of the hexagonal capillaries around the central region dissolve more quickly than the corners, thereby causing formation of a core defect. In some embodiments, the circular holes are offset in the inner hexagonal capillaries of the stack so that each capillary has a wall that is thinner than its opposite wall. These capillaries are arranged in the stack so that their thinner walls point towards the center of the structure. An etching step, in effect, preferentially etches the thinner walls first, thereby forming a seven-cell core defect.

OBJECTS AND SUMMARY

The present invention deals with optical fiber waveguides that guide light by virtue of a so-called photonic bandgap (PBG).

The optical fiber waveguides comprise a low index core (typically a hollow core) that is surrounded by a microstructured region. Between the core and the microstructured region, the optical fiber waveguides comprise a boundary region of high-index material.

The present invention provides improved designs of the boundary region to reduce the total attenuation in low-index core fiber waveguides.

In at least one embodiment, the improved designs are achieved by tailored enlargements in the boundary region, where the tailored enlargements provide anti-resonance effects that reduce the overlap of one or more guided modes with the boundary region itself.

The anti-resonance effects result in a full or part exclusion of light from the boundary region, such that a large fraction of the guided light becomes located in the low index regions of the fiber waveguide.

Hence, light guided in a fiber waveguide with an improved design of the boundary region according to an embodiment of the present invention has a reduced overlap with surfaces (side-walls) of the boundary region. This reduced overlap directly reduces surface scattering of light (which is one of the most important loss mechanism)—and thereby provides reduced total attenuation in the fiber waveguides.

In arriving at embodiments of the present invention, the inventors have demonstrated that, while the size of a core defect is significant in determining certain characteristics of a PBG waveguide, the form of a boundary at the interface between core and cladding also plays a significant role in determining certain characteristics of the waveguide. As will be described in detail hereafter, the inventors have determined that, for given PBG core and cladding structures, variations in only the form of the boundary can cause significant changes in the characteristics of a respective waveguide.

According to a first embodiment, the present invention provides an elongate waveguide for guiding light comprising:

a core, comprising an elongate region of relatively low refractive index;

a microstructured region around the core comprising elongate regions of relatively low refractive index interspersed with elongate regions of relatively high refractive index; and a boundary at the interface between the core and the microstructured region, the boundary comprising, in the transverse cross-section, a region of relatively high refractive index, which is connected to the microstructured region at a plurality of nodes, characterized by at least one relatively enlarged region around the boundary (and excluding a boundary having twelve nodes and six enlarged regions substantially at a mid-point between six pairs of relatively more-widely-spaced apart neighboring nodes).

Alternatively, the boundary should fulfill at least one of the conditions selected from the group consisting of a) the boundary has twelve nodes and at least one enlarged region substantially at a mid-point between a pair of relatively less-widely-spaced apart neighboring nodes, or b) the boundary has less than six enlarged regions substantially at a mid-point between six pairs of relatively more-widely-spaced apart neighboring nodes or more than six enlarged regions substantially at a mid-point between six pairs of relatively more-widely-spaced apart neighboring nodes, and c) the boundary has less than twelve nodes or more than twelve nodes.

Or, in another alternative, if the boundary has precisely twelve nodes and six enlarged regions substantially at a mid-point between six pairs of relatively more-widely-spaced apart neighbouring nodes, the boundary comprises at least one additional enlarged region.

As used herein, the term "relatively enlarged region" may have various different meanings depending upon the particular form of the boundary. For example, a relatively enlarged region may mean a bead-like formation or a locally thicker region along a relatively thinner boundary. A bead-like formation may be substantially oval in shape and have its major axis oriented radially or azimuthally with respect to the center of the waveguide structure. Alternatively, a relatively enlarged region may mean a nodule, outcrop, lump or projection, on either an inner or outer periphery of the boundary. Alternatively, a relatively enlarged region may mean a relatively thicker region around the boundary. Embodiments of the present invention apply one or more of these kinds of features, as will be described hereinafter.

The boundary region is a continuous shell of relatively high refractive index in that it does not comprise regions of relatively low refractive index: all relatively-high-index regions in the boundary are connected to each other only by relatively-high-index regions. The core is taken to be contiguous with the boundary region. The core thus comprises all connected regions of relatively low refractive index that are surrounded by the boundary region. The boundary region may be not smooth: it may for example be corrugated, with indented regions (for example, formed by omitting every other vein from an innermost polygon of the cladding, such as what would, if all veins were present, be an hexagon defining an hexagonal core), or it may have one two or more struts that project towards the center of the core (which struts may be of uniform thickness or may have nodules at some point along their length, for example at their ends). Thus, the core need not be of a regular cross section but may, for example, have projections and indentations defined by the boundary region.

Thus the boundary region may be corrugated with 2, 3, 4, 5, 6, 7, 8, 9, 10 or more recesses or indentations, which may be arranged at regular intervals around the center of the core.

The present invention differs from the PBG fiber structure described in the aforementioned book chapter. That particular structure, which is illustrated in FIG. 1 in the accompanying drawings, and which is attributed with having attained the aforementioned 13 dB/km loss figure, has been discussed in numerous papers and articles since 2001. Similar to the disclosed structure, the structure of an embodiment of the present invention has bead-like formations 165 along consecutive longer sides 140 of the boundary 145 around the core region 110. The beadlike formations are merely an artefact and natural consequence of using hexagonal cross section capillaries, or the process used to make the fiber, as described in further detail hereinafter with reference to FIG. 1. Even relatively recently, a similar PBG fiber structure has been considered in detail in "Surface modes and loss in air-core photonic band-gap fibers", Allan et al., Photonic Crystal Materials and Devices, Proceedings of SPIE, Volume 5000, 28-30 Jan. 2003. In that paper, the authors provided a study of the fiber structure and attributed a certain amount of loss in the fiber as being due to mode coupling of light from core modes to so-called 'surface modes', which exist around the core boundary. The present inventors have discovered that, according to embodiments of the present invention, it is possible to use similar bead-like formations, among many other configurations of core boundary, to tune the modal properties of a given PBG fiber. In some cases, it is believed that embodiments of the present invention may be used to mitigate the deleterious effects of the aforementioned mode coupling by detuning the surface modes, either by removing them or shifting them further from the core modes.

Considering, for example, an air-core and silica PBG fiber, the inventors have determined that the geometry of the region of the boundary between the air core and the photonic band-gap cladding structure has profound effects on the modal properties of the fiber. In particular, the inventors have appreciated that the number of guiding modes within the band gap, the relative position of those guided modes in the modal spectrum, the fraction of the light power of the guided modes confined within the air core and the field intensity of these modes at the air-silica interfaces all vary sensitively with the geometry within the region. In particular, the inventors have shown that by tailoring the geometry, the properties of an $LP_{01}$-like mode (when present), which possesses an approximately Gaussian intensity profile towards the center of the core, can be tailored so that up to and even over 99% of the light is confined within air, and predominantly in the core. This implies that loss due to Rayleigh scattering in the silica may be suppressed by up to two orders of magnitude and that nonlinearity may be substantially reduced compared with standard index guiding single mode fiber. Also, the inventors have demonstrated that the core boundary geometry can be designed to reduce the field intensity of this mode strongly in the vicinity of the air-silica interfaces. This has the effect of reducing both the small scale interface roughness scattering, which is discussed in detail hereafter, and the mode coupling due to longer range fiber variations.

In an embodiment, the boundary region has a shape such that, in use, light guided by the waveguide is guided in a transverse mode in which, in the transverse cross-section, more than 95% of the guided light is in the regions of relatively low refractive index in the waveguide.

According to embodiments of the invention that are described hereinafter, there are plural enlarged regions around the boundary. The, or at least one, enlarged region may be positioned between neighboring nodes.

There may in some embodiments be six enlarged regions around the boundary, or there may be more than six enlarged regions around the boundary. For example, there may be twelve or more enlarged regions around the boundary.

In some embodiments, the core boundary may comprise eighteen nodes. There may be enlarged regions between six or more pairs of neighboring nodes. For example, the boundary may have enlarged regions between twelve pairs of neighboring nodes.

In some examples, there is only one enlarged region between any pair of neighboring nodes. In other examples, there are plural enlarged regions between at least one pair of neighboring nodes. The plural enlarged regions may be substantially equi-spaced around the boundary. Indeed, there may be plural groups of two or more enlarged regions and the groups may be substantially equi-spaced around the boundary.

In other embodiments, the enlarged regions may not be equally spaced around the boundary and the boundary, may have no rotational symmetry as such, or a reduced rotational symmetry compared with the characteristic rotational symmetry of the photonic band-gap structure. In this way, the overall structure may be rendered birefringent, for example if the enlarged regions are arranged to render the boundary two fold (or less) rotationally symmetric.

According to some embodiments, the nodes around the boundary are connected by relatively high refractive index veins. Then, a plurality of enlarged regions may be positioned along veins and spaced apart from any nodes.

The boundary region may comprise a nodule. The boundary region may comprise 2, 3, 4, 5, 6, 7, 8, 9 or more nodules, which may be arranged at regular intervals around the center of the core. The nodules may be arranged at the centers of veins, where each vein extends between two nodes.

Alternatively, the nodules may be arranged off-center on such a vein.

In another form, an enlarged region comprises a relatively thick vein, compared to the thickness of at least one other vein, extending between a pair of neighboring nodes.

In yet another form the boundary may comprise at least one ridged region, characterised by plural enlarged regions in relatively close proximity. There may be plural ridged regions around the boundary. Indeed, a significant portion of the boundary may be ridged. In the limit, substantially the entire boundary may be ridged. The ridges may be on one or both peripheries of the boundary.

In some embodiments, at least one enlarged region is located on an outer periphery of the boundary. The enlarged region may resemble an outcrop or projection. In addition, or alternatively, at least one enlarged region may be located on an inner periphery of the boundary. In some cases, there may be is at least one enlarged region on both the inner and outer peripheries of the boundary.

The microstructured region, in the plane cross section, may comprise a substantially periodic array of relatively low refractive index regions, being separated from one another by relatively high refractive index regions, the array having a characteristic primitive unit cell and a pitch Λ. For example, the microstructured region may comprise a substantially periodic, triangular array of relatively low refractive index regions. A primitive unit cell is a unit cell of the structure, having a smallest area (in the transverse cross section) that, by vector translations, can tile and reproduce the entire structure without overlapping itself or leaving voids. The pitch Λ is the minimum translation distance between two neighboring primitive unit cells.

In some embodiments, the core is a seven cell defect (that is, it has a form that would result from omission or removal of relatively high refractive index regions from a first primitive unit cell and the six primitive unit cells that surround the first primitive unit cell of a triangular array of unit cells.

Alternatively, the core is a nineteen cell core defect (that is, it has a form that would result from omission or removal of relatively high refractive index regions from a first primitive unit cell, the six primitive unit cells that surround the first primitive unit cell and the twelve primitive unit cells that surround said six primitive unit cells, in a triangular array of unit cells.

Hitherto, the prior art teachings relating to PBG fibers have focused on a core defect that is just large enough to support a single mode, but not so large that it supports additional, unwanted modes. In practice, in the prior art, the preferred core defect size for fibers that have actually been made has generally been selected to be larger than a single unit cell but no larger than about the size of seven inner most capillaries, or unit cells, in a triangular array of capillaries. U.S. Pat. No. 6,404,966 purports to describe a single mode hollow core PBG fiber. However, it is unclear from the description how it would be possible to form a single mode PBG fiber having a large hollow core defect, particularly if the cladding has a pitch which is only half the optical wavelength.

As will be described herein, the present inventors have demonstrated that increasing the core defect size beyond sizes proposed in the prior art teachings may provide significant benefits, which potentially outweigh the perceived or actual disadvantages of doing so.

The present inventors also demonstrate that at least some of the perceived disadvantages of increasing the core defect size, based on well-understood theory for index-guiding fibers, do not necessarily apply in the case of PBG fibers. In addition, the present inventors propose that, to the extent certain perceived disadvantages of increasing the core defect size do exist, there are ways to mitigate these effects by careful design of the PBG fiber structure. A number of possible ways to mitigate such effects will be considered. In particular, the inventors demonstrate that the number and kinds of modes that are supported by a PBG fiber are not determined only by the diameter of the core defect, an index difference between a core and cladding and wavelength of light, unlike in a conventional index-guiding fiber. Indeed, the present inventors demonstrate herein that it is possible to increase the diameter of the core defect significantly without proportionately increasing the numbers of core modes supported by the PBG fiber. In addition, the present inventors show that core modes supported by the PBG fiber can be manipulated by varying only the form of the boundary region around the core.

The relatively low refractive index regions may be voids under vacuum or filled with air or another gas, for example $N_2$ or Ar.

At least some of the relatively high refractive index regions may comprise silica glass, for example pure or doped silica glass or other silicate glasses, although any other inorganic glass or organic polymer could be used in any practical combination.

At least some of the boundary veins may be substantially straight. Alternatively, or in addition, at least some boundary veins may be bowed inwardly or outwardly.

The microstructured region may comprise a photonic band-gap structure. Then, at least some of the enlarged regions may deviate from the form of the photonic band-gap structure. For example, there may be additional enlarged regions or the regions may be larger than would be expected from inspection only of the PBG structure.

Indeed, the boundary may have a different structure from the structure of the rest of the outer structure. For example, the regions of relatively high refractive index in the boundary region may be thicker or thinner than corresponding regions in the rest of the outer structure. The regions of relatively high refractive index may include nodes or nodules that are in different positions or have different sizes from corresponding features in the rest of the outer structure (it may be that there are no corresponding features in the outer structure or that there are such features in the outer structure but they are not present in the boundary region). The regions of relatively high refractive index in the boundary region may include a region of a different refractive index from the refractive index of corresponding region in the outer structure.

It is highly unlikely in practice that a photonic bandgap structure according to embodiments of the present invention will comprise a 'perfectly' periodic array, due to imperfections being introduced into the structure during its manufacture and/or perturbations being introduced into the array by virtue of the presence of the core defect and/or additional layers (over-cladding) and jacketing around the photonic band-gap structure. The present invention is intended to encompass both perfect and imperfect structures. Likewise, any reference to "periodic", "lattice", or the like herein, imports the likelihood of imperfection.

Even if the outer structure is not a photonic bandgap structure, any features set out above in relation to other aspects of the invention having a bandgap structure may be found in the present further aspect of the invention unless that is not physically meaningful.

In addition, core boundaries having the aforementioned (and respective following) form may be used in combination with periodic or non-periodic photonic band-gap structures. Although periodic arrays are more common for forming a photonic band-gap, in principle, the array need not be periodic—see, for example, "Antiresonant reflecting photonic crystal optical waveguides", by N. M. Litchinitser et al., Optics Letters, Volume 27, No. 18, Sep. 15, 2002, pp 1592-1594. Although this paper does not provide calculations explicitly for PBG fibers, it does illustrate that photonic band-gaps may be obtained without periodicity.

An enlarged region may be coincident with a node such that the node appears to have an uncharacteristic form relative to the photonic band-gap structure. Typically, nodes or the like in prior art PBG fiber structures have a form that is substantially dictated by the form of the PBG cladding structure or the process used to make the PBG structure. In particular, in the prior art nodes tend to have a similar size and form as the other node-like formations in the PBG cladding structure. According to some embodiments of the present invention, however, the nodes that appear to have an uncharacteristic form may, by design, be larger, smaller or generally have a different form than the cladding nodes.

The proportion by volume of relatively low refractive index regions in the microstructured region may be greater than 75%. For example, it may exceed 80%, 85% or even 90%.

In preferred embodiments of the present invention, the waveguide supports a mode in which greater than 95% of the mode power in the waveguide is in relatively low refractive index regions. In some embodiments, more than 98% or even 99% of the mode power is in the relatively low refractive index regions.

Typically, the waveguide supports a mode having a mode profile that closely resembles the fundamental mode of a standard, single mode optical fiber. This mode may support a maximum amount of the mode power in relatively low refractive index regions compared with other modes that are supported by the waveguide.

In addition, or alternatively, the waveguide supports a core-guided, non-degenerate mode. This mode may be the lowest loss mode of the waveguide. Alternatively, the fundamental-like mode may be the lowest loss mode of the waveguide.

In general, at least for larger core sizes (for example seven cell core defects and larger) the waveguide supports plural core-guided modes.

The waveguide may have an operating wavelength, wherein the pitch of the microstructured region is greater than the operating wavelength.

According to a second embodiment, the present invention provides an optical fiber comprising a waveguide described above as being in accord with the present invention.

According to a third embodiment, the present invention provides a transmission line for carrying data between a transmitter and a receiver, the transmission line including along at least part of its length a fiber of the aforementioned kind.

According to a fourth embodiment, the present invention provides a preform for a microstructured optical fiber waveguide, comprising a stack of parallel, first elongate elements supported, in the plane cross section, around an inner region, which is to become a relatively low refractive index core region when the preform is drawn into a fiber, the preform further comprising second elongate elements, also supported or situated around the inner region, said second elements being arranged to generate a core boundary, at the interface between the photonic band-gap cladding and the core, when the preform is drawn into fiber, the arrangement of second elements being such that the core boundary comprises at least one relatively enlarged region when the preform is drawn into fiber.

The preform may further comprise a third elongate element for supporting the first and second elongate elements around the inner region. The third elongate elements may be a solid member or it may have a bore.

At least some of the second elongate elements may be situated in interstitial regions that form between the first elongate elements and the third elongate element. The third elongate element may have at least one elongate detent around its periphery and one or more of the second elongate elements are situated in the detent or detents.

At least some second elongate elements are attached to an outer periphery of the third elongate element. In addition, or alternatively, at least some second elongate elements are attached to an inner periphery of the third elongate element. Second elongate elements may be attached to both inner and outer peripheries of the third elongate element. In any case, there may be at least one second elongate element fused to the third elongate element.

In some embodiments, the third elongate element is pre-profiled, in the transverse cross section, to have around its periphery enlarged regions that constitute the second elongate elements.

In alternative embodiments, the third elongate element comprises an inner capillary within the bore of an inside an outer capillary, and at least some second elongate elements are situated in a region that is formed between the inner capillary and the outer capillary.

In preferred embodiments, said first elongate elements are arranged, on a macro scale, to become a photonic band-gap cladding structure when the preform is drawn into a fiber. Then, the arrangement of second elongate elements may deviate from the arrangement of first elongate elements required to form the photonic band-gap cladding structure.

At least some of the second elongate elements may comprise solid rods. In addition, or alternatively, at least some of the second elongate elements may comprise capillaries. In some embodiments, the rods and/or capillaries may be the same size. In other embodiments, the rods and/or capillaries may be different sizes.

At least some of the first elements may have a circular cross section. At least some of the circular first elements may be capillaries. Then, said capillaries may be arranged in a triangular array. In addition, other first elongate elements may be solid rods that are situated in interstitial regions between the capillaries.

According to a further embodiment, the present invention provides an optical fiber made from a preform as described hereinbefore as being in accord with the present invention.

According to a further embodiment, the present invention provides a method of forming a photonic band-gap fiber, comprising the steps of forming a preform as described hereinbefore as being in accord with the present invention, and heating and drawing the preform, in one or more stages, into the fiber.

The present invention is concerned in particular with relatively enlarged regions that are intended to be optimised in size, shape and/or location, to provide improved optical fiber properties.

According to an embodiment, the present invention provides an elongate waveguide for guiding light comprising:

a core, comprising an elongate region of relatively low refractive index;

a microstructured region around the core comprising elongate regions of relatively low refractive index interspersed with elongate regions of relatively high refractive index; and a boundary at the interface between the core and the microstructured region, the boundary comprising, in the transverse cross-section, a region of relatively high refractive index, which is connected to the microstructured region at a plurality of nodes, characterized by at least one relatively enlarged region around the boundary, having a major dimension and a minor dimension, the ratio of the length of the major dimension to the length of the minor dimension (i.e. the length of the major dimension divided by length of the minor dimension) being more than 3.0.

As used herein, the term "relatively enlarged region" may have various different meanings depending upon the particular form of the boundary. For example, a relatively enlarged region may mean a nodule-like, or bead-like, formation or a locally thicker region along a relatively thinner boundary.

The boundary region is a continuous region of relatively high refractive index in that it does not comprise regions of relatively low refractive index: all relatively-high-index regions in the boundary are connected to each other only by relatively-high-index regions. The core is taken to be contiguous with the boundary region. The core thus comprises all connected regions of relatively low refractive index that are surrounded by the boundary region.

In an embodiment, the boundary region has a shape such that, in use, light guided by the waveguide is guided in a transverse mode in which, in the transverse cross-section, more than 95% of the guided light is in the regions of relatively low refractive index in the waveguide.

In some embodiments, the ratio is even larger, for example the ratio may be more than 3.5, 4.0, 4.5, 5.0, 5.5, 6.0, 6.5, 7.0 or more than 7.5. The ratio may be larger still. For example, the ratio may be more than 8.0, more than 8.5, or even as high as 9.0, or even higher.

While the present inventors have previously identified that providing enlarged regions around the core boundary can provide beneficial properties in waveguides, for example, increased confinement of light to the core and decreased interaction between light and relatively high refractive index regions, the inventors have now in addition demonstrated that the particular size, shape and location of the enlarged regions can be sensitively tuned to further-enhance these previously-identified beneficial properties.

The relatively enlarged region may be located between two adjacent nodes. Alternatively, the relatively enlarged region may embody at least one node, in which case the relatively enlarged region would be located between two, non-adjacent nodes.

The relatively enlarged region may be spaced from each neighboring node by a relatively narrow region, which is narrower than the minor dimension and narrower than the diameter of the largest inscribed circle of the adjacent node. While nodes as such are typically not perfectly round in cross section, the present inventors typically characterize nodes by the size of the largest inscribed circle that fits within the relatively high refractive index material that forms the node.

Preferably, the length of the major dimension is at least 0.42 times the distance between the two adjacent nodes on either side of the enlarged region. The distance between the nodes may be measured between node centers, for example defined by the center of the largest inscribed circle of the node. The length of the major dimension may be more than 0.45, more than 0.5, more than 0.6, more than 0.7, or even more than 0.8 times the distance between the two adjacent nodes. According to one exemplary embodiment, the major dimension is about 0.9 times the distance between the two adjacent nodes on either side of the enlarged region.

In addition, the major dimension may be less than 0.98 times or less than 0.95 times the distance between the two adjacent nodes.

While the prior art, for example the aforementioned N. Venkataraman et al. paper and the book chapter, have described waveguide structures that include bead-like formations around a core boundary region, no prior art known to the present inventors has attributed any significance to them. Even relatively recently, a similar fiber structure has been considered in detail in "Surface modes and loss in air-core photonic band-gap fibers", Allan et al., Photonic Crystal Materials and Devices, Proceedings of SPIE, Volume 5000, 28-30 Jan. 2003. In that paper, the authors provided an in depth study of the fiber structure and attributed a certain amount of loss in the fiber as being due to mode coupling of light from core modes to so-called 'surface modes', which exist around the core boundary. Again, the paper made no mention of the bead-like formations being significant in any way. In contrast, the present inventors have discovered that, according to embodiments of the present invention, it is possible to use similar bead-like formations to tune the modal properties of a given fiber. In some cases, it is believed that embodiments of the present invention may be used to mitigate the deleterious effects of the aforementioned mode coupling by de-tuning the surface modes, either by removing them or shifting them further from the core modes.

Considering, for example, an air-core and silica PBG fiber, the inventors have appreciated that the number of guiding modes within the band gap, the relative position of those guided modes in the modal spectrum, the fraction of the light power of the guided modes confined within the air core and the field intensity of these modes at the air-silica interfaces all vary sensitively with the geometry within the region. In particular, the inventors have shown that by tailoring the geometry, the properties of an $LP_{01}$-like mode (when present), which possesses an approximately Gaussian intensity profile towards the center of the core, can be tailored so that up to and even over 99% of the light is confined within air, and predominantly in the core. This implies that loss due to Rayleigh scattering in the silica may be suppressed by up to two orders of magnitude and that nonlinearity may be substantially reduced compared with standard index guiding single mode fiber. Also, the inventors have demonstrated that the core boundary geometry can be designed to reduce the field intensity of this mode strongly in the vicinity of the air-silica interfaces. This has the effect of reducing both the small scale interface roughness scattering, which is discussed in detail hereafter, and the mode coupling due to longer range fiber variations.

In a study by the present inventors, the relatively enlarged regions in the aforementioned prior art have typically had a major dimension—aligned azimuthally around the boundary—that is in the range of 0.3 to 0.4 times the distance between respective adjacent nodes. These enlarged regions have been generally oval in shape and six in number around a core boundary comprising twelve nodes (defining a seven-cell core defect), have occurred between every other pair of nodes around the boundary and have had an aspect ratio (major dimension length divided by minor dimension length) of between two and three.

According to embodiments of the present in invention, the microstructured region may have a characteristic pitch. In this case, the major dimension may be at least 0.42 times the characteristic pitch. The major dimension may be at least 0.45, 0.5, 0.6, 0.7, or even 0.8 times the characteristic pitch. According to one exemplary embodiment, the major dimension is about 0.9 times the characteristic pitch.

In addition, the major dimension may be less than 0.98 times or less than 0.95 times the characteristic pitch.

The microstructured region, in the plane cross section, may comprise a substantially periodic array of relatively low refractive index regions, being separated from one another by relatively high refractive index regions, the array having a characteristic primitive unit cell and a pitch $\Lambda$. For example, the microstructured region may comprise a substantially periodic, triangular array of relatively low refractive index regions. A primitive unit cell is a unit cell of the structure, having a smallest area (in the transverse cross section) that, by vector translations, can tile and reproduce the entire structure without overlapping itself or leaving voids. The pitch $\Lambda$ is the minimum translation distance between two neighboring primitive unit cells.

It is highly unlikely in practice that a waveguide structure according to embodiments of the present invention will comprise a 'perfectly' periodic array, due to imperfections being introduced into the structure during its manufacture and/or perturbations being introduced into the array by virtue of the presence of the core defect and/or additional layers (overcladding) and jacketing around the photonic band-gap structure. The present invention is intended to encompass both perfect and imperfect structures. Likewise, any reference to "periodic", "lattice", or the like herein, imports the likelihood of imperfection.

The boundary may have a distinct form compared with other regions of the waveguide. For example, the regions of relatively high refractive index in the boundary region may be thicker or thinner than similar regions in the rest of the outer structure. The regions of relatively high refractive index may include nodes or nodules that are in different positions or have different sizes from corresponding features in the rest of the outer structure (it may be that there are no corresponding features in the outer structure or that there are such features in the outer structure but they are not present in the boundary region). The regions of relatively high refractive index in the boundary region may include a region of a different refractive index from the refractive index of corresponding region in the outer structure.

In some embodiments, the core is a seven cell defect (that is, it has a form that would result from omission or removal of relatively high refractive index regions from a first primitive unit cell and the six primitive unit cells that surround the first primitive unit cell of a triangular array of unit cells.

Alternatively, the core is a nineteen cell core defect (that is, it has a form that would result from omission or removal of relatively high refractive index regions from a seven cell defect and, in addition, the twelve primitive unit cells that surround said seven cell defect.

Hitherto, the prior art teachings relating to PBG fibers have focused on a core defect that is just large enough to support a single mode, but not so large that it supports additional, unwanted modes. In practice, in the prior art, the preferred core defect size for fibers that have actually been made has generally been selected to be larger than a single unit cell but no larger than about the size of seven inner most capillaries, or unit cells, in a triangular array of capillaries. U.S. Pat. No. 6,404,966 purports to describe a single mode hollow core PBG fiber. However, it is unclear from the description how it would be possible to form a single mode PBG fiber having a large hollow core defect, particularly if the cladding has a pitch which is only half the optical wavelength.

The present inventors have appreciated that increasing the core defect size beyond sizes proposed in the prior art teachings may provide significant benefits, which potentially outweigh the perceived or actual disadvantages of doing so.

The present inventors have also appreciated that at least some of the perceived disadvantages of increasing the core defect size, based on well-understood theory for index-guiding fibers, do not necessarily apply in the case of PBG fibers. In addition, the present inventors propose that, to the extent certain perceived disadvantages of increasing the core defect size do exist, there are ways to mitigate these effects by careful design of the PBG fiber structure. In particular, the inventors demonstrate that the number and kinds of modes that are supported by a PBG fiber are not determined only by the diameter of the core defect, an index difference between a core and cladding and wavelength of light, unlike in a conventional index-guiding fiber. The present inventors show that core modes supported by the PBG fiber can be manipulated by varying only the form of the boundary region around the core.

The enlarged region may have a generally oval shape.

The minor dimension may extend substantially radially with respect to the center of the waveguide.

There may be six, or more than six, enlarged regions around the boundary. For example there may be twelve or more enlarged regions around the boundary.

In any event, the core boundary may comprise eighteen nodes.

In addition, or alternatively, there may be enlarged regions between six or more pairs of neighboring nodes. For instance, the boundary may have enlarged regions between twelve pairs of neighboring nodes.

There may be only one enlarged region between any pair of neighboring nodes.

Preferably, there are plural enlarged regions that are substantially equi-spaced around the boundary.

Alternatively, here may be plural groups of two or more enlarged regions and the groups may be substantially equi-spaced around the boundary.

In some embodiments, the enlarged regions may not be equally spaced around the boundary and the boundary may have no rotational symmetry as such. The boundary may have no more than two fold rotational symmetry about any longitudinal axis thereof at least in part by virtue of the presence or placement of the or each relatively enlarged region. For example, the boundary may only have two fold rotational symmetry. In this way, the overall structure may be rendered birefringent The relatively high refractive index regions may substantially comprise a solid matrix material, which defines a microstructure of relatively low refractive index regions substantially comprising voids. The voids may be filled with a gaseous medium, for example air, $N_2$ or Ar, or liquid medium, or are substantially under a vacuum.

At least some of the relatively high refractive index regions may comprise silica glass, for example pure or doped silica glass or other silicate glasses, although any other inorganic glass or organic polymer could be used in any practical combination.

In particularly preferred embodiments of the present invention, the microstructured region around the core is substantially arranged to form a photonic band-gap for a predetermined wavelength of light. The photonic band-gap may not be the only confinement mechanism in operation in the waveguide, in use.

Even if the microstructured region does not provide a photonic bandgap, any features set out above in relation to other aspects of the invention having a bandgap structure may be found in the present further aspect of the invention unless that is not physically meaningful.

Core boundaries having the aforementioned (and respective following) form may be used in combination with periodic or non-periodic photonic band-gap structures. Although periodic arrays are more common for forming a photonic band-gap, in principle, the array need not be periodic—see, for example, "Antiresonant reflecting photonic crystal optical waveguides", by N. M. Litchinitser et al., Optics Letters, Volume 27, No. 18, Sep. 15, 2002, pp. 1592-1594. Although this paper does not provide calculations explicitly for PBG fibers, it does illustrate that photonic bandgaps may be obtained without periodicity.

An enlarged region may be coincident with a node such that the node appears to have an uncharacteristic form relative to the photonic band-gap structure. Typically, nodes or the like in prior art PBG fiber structures have a form that is substantially dictated by the form of the PBG cladding structure or the process used to make the PBG structure. In particular, in the prior art nodes tend to have a similar size and form as the other node-like formations in the PBG cladding structure. According to some embodiments of the present invention, however, the nodes that appear to have an uncharacteristic form may, by design, be larger, smaller or generally have a different form than the cladding nodes.

The proportion by volume of relatively low refractive index regions in the microstructured region may be greater than 75%. Indeed, the proportion may be greater than 80, greater than 85, greater than 90, or even greater than 92%.

The waveguide may support a mode in which greater than 95%, greater than 97%, greater than 98%, or greater than 99% of the mode power in the waveguide is in relatively low refractive index regions.

The waveguide may support a mode having a mode profile that closely resembles the fundamental mode of a standard, single mode optical fiber.

The aforementioned mode may support a maximum amount of the mode power in relatively low refractive index regions compared with other modes that are supported by the waveguide.

The waveguide may support a core-guided, non-degenerate mode. That mode may be the lowest loss mode of the waveguide.

In general, the waveguide may support plural core-guided modes. Alternatively, the waveguide may support only one core-guided mode.

The waveguide may have an operating wavelength, wherein the pitch of the microstructured region is greater than the operating wavelength.

According to a further embodiment, the present invention provides an elongate waveguide for guiding light comprising:

a core, comprising an elongate region of relatively low refractive index;

a microstructured region around the core comprising elongate regions of relatively low refractive index interspersed with elongate regions of relatively high refractive index; and a boundary at the interface between the core and the microstructured region, the boundary comprising, in the transverse cross-section, a region of relatively high refractive index, which is connected to the microstructured region at a plurality of nodes, characterized by at least one relatively enlarged region positioned between two adjacent nodes, the relatively enlarged region having a major dimension and a minor dimension, the length of the major dimension being greater than 0.42 times, and less than 0.98 times, the distance between the two adjacent nodes.

There may be six generally similar relatively enlarged regions around the boundary. Indeed, the waveguide may have any, some or all of the features described in relation to another aspect of the present invention.

According to a further embodiment, the present invention provides an optical fiber comprising a waveguide as hereinbefore described.

According to a further embodiment, the present invention provides a transmission line for carrying data between a transmitter and a receiver, the transmission line including the aforementioned fiber along at least part of its length.

An object of the present invention is to provide a PBG waveguide having improved properties, in particular lower loss, than prior art PBG waveguides.

In arriving at the present invention, the inventors have demonstrated that, while the size of a core defect is significant in determining certain characteristics of a PBG waveguide, the form of a boundary at the interface between core and cladding also plays a significant role in determining certain characteristics of the waveguide. As will be described in detail hereafter, the inventors have determined that, for given PBG core and cladding structures, variations in only the form of the boundary can cause significant changes in the characteristics of a respective waveguide.

According to an embodiment of the invention there is provided an elongate waveguide for guiding light comprising: a core, comprising an elongate region of relatively low refractive index; and a microstructured region comprising a photonic bandgap structure arranged to provide a photonic bandgap over a range of wavelengths of light, the structure comprising elongate regions of relatively low refractive index interspersed with elongate regions of relatively high refractive index, including a boundary region of relatively high refractive index that surrounds, in a transverse cross-section of the waveguide, the core; characterized in that the boundary region has a shape such that, in use, light guided by the waveguide is guided in a transverse mode in which, in the transverse cross-section, more than 95% of the guided light is in the regions of relatively low refractive index in the waveguide.

In referring to the 'shape' of the boundary region, we mean 'shape' in a broad sense, both its gross shape (whether it is for example circular or hexagonal or dodecagonal or some other shape) and fine details of its shape, for example the presence or absence of local variations in thickness (for example, nodes or nodules) around its perimeter. (It is expected that the gross shape of the boundary will generally define the shape of the core.) We also use the word 'shape' to encompass the size of the boundary region; for example, we regard a boundary region that is a circular shell in the transverse plane to have a different shape for a different diameter of the shell or for a different thickness of the shell, even though it remains a circular shell in each of those cases.

The regions of relatively low refractive index in the waveguide of course comprise the regions of relatively low refractive index in the photonic bandgap structure and the region of relatively low refractive index in the core.

The regions of relatively low refractive index may have a refractive index of less than 2, less than 1.8, less than 1.6, less than 1.5, less than the refractive index of silica, less than 1.4, less than 1.3, less than the refractive index of typical polymer glasses (for example, less than 1.25), less than 1.2 or even less than 1.1 or even less than 1.05, or be 1 for the case of a vacuum.

The inventors have discovered that in considering how best to lower loss in an optical waveguide having a photonic bandgap cladding structure, it is helpful to consider the behaviour of distinct features in the cladding boundary as being that of optical resonators.

Considering, for example, an air-core and silica PBG fiber, the inventors have determined that the geometry of the region of the boundary between the air core and the photonic bandgap cladding structure has profound effects on the modal properties of the fiber. In particular, the inventors have appreciated that the number of guiding modes within the band gap, the fraction of the light power of the guided modes confined within the air core and the field intensity of these modes at the air-silica interfaces all vary sensitively with the geometry within the region. In particular, the inventors have shown that by tailoring the geometry, the properties of an LP01-like mode (when present), which possesses an approximately Gaussian intensity profile towards the center of the core, can be tailored so that up to and even over 99% of the light is confined within air, and predominantly in the core. This implies that loss due to Rayleigh scattering in the silica may be suppressed by up to two orders of magnitude and that nonlinearity may be substantially reduced compared with standard index guiding single mode fiber. Also, the inventors have demonstrated that the core boundary geometry can be designed to reduce the field intensity of this mode strongly in the vicinity of the air-silica interfaces. This has the effect of reducing both the small scale interface roughness scattering, which is discussed in detail hereafter, and the mode coupling due to longer range fiber variations.

The inventors have determined that the design of a core-cladding interface, or boundary region, can exploit an antiresonance effect to strongly enhance the power in air fraction, $\eta$, and reduce the field intensity at the air-silica interfaces of core-guided modes, such as the LP01-like mode. Antiresonant boundaries have also been found, in at least some embodiments, to have the benefit of reducing the effects of, or even removing, so-called surface modes that can exist at a core boundary and potentially interfere with the core-guided modes. This is particularly surprising given that an antiresonant core boundary does not typically match the form of the cladding.

A simple example of an optical resonator is the Fabry-Perot interferometer. Whether or not light can resonate in such a feature depends on the feature's size, shape and composition, and also on the wavelength and direction of propagation of the light. As the wavelength is varied the feature moves into and out of resonance.

Such antiresonant effects can be observed in slab-like resonators, having plane parallel faces between which light is reflected and interferes destructively at antiresonance. The effect can also be observed in a ring-like resonator, where interference is between reflectors from an outer and an inner shell surface. It has been reported by Litchinitser et al., Opt. Lett., Vol. 27 (2002) pp. 1592-1594, that light may be guided in a PBG-like fiber predominantly by anti-resonant reflection in multiple cladding layers. Litchnitser et al. describe a fiber structure comprising a low index core surrounded by plural concentric layers of high and low index material, the relative thickness of which were chosen to provide an anti-resonant cladding structure for confining light to the core region.

Litchinitser also mentions a PCF consisting of a silica core surrounded by holes filled with high index liquid. In that case the silica represents the low index medium and the filled holes are the features that act as resonators. At their antiresonant wavelengths, the filled holes substantially exclude light and thus confine light to the relatively low-index silica core. The present inventors have considered more complicated structures, which may, for example, comprise high-index features interconnected by high index "struts", whereas the resonators described by Litchinitser et al. are isolated cylinders. Nevertheless the present inventors have discovered that such interconnected features can act as distinct resonators, and serve to confine light in the low index medium (for example, air) when they are antiresonant.

For a given excitation, on resonance, the optical power in the features assumes a maximum. In between resonances, optical power in the features is minimised. In a photonic crystal fiber, if the relatively low refractive index regions are air, it is desirable to maximise the amount of light in these regions in order to reduce scattering, non-linearities and other deleterious effects. Hence it is advantageous to incorporate features that possess strong distinct resonances, and adjust their sizes and shapes so that they are antiresonant at the optical wavelengths and directions of propagation of interest.

That is advantageous as it raises the proportion of light in low-index regions and decreases F-factor (defined below), which is a measure of the amount of light at glass/air interfaces.

The present inventors have discovered that confinement of light to a core of a PBG fiber, which confines light to the core region by virtue of a photonic bandgap, may be enhanced by providing, at the interface between the core and the photonic bandgap cladding, a boundary which is tuned to be substantially anti-resonant. Unlike in Litchinitser et al., in which antiresonance is achieved using concentric layers of material or distinct, unconnected resonators, a core boundary proposed herein may comprise plural anti-resonant features around an unbroken, but otherwise generally non-antiresonant, core boundary. The present inventors have discovered that such a core boundary can be arranged to be antiresonant at an operating wavelength, and thereby serve to confine light to the core of the waveguide. The present inventors have also discovered that it is possible to achieve a similar confinement of light to a core by arranging a single, unbroken region of relatively high refractive index at the interface between the core and the photonic bandgap structure. This latter kind of confinement, while being closely related to the former kind, is described more fully in applicant's co-pending International Patent Application, having the title "Enhanced Optical Waveguide", filed on the same date and having the same earliest priority date as this application (the entire contents of the co-pending application is hereby incorporated herein by reference).

As discussed above, guiding light in a region of relatively low refractive index has the advantage that losses, nonlinear effects and other material effects are generally lower in such regions, particularly if the region is a region of air or a gas. Thus preferably, ever more of the light is guided in the regions of relatively low refractive index in the PBG structure or in the region of relatively low refractive index in the core: preferably more than 96%, more than 97%, more than 98%, more than 99%, more than 99.3%, more than 99.5% or even more than 99.9% of the light is in those regions.

The boundary region may have a shape such that, in use, light guided by the waveguide is guided in a transverse mode in which, in the transverse cross-section, more than 50% of the guided light is in the region of relatively low refractive index in the core. It is significant that the inventors have recognised that the light need not be in the core region for beneficial effects to be achieved. Thus, the boundary region may have a shape such that, in use, light guided by the waveguide is guided in a transverse mode in which, in the transverse cross-section, more than 1% of the guided light is in the regions of relatively low refractive index in the photonic bandgap structure. It may be that still more of the guided light is in those regions in the PBG structure: more than 2%, more than 5% or even more than 10% of the light may be in those regions.

F-factor has been identified by the present inventors as a useful figure of merit which relates to how the guided light propagating in a PBG fiber is subject to scattering from small scale irregularities of the air-silica interfaces. F-factor is also believed to be a strong indicator of likely mode-coupling characteristics of a PBG-fiber.

The guided light propagating in a PBG waveguide is subject to scattering from small scale irregularities of the interfaces between higher refractive index regions and lower refractive index regions. That loss mechanism acts in addition to the Rayleigh scattering due to index inhomogeneity within the higher index regions. The latter loss mechanism is strongly suppressed in PBG waveguides having for example an air core, since most of the light power resides in air. The amount of scattering associated with the interfaces can be minimised by ensuring that impurities are eliminated during the draw process; such impurities can act as scattering (and absorption) centers directly, and can operate as nucleation sites for crystallite formation. With such imperfections removed, there still remains interface roughness governed by the thermodynamics of the drawing process. Such fluctuations are likely to be difficult or impossible to remove.

The Rayleigh scattering due to small scale roughness at the lower-index/higher-index (e.g. air-silica) interfaces can be calculated by applying a perturbation calculation. The analysis has a simple interpretation in terms of effective particulate scatterers distributed on the interfaces. If the root-mean square (RMS) height roughness is $h_{rms}$ and the correlation lengths of the roughness along the hole direction and around the hole perimeter are $L_z$ and $L_\phi$ respectively, then a typical scatterer has a volume $h_{rms} L_z L_\phi$. The induced dipole moment of the typical scatterer is then given by $$p = \Delta \in E_0 h_{rms} L_z L_\phi, \quad (1)$$

where $\Delta \in$ is the difference in dielectric constant between the higher-index and the lower-index regions, and $E_0$ is the E-field strength at the scatterer. That induced dipole moment radiates a power, in the free space approximation, given by $$P_{sc} = \frac{1}{12\pi}\left(\frac{\omega}{c}\right)^4 \left(\frac{\varepsilon_0}{\mu_0}\right)^{1/2} |p|^2 \quad (2)$$

$$= \frac{1}{12\pi}\left(\frac{\omega}{c}\right)^4 \Delta\varepsilon^2 h_{rms}^2 L_z^2 L_\phi^2 \left(\frac{\varepsilon_0}{\mu_0}\right)^{1/2} |E_0|^2.$$

The number density of particles on the interface will be $\sim 1/(L_z L_\phi)$ so that the total radiated power from a section of length L of the perturbed fiber will be approximately $$P_{rad} \sim \frac{1}{12\pi}\left(\frac{\omega}{c}\right)^4 \Delta\varepsilon^2 h_{rms}^2 L_z L_\phi L \left(\frac{\varepsilon_0}{\mu_0}\right)^{1/2} \oint_{hole\ perimeters} ds |E_0|^2 \quad (3)$$

The loss rate is thus given by $$\gamma = \frac{P_{rad}}{P_0 L} \sim \frac{1}{6\pi}\left(\frac{\omega}{c}\right)^4 \Delta\varepsilon^2 h_{rms}^2 L_z L_\phi \left(\frac{\varepsilon_0}{\mu_0}\right)^{1/2} \frac{\oint_{hole\ perimeters} ds|E_0|^2}{\int dS(E_0 \wedge H_0^*)\cdot\hat{z}} \quad (4)$$

where the incident power $P_0$ has been expressed as a Poynting flux.

Equation (4) shows that the mode shape dependence of the Rayleigh interface roughness scattering strength is governed by a factor F given by $$F = \left(\frac{\varepsilon_0}{\mu_0}\right)^{1/2} \frac{\oint_{hole\ perimeters} ds|E_0(r')|^2}{\int_{x-section} dS(E_0 \wedge H_0^*)\cdot\hat{z}}. \quad (5)$$

A comparison of the interface scattering strength from guided modes of different fibers with similar interface roughness properties can be based purely on this factor. Indeed, the thermodynamic limit to surface roughness is not expected to vary significantly with the details of the fiber geometry, so that the factor F can be used directly as a figure of merit.

A more rigorous calculation of small scale interface roughness can be derived which takes into account the details on the surface roughness spectrum and deviations from the free space approximation. The latter effect is embodied by a local density of states (LDOS) correction factor appearing in the integrand of the numerator integral in equation (5). Ideally, to minimise the interface loss, the field intensity of the guiding mode multiplied by the LDOS factor should be maintained as small as possible at the interfaces. In practise, the LDOS correction is found to be small even for (silica/air) band gap fibers in comparison with the guided mode field intensity factor, so that the factor F given in expression (5) may be used to compare the interface scattering strength from guided modes of different fiber designs.

The effect of the scattering from crystallites which have formed close to the air/silica interfaces can be calculated in a similar way to the geometrical roughness considered above. Assuming the number density per unit interface length and the size of the crystallites is independent of fiber design, again F can be used directly to compare the interface scattering strengths.

The boundary region may have a shape such that, in use, light guided by the waveguide is guided in a transverse mode providing an F-factor of less than 0.23 $\mu m^{-1}$. That figure is calculated assuming that the waveguide guides light at a frequency of 1.55 $\mu m$. For the case in which the Photonic Band Gap structure is a periodic structure having a pitch $\Lambda$, the F-factor is preferably less than 0.7 $\Lambda^{-1}$.

Also according to an embodiment of the invention there is provided an elongate waveguide for guiding light comprising:

a core, comprising an elongate region of relatively low refractive index; and a photonic bandgap structure arranged to provide a photonic bandgap over a range of frequencies of light, the structure comprising elongate regions of relatively low refractive index interspersed with elongate regions of relatively high refractive index, including a boundary region of relatively high refractive index that surrounds, in a transverse cross-section of the waveguide, the core;

characterised in that the boundary region has a shape such that, in use, light guided by the waveguide is guided in a transverse mode providing an F-factor of less than 0.23 $\mu m^{-1}$ (or, for a waveguide in which the Photonic Band Gap structure is a periodic structure having a pitch $\Lambda$, 0.7$\Lambda^{-1}$).

Preferably, still lower F-factors are provided: less than 0.192 $\mu m^{-1}$ (or 0.6$\Lambda^{-1}$ if periodic), less than 0.16 $\mu m^{-1}$ (or 0.5$\Lambda^{-1}$ if periodic), less than 0.128 $\mu m^{-1}$ (or 0.4$\Lambda^{-1}$ if periodic), less than 0.10 $\mu m^{-1}$ (or 0.3$\Lambda^{-1}$ if periodic), less than 0.080 $\mu m^{-1}$ (or 0.25$\Lambda^{-1}$ if periodic), less than 0.065 $\mu m^{-1}$ (or 0.2$\Lambda^{-1}$ if periodic), less than 0.060 $\mu m^{-1}$ (or 0.188$\Lambda^{-1}$ if periodic), less than 0.055 $\mu m^{-1}$ (or 0.17$\Lambda^{-1}$ if periodic), less than 0.052 $\mu m^{-1}$ (or 0.163$\Lambda^{-1}$ if periodic), less than 0.048 $\mu m^{-1}$ (or 0.15$\Lambda^{-1}$ if periodic), less than 0.04 $\mu m^{-1}$ (or 0.125$\Lambda^{-1}$ if periodic), less than 0.032 $\mu m^{-1}$ (or 0.10$\Lambda^{-1}$ if periodic), less than 0.029 $\mu m^{-1}$ (or 0.090$\Lambda^{-1}$ if periodic), less than 0.026 $\mu m^{-1}$ (or 0.080$\Lambda^{-1}$ if periodic), less than 0.022 $\mu m^{-1}$ (or 0.070$\Lambda^{-1}$ if periodic), less than 0.02 $\mu m^{-1}$ (or 0.063$\Lambda^{-1}$ if periodic), less than 0.019 $\mu m^{-1}$ (or 0.060$\Lambda^{-1}$ if periodic), less than 0.016 $\mu m^{-1}$ (or 0.05$\Lambda^{-1}$ if periodic), less than 0.013 $\mu m^{-1}$ (or 0.040$\Lambda^{-1}$ if periodic), less than 0.012 $\mu m^{-1}$ (or 0.038$\Lambda^{-1}$ if periodic), 0.010 $\mu m^{-1}$ (or 0.030$\Lambda^{-1}$ if periodic), less than 0.006 $\mu m^{-1}$ (or 0.020$\Lambda^{-1}$ if periodic), or even less than 0.003 $\mu m^{-1}$ (or 0.010$\Lambda^{1}$ if periodic) are preferred.

The relevant F-factor is typically the F-factor only of the mode of interest (for example, the fundamental mode, ignoring higher-order modes).

The features next discussed may be found in embodiments of either aspect of the invention (relating to high levels of light in the relatively low refractive index regions or relating to F-factor).

In the transverse cross section, the photonic bandgap structure may comprise an array of the relatively low refractive index regions separated from one another by the relatively high refractive index regions. The array may be substantially periodic. (However, in principle, the array need not be periodic—see, for example, the paper by N. M. Litchinitser et al. discussed above. Although that paper does not provide calculations explicitly for PBG fibers, it does illustrate that photonic bandgaps may be obtained without periodicity.)

It is highly unlikely in practice that a photonic bandgap structure according to the present invention will comprise a 'perfectly' periodic array, due to imperfections being introduced into the structure during its manufacture and/or perturbations being introduced into the array by virtue of the presence of the core defect. The present invention is intended to encompass both perfect and imperfect structures. Likewise, any reference to "periodic", "lattice", or the like herein, imports the likelihood of imperfection.

The array may be a substantially triangular array. Other arrays, of course, may be used, for example, square, hexagonal or Kagome, to name just three.

The array may have a characteristic primitive unit cell and a pitch $\Lambda$.

The boundary region may comprise, in the transverse cross-section, a plurality of relatively high refractive index boundary veins joined end-to-end around the boundary between boundary nodes, each boundary vein being joined between a leading boundary node and a following boundary node, and each boundary node being joined between two boundary veins and to a relatively high refractive index region of the photonic bandgap structure. Thus, a vein sits between two nodes, with no other node between the two nodes; i.e., it sits between two neighboring nodes.

At least one of the boundary veins may comprise, along its length or at its end, a nodule. The nodule may have a substantially elliptical shape in the transverse cross-section, such that an ellipse having a major axis of length L and a minor axis of length W substantially fits to the shape of the nodule. The major axis may extend along the boundary vein in which the nodule is situated.

The waveguide may guide light at a wavelength $\lambda_1$, which may be any wavelength at which the waveguide is substantially transparent. The wavelength $\lambda_1$ may be in the ultraviolet, visible or infrared parts of the electromagnetic spectrum. The wavelength $\lambda_1$ may be in a telecoms window, for example $\lambda_1$ may be in the range 1510 nm to 1610 nm or in the 1300 nm band. Alternatively, the wavelength $\lambda_1$ may be in the 1060 nm band or in the 810 nm band. Operation may be at a longer wavelength, for example in the range 1.8 to 2.0 μm or in the range 2 μm to 5 μm, at or around the wavelength of operation of $CO_2$ lasers (10.6 μm).

The waveguide may be arranged to guide light at a wavelength $\lambda_2$, wherein light guided at the wavelength $\lambda_2$ exhibits lower loss than light guided in the waveguide at any other wavelength.

The lengths of the minor and major axes of an elliptical nodule on a boundary vein have been found to be significant in increasing the fraction of light in the regions of low refractive index and in decreasing the F-factor. In particular it has been found that, in a plane having orthogonal axes along which values of W and L are plotted, particular regions comprise particular pairs of values of W and L (represented by co-ordinates (L,W) in the plane) that provide a higher fraction of light in the regions of low refractive index, or a lower F-factor, than is found in prior-art waveguides. Table 1 sets out relations between W and L that conveniently define those particular regions. Various regions of interest may be defined more precisely by taking combinations of two or more of those relations.

Some of the relations are defined in terms of a parameter X, which is used for brevity, to reduce the number of claims necessary to cover envisaged possibilities. Thus, parameter X may be equal to the wavelength $\lambda_1$ or the wavelength $\lambda_2$ or, where the waveguide has a pitch $\Lambda$ as described above, the pitch $\Lambda$.

TABLE 1

Relations defining preferred regions of the L-W plane (N.B. The relations are set out in two columns purely for conciseness; the relations in adjacent columns are as independent of each other as are all other relations in the table).

| | |
|---|---|
| $W \approx L$ | $L \times W \approx \frac{X^2}{12}$ |
| $W \leq 0.467L$ | $L \times W \leq 0.113X^2$ |
| $W \approx \frac{L}{3}$ | $W \leq \left(\frac{1}{18} + \frac{L}{3}\right)X$ |
| $W \geq 0.238L$ | $W \geq \left(-\frac{1}{18} + \frac{L}{3}\right)X$ |
| $L \geq \frac{5X}{12}$ | $W \geq \left(\frac{5}{18} - \frac{L}{3}\right)X$ |
| $L \approx \frac{X}{2}$ | $W \leq \left(\frac{7}{18} - \frac{L}{3}\right)X$ |
| $L \leq \frac{7X}{12}$ | $W \geq (-0.133 + 0.467L)X$ |
| $W > \frac{X}{18}$ | $W \leq (0.095 + 0.238L)X$ |
| $W > \frac{5X}{36}$ | $W \geq (0.333 - 0.467L)X$ |
| $W \approx \frac{X}{6}$ | $W \leq (0.333 - 0.238L)X$ |
| $W \leq \frac{7X}{36}$ | $W \geq (0.467 - 0.467L)X$ |
| $L \times W \geq 0.058X^2$ | $W \leq (0.238 - 0.238L)X$ |
| $L < 0.27\Lambda$ | $W < 0.11\Lambda$ |
| $L > 0.45\Lambda$ | $W > 0.21\Lambda$ |

The F-factor of a structure may be improved by increasing the size of the core. The core may have, in the transverse cross-section, an area that is significantly greater than the area of at least some of the relatively low refractive index regions of the photonic bandgap structure. The core may have, in the transverse cross-section, an area that is greater than twice the area of at least some of the relatively low refractive index regions of the photonic bandgap structure.

The core may have, in the transverse cross-section, an area that is greater than the area of each of the relatively low refractive index regions of the photonic bandgap structure.

The core may have, in the transverse cross-section, a transverse dimension that is greater than the pitch $\Lambda$.

The core may correspond to the omission of a plurality of unit cells of the photonic band-gap structure, for example, the core may correspond to the omission of three, four, six, seven, ten, twelve, nineteen or thirty seven unit cells of the photonic band-gap structure. The core may correspond to the omission of more than thirty seven unit cells of the photonic band-gap structure.

At least some of the relatively low refractive index regions may be voids filled with air or under vacuum.

At least some of the relatively low refractive index regions may be voids filled with a liquid or a gas other than air. The region of relatively low refractive index that makes up the core may comprise the same or a different material compared with the regions of relatively low refractive index in the photonic bandgap structure.

In some embodiments, at least some of the relatively high refractive index regions comprise silica glass. The glass may be un-doped or doped with index raising or lowering dopants. As used herein 'silica' encompasses fused silica, including doped fused silica, and silicate glasses in general such as germano-silicates and boro-silicates.

In alternative embodiments of the invention the relatively high refractive index regions comprise a material other than silica. For example, it may be an inorganic glass in which multi-phonon absorption only becomes significant at wavelengths significantly longer than for silica. Exemplary inorganic glasses may be in the category of halide glasses, such as a fluoride glass, for example ZBLAN. Alternatively, the relatively high refractive index may comprise another solid material, for example an organic polymer.

The relatively low refractive index regions may make up more than 58% by volume of the photonic bandgap structure. The relatively low refractive index regions may make up more than 60%, more than 64%, more than 65%, more than 70%, more than 75%, more than 80%, more than 85%, more than 90%, more than 91%, more than 92%, more than 93%, more than 94%, or even more than 95%. The relatively low refractive index regions may make around 87.5% by volume of the photonic bandgap structure.

The waveguide may support a mode having a mode profile that closely resembles the fundamental mode of a standard optical fiber. An advantage of this is that the mode may readily couple into standard, single mode optical fiber.

Alternatively, or in addition, the waveguide may support a non-degenerate mode. This mode may resemble a $TE_{01}$ mode in standard optical fibers.

Preferably, in either case, said mode supports a maximum amount of the mode power in relatively low refractive index regions compared with other modes that are supported by the waveguide.

At least some of the boundary veins may be substantially straight. In some embodiments, substantially all of the boundary veins are substantially straight. Alternatively, or additionally, at least some of the boundary veins may be bowed outwardly from, or inwardly towards, the core defect.

At least two of the higher index regions in the photonic bandgap structure may be connected to each other.

The higher index regions in the photonic bandgap structure may be interconnected.

Also according to the invention there is provided an optical fiber comprising a waveguide of a type described above as being according to the invention.

Also according to the invention there is provided a transmission line for carrying data between a transmitter and a receiver, the transmission line including along at least part of its length such a fiber.

Also according to an embodiment of the invention there is provided data conditioned by having been transmitted through such a waveguide. As in any transmission system, data that is carried by the system acquires a characteristic 'signature' determined by a transfer function of the system. By characterizing the system transfer function sufficiently accurately, using known techniques, it is possible to match a model of the input data, operated on by the transfer function, with real data that is output (or received) from the transmission system.

Also according to an embodiment of the invention there is provided a method of forming elongate waveguide, comprising the steps:
forming a preform stack by stacking a plurality of elongate elements;
omitting, or substantially removing at least one elongate element from an inner region of the stack; and
heating and drawing the stack, in one or more steps, into a waveguide of a type described above as being according to the invention.

Also according to an embodiment of the invention there is provided a method of forming elongate waveguide for guiding light, comprising the steps:
(a) simulating the waveguide in a computer model, the waveguide comprising a core, comprising an elongate region of relatively low refractive index and a photonic bandgap structure arranged to provide a photonic bandgap over a range of wavelengths of light, the structure comprising elongate regions of relatively low refractive index interspersed with elongate regions of relatively high refractive index, including a boundary region of relatively high refractive index that surrounds, in a transverse cross-section of the waveguide, the core, wherein properties of the boundary region are represented in the computer model by parameters;
(b) finding a set of values of the parameters that, according to the model, increases or maximises how much of the light guided by the waveguide is in the regions of relatively low refractive index in the waveguide.

Also according to the invention, there is provided a method of forming elongate waveguide for guiding light, comprising the steps:
(a) simulating the waveguide in a computer model, the waveguide comprising a core, comprising an elongate region of relatively low refractive index, and a photonic bandgap structure arranged to provide a photonic bandgap over a range of frequencies of light, the structure comprising elongate regions of relatively low refractive index interspersed with elongate regions of relatively high refractive index, including a boundary region of relatively high refractive index that surrounds, in a transverse cross-section of the waveguide, the core, wherein properties of the boundary region are represented in the computer model by parameters;
(b) finding a set of values of the parameters that, according to the model, decreases or minimises the F-factor of the waveguide.

The boundary region may comprise, in the transverse cross-section, a plurality of relatively high refractive index boundary veins joined end-to-end around the boundary between boundary nodes, each boundary vein being joined between a leading boundary node and a following boundary node, and each boundary node being joined between two boundary veins and to a relatively high refractive index region of the photonic bandgap structure and at least one of the boundary veins comprising, along its length, a nodule, the nodule having a substantially elliptical shape in the transverse cross-section, such that an ellipse having a major axis of length L and a minor axis of length W substantially fits to the shape of the nodule in the transverse cross-section. The parameters for which values are found may comprise L and W.

Also according to an embodiment of the invention there is provided an elongate waveguide for guiding light comprising:
a core, comprising an elongate region of relatively low refractive index; and
an outer structure comprising elongate regions of relatively low refractive index interspersed with elongate regions of relatively high refractive index, including a boundary region comprising a continuous shell of relatively high refractive index that surrounds, in a transverse cross-section of the waveguide, the core;
characterized in that the boundary region comprises a feature or has a shape that is antiresonant at a wavelength of light guided in the waveguide.

The boundary region is a continuous shell of relatively high refractive index in that it does not comprise regions of relatively low refractive index: all relatively-high-index regions in the boundary are connected to each other only by relatively-high-index regions. The core is taken to be contiguous with the boundary region. The core thus comprises all connected regions of relatively low refractive index that are surrounded by the boundary region. The boundary region may be not smooth: it may for example be corrugated, with indented regions (for example, formed by omitting every other vein from an innermost polygon of the cladding, such as what would, if all veins were present, be an hexagon defining an hexagonal core), or it may have one two or more struts that project towards the center of the core (which struts may be of uniform thickness or may have nodules at some point along their length, for example at their ends). Thus, the core need not be of a regular cross section but may, for example, have projections and indentations defined by the boundary region.

Thus the boundary region may be corrugated with 2, 3, 4, 5, 6, 7, 8, 9, 10 or more recesses or indentations, which may be arranged at regular intervals around the center of the core.

The outer structure may exhibit a photonic band-gap. Even if the outer structure is not a photonic bandgap structure, any features set out above in relation to other aspects of the invention having a bandgap structure may be found in the present further aspect of the invention unless that is not physically meaningful.

The boundary region may have a different structure from the structure of the rest of the outer structure. For example, the regions of relatively high refractive index in the boundary region may be thicker or thinner than corresponding regions in the rest of the outer structure. The regions of relatively high refractive index may include nodes or nodules that are in different positions or have different sizes from corresponding features in the rest of the outer structure (it may be that there are no corresponding features in the outer structure or that there are such features in the outer structure but they are not present in the boundary region). The regions of relatively high refractive index in the boundary region may include a region of a different refractive index from the refractive index of corresponding region in the outer structure.

The boundary region may comprise a nodule. The boundary region may comprise 2, 3, 4, 5, 6, 7, 8, 9, 12 or more nodules, which may be arranged at regular intervals around the center of the core. The nodules may be arranged at the centers of veins, where each vein extends between two nodules.

Alternatively, the nodules may be arranged off-center on such a vein. The nodules may be arranged such that the waveguide has in cross-section no more than two-fold rotational symmetry. The waveguide may then be birefringent.

The outer structure may comprise a periodic array of unit cells. The core may be of a size larger than one such unit cell, larger than 7 such unit cells (which corresponds to a central cell and six surrounding cells in a hexagonal arrangement) or even larger than 19 such unit cells (which corresponds to a central cell and two rings of surrounding cells in a hexagonal arrangement). The waveguide may comprise a jacket around the outer structure.

It may be that the boundary region comprises more or fewer than six nodules.

Also according to an embodiment of the invention there is provided a photonic crystal fiber comprising:

an outer structure comprising a periodic array of unit cells, each unit cell comprising a central region of a vacuum or a fluid and an outer region of a solid material, the periodic array having a pitch $\Lambda$; and a core, comprising an elongate region of a vacuum or a fluid;

the outer structure including a boundary region comprising a plurality of veins of relatively high refractive index that surrounds, in a transverse cross-section of the waveguide, the core;

characterized in that the veins include nodules that are antiresonant at a wavelength of light guided in the waveguide.

The unit cells may be hexagonal. The central region of the unit cell may be air. The central region of the unit cell may be circular with a diameter d. The nodules may be elliptical in cross-section. The ellipse may have a major axis of length $5\Lambda/12$. The ellipse may have a minor axis of length $\Lambda/6$. The core may have the same size and shape as a group of seven unit cells of the outer structure. The waveguide may guide light in the C-band telecoms window, around 1550 nm (1530 nm to 1570 nm). The waveguide may guide light having a wavelength in the range 3 μm to 5 μm. The vacuum or fluid may fill the outer structure to a filling fraction of about 92%. The ratio d/$\Lambda$ may be about 0.97. The pitch $\Lambda$ may be about 3 μm. The diameter of the core may be about 9 μm. The unit cell central region diameter may be about 2.9. The veins may be of substantially constant thickness over about half their length. If the pitch $\Lambda$ is 3 μm when the waveguide is designed to operate at 1550 nm, then pitches may be found that are suitable for operation at other wavelengths in similar waveguide structures by scaling the pitch $\Lambda$ in proportion to the wavelength, i.e., a corresponding pitch for light of 3 μm would be 6 μm, if the filling fraction of the vacuum or fluid and the ratio d/$\Lambda$ remain constant and the refraction index is essentially unaltered.

Any of the features described above are applicable interchangeably to any of the above-described aspects of the invention (except where that is nonsensical).

BRIEF DESCRIPTION OF THE DRAWINGS

Embodiments of the present invention will now be described, by way of example only, with reference to the accompanying drawings, of which:

FIG. 1 is a diagram of a transverse cross section of a known PBG fiber structure;

FIGS. 12, 13 and 14 show mode intensity distribution plots for a number of modes for each of the structures in FIG. 5;

FIG. 15 shows four alternative PBG fiber structures;

FIG. 20b is a scanning electron micrograph (SEM) image of a portion of a PBG fiber made using the preform of FIG. 20a;

Figure 35B:
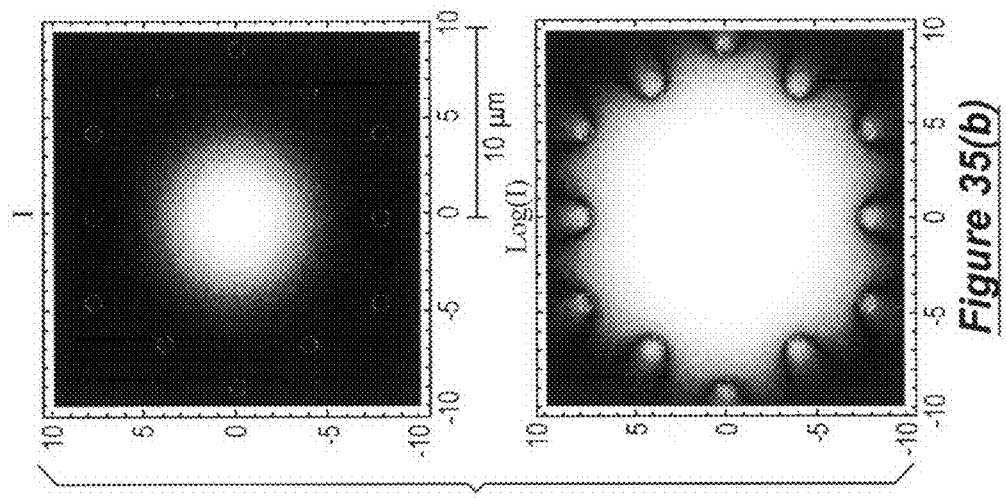
Figure 35A:
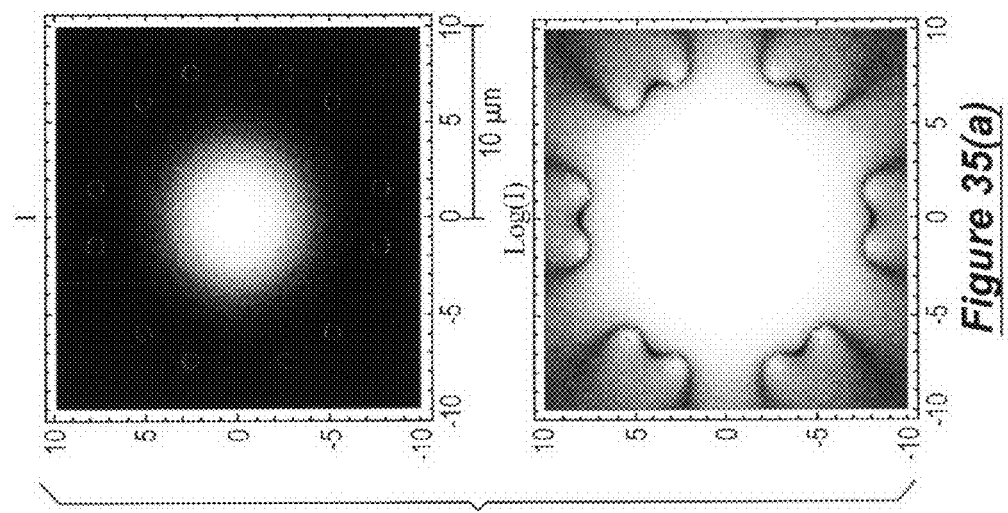
Figure 36:
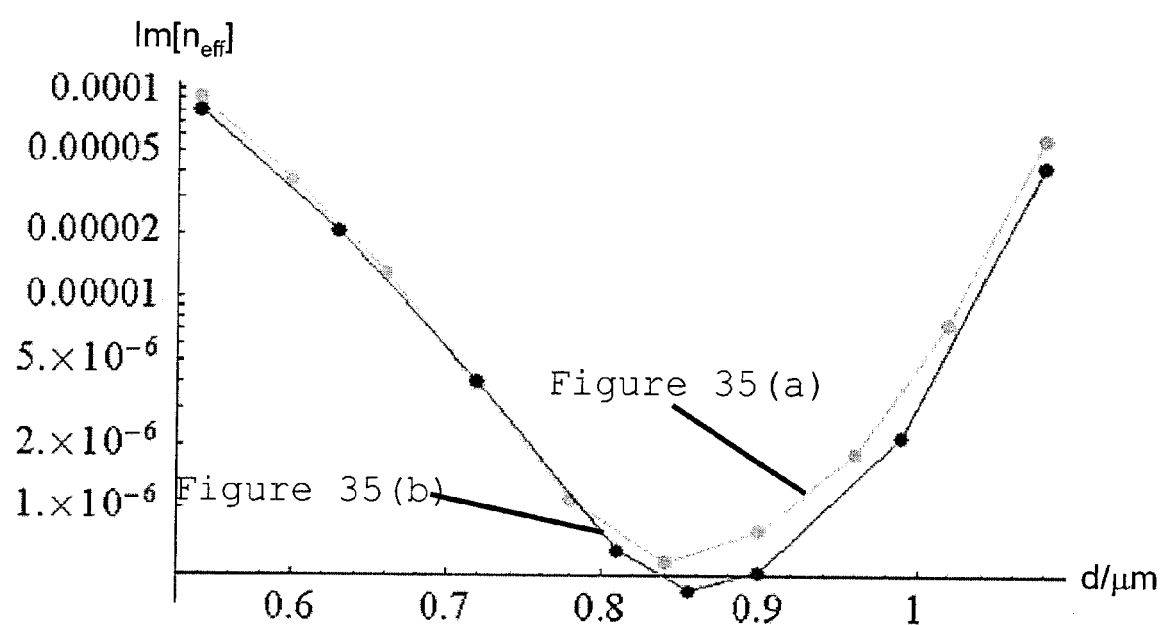
Figure 37:
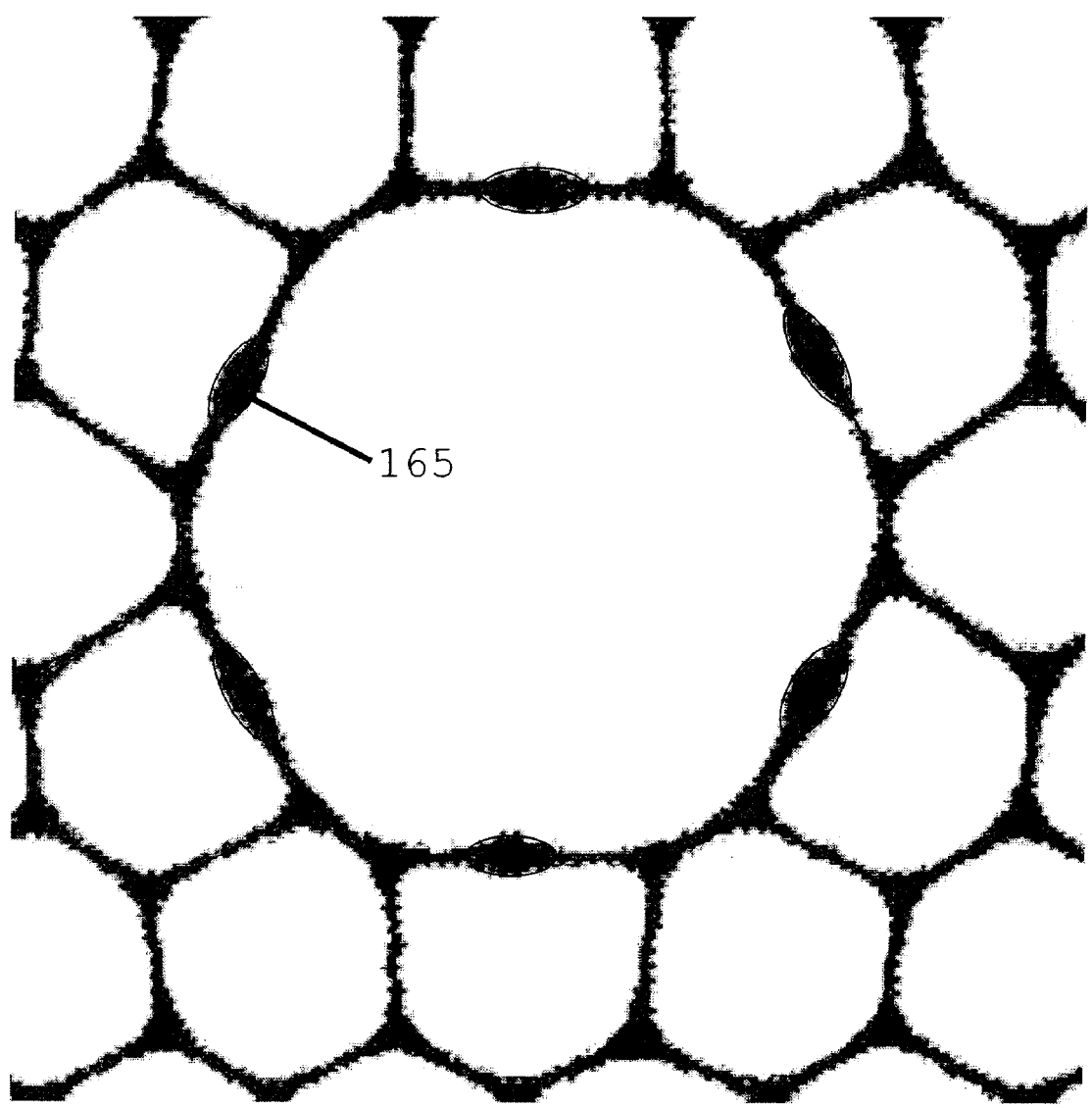
Figure 38:
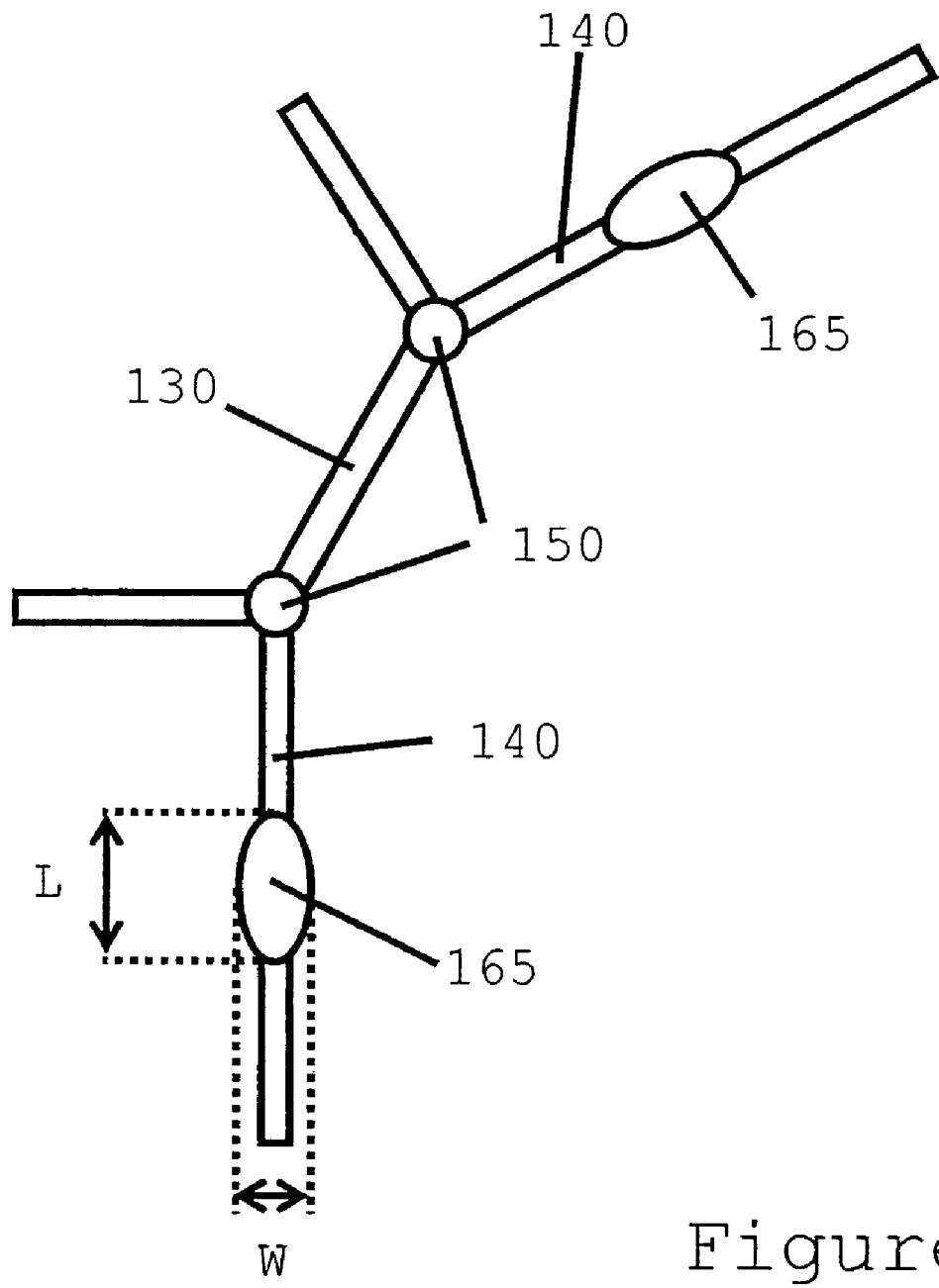
Figure 39:
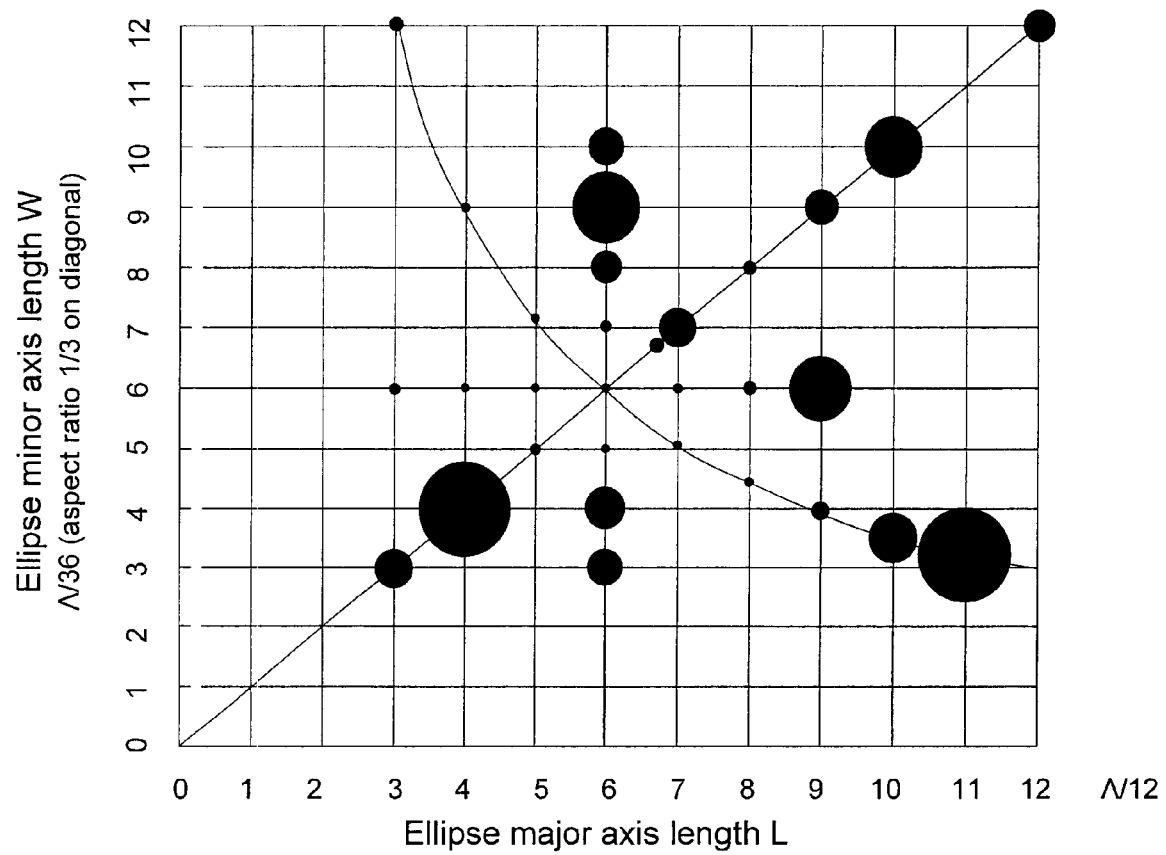
Figure 40:
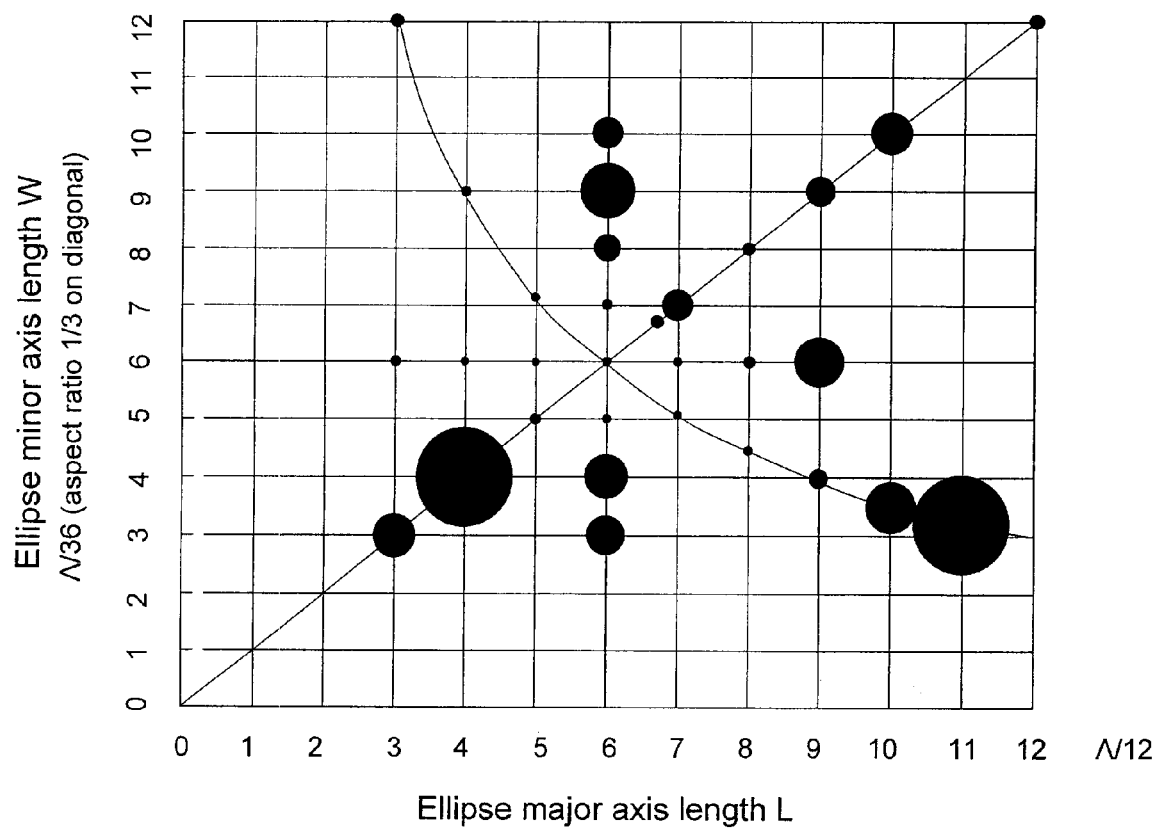
Figure 41A:
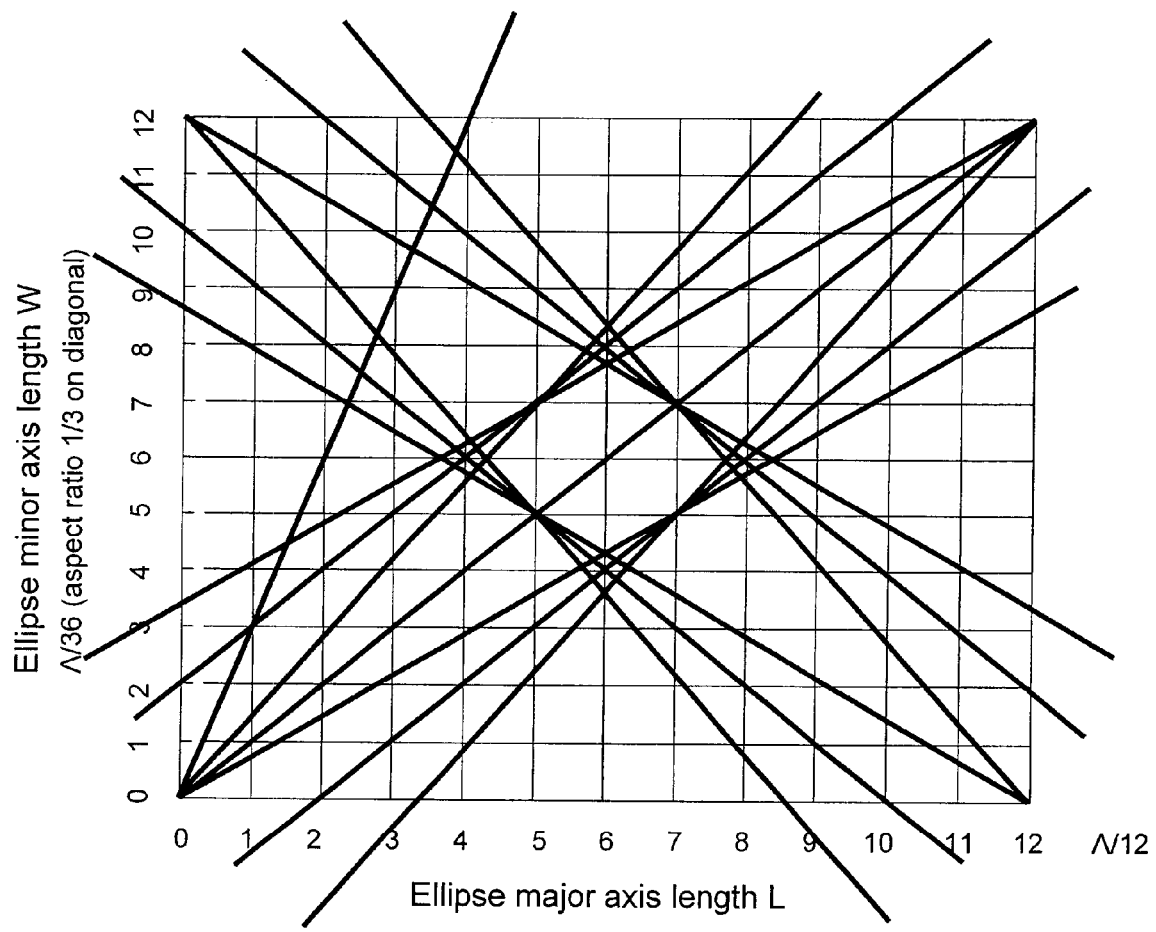
Figure 42:
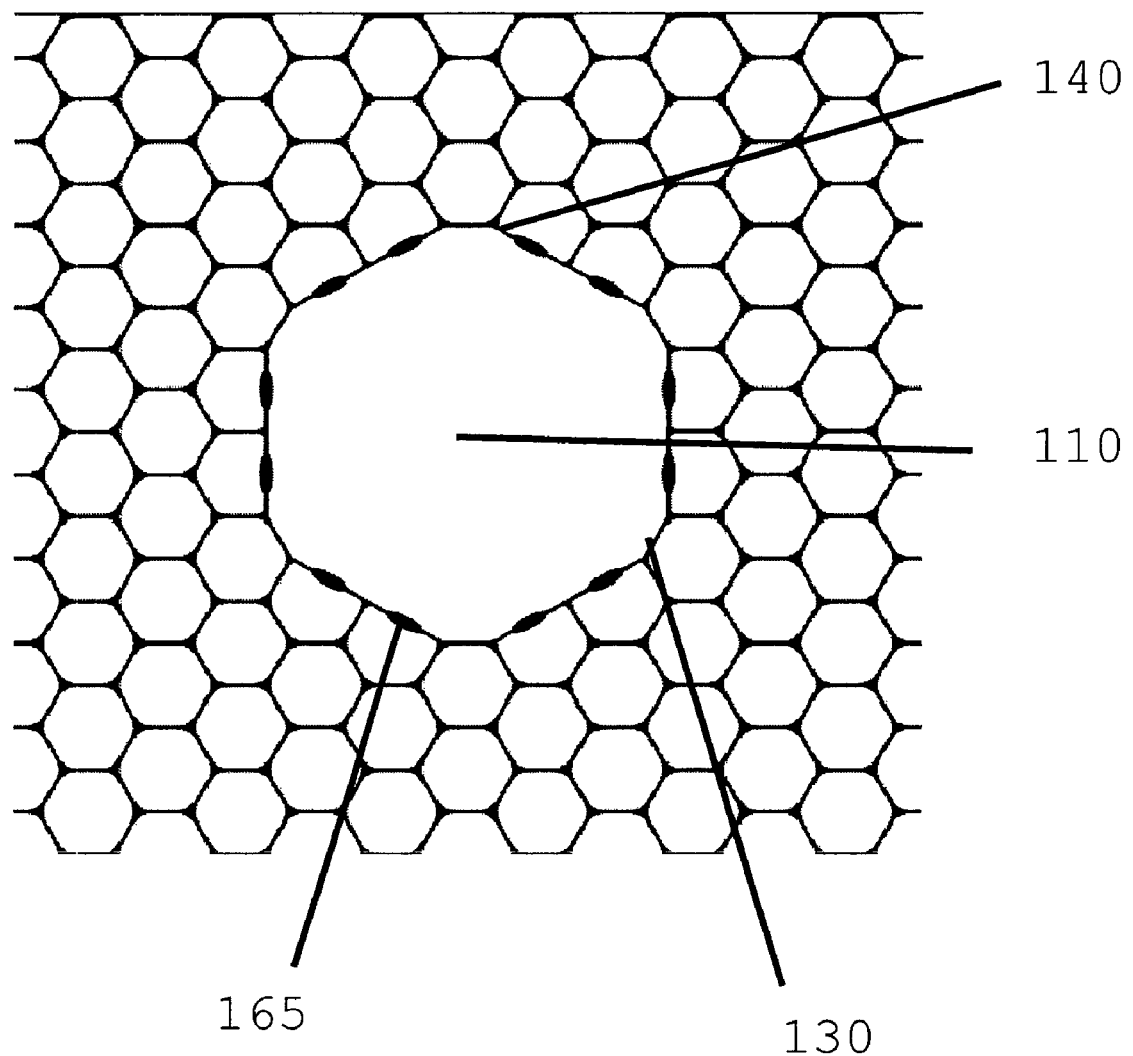
Figure 44:
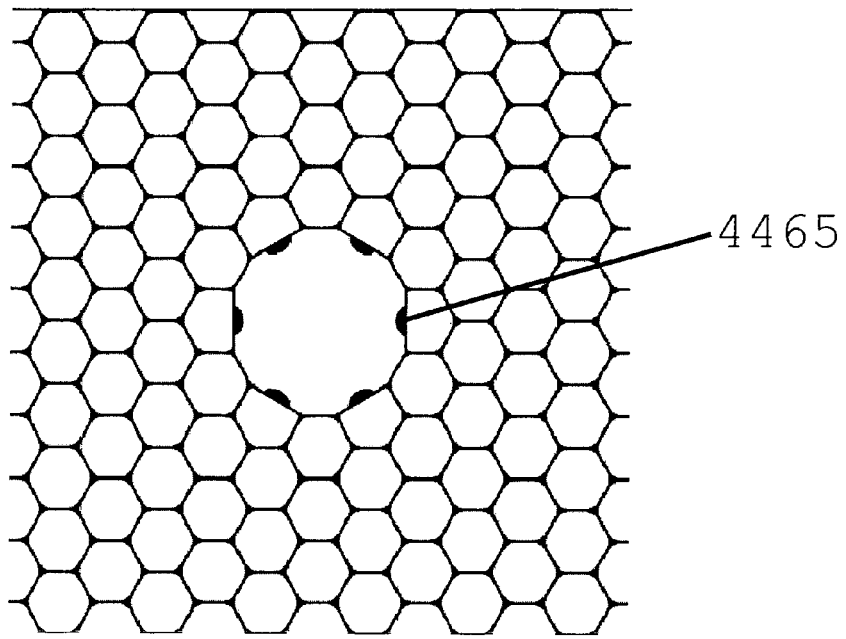
Figure 45:
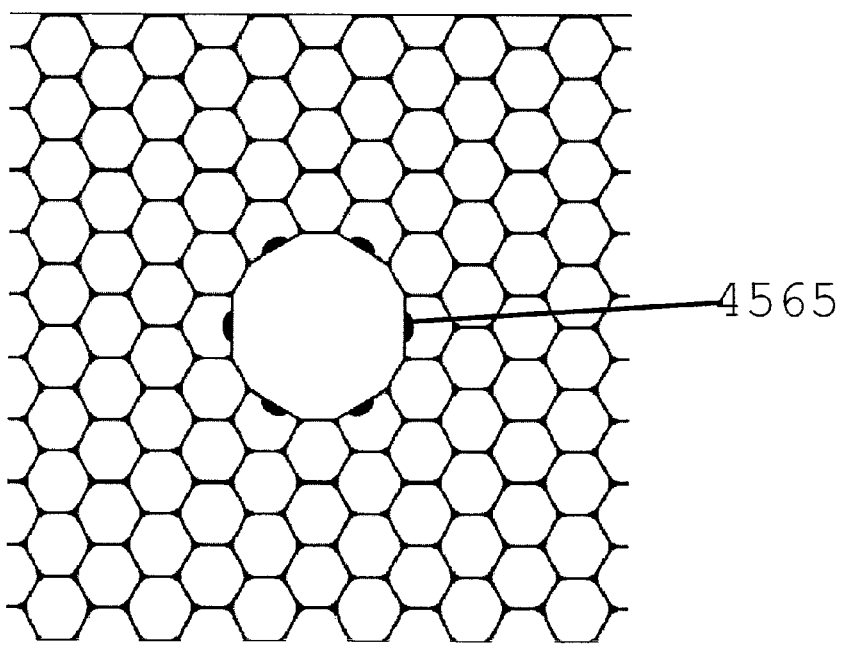
Figure 46:
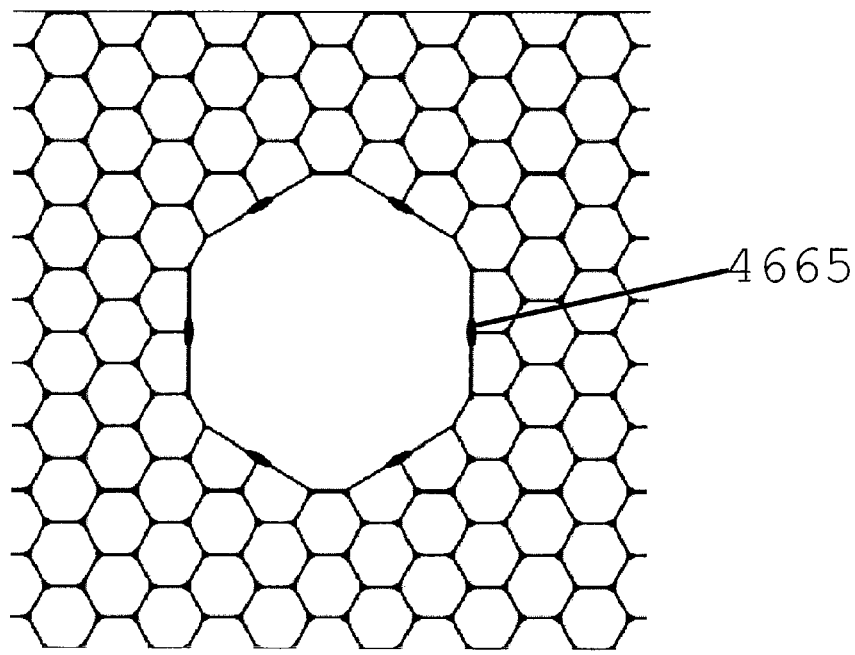
Figure 47:
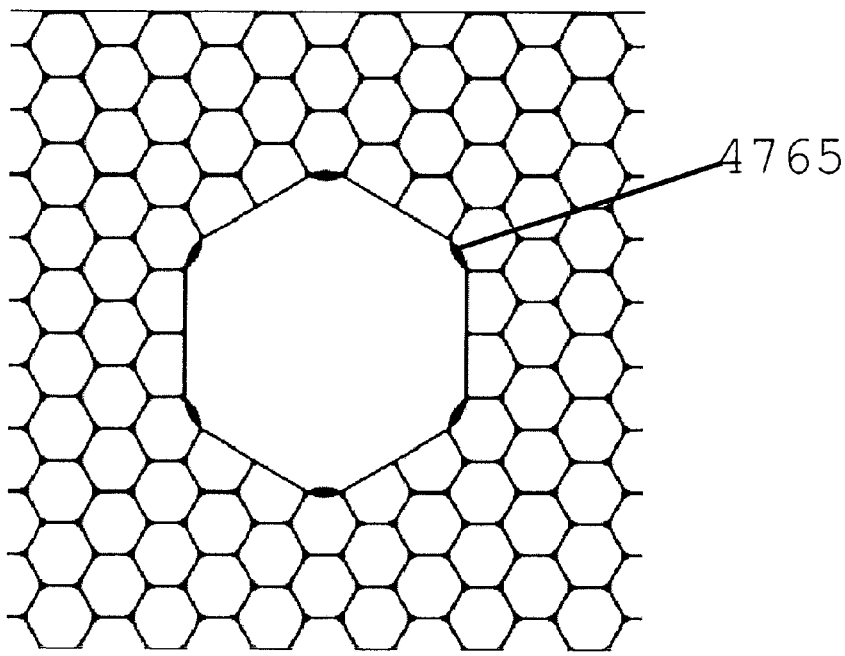
Figure 48:
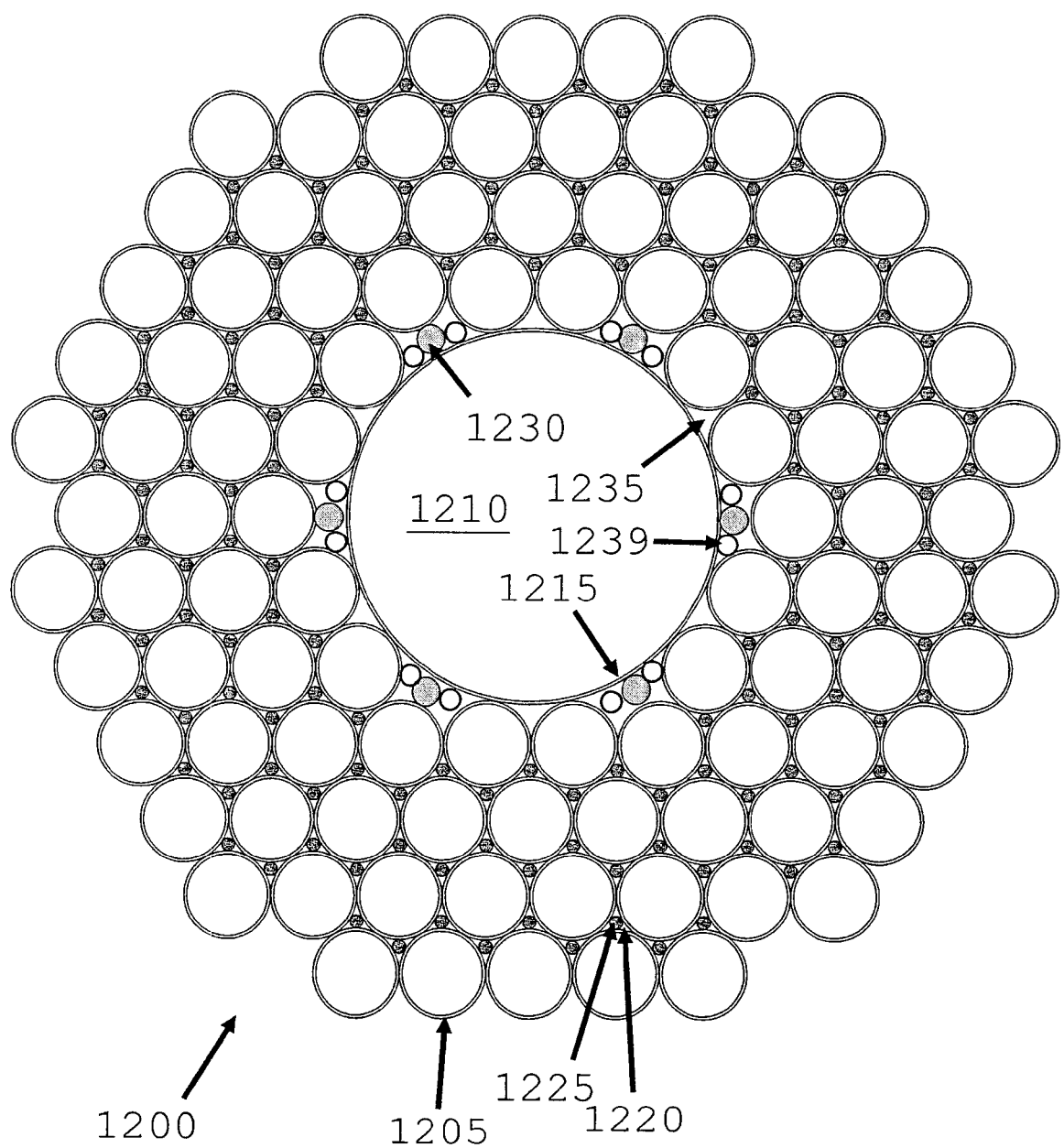
Figure 49A:
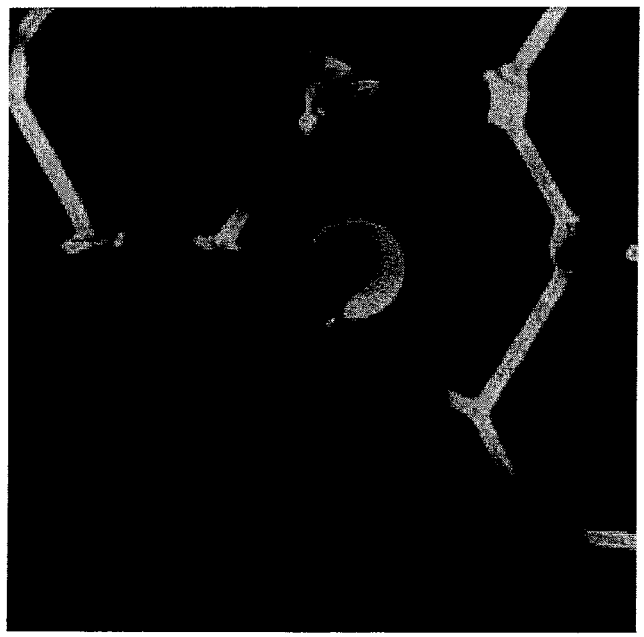
Figure 49B:
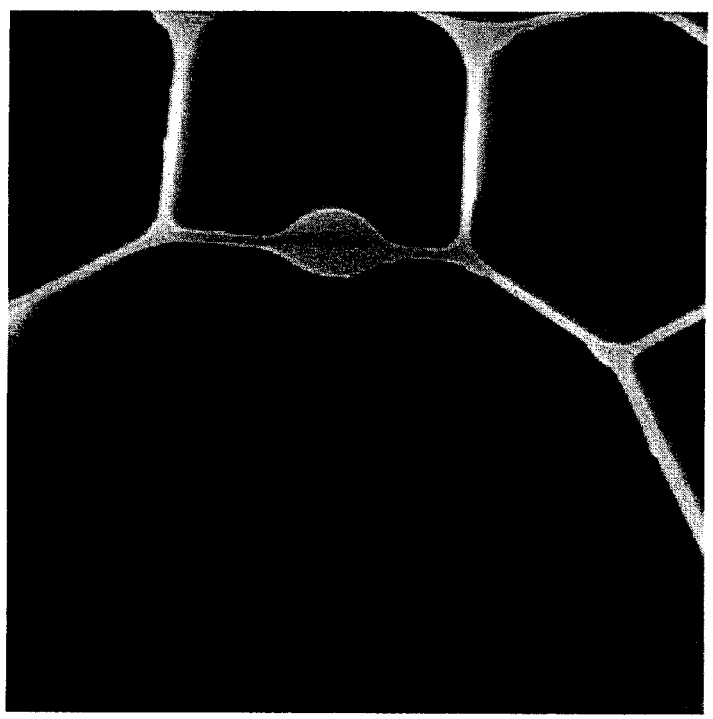

also shown is Im[β] for a dielectric ring of diameter R=4.5 μm vs. its thickness d;

FIG. 35 is a plot showing intensity profiles for two corral arrangements of silica cylinders at anti-resonance; the circles show the positions of the cylinder interfaces; the appearance of near nulls close to each cylinder interface is clear; the wavelength was chosen to be λ=1.55 μm;

FIG. 36 is a plot of the imaginary part of the effective mode index neff for a corral system comprising 12 identical silica cylinders in air arranged as in the two examples shown in FIG. 35, plotted as a function of the cylinder diameter d and an operating wavelength of λ=1.55 μm;

FIG. 37 is a diagram that illustrates how an ellipse is fitted to nodules in the structure of FIG. 1;

FIG. 38 is a diagram that illustrates how various physical characteristics of PBG fibers are defined herein;

FIG. 39 is a plot of fraction of light in air for a fiber according to an embodiment of the invention, the plot having axes showing lengths of the major axis L and the minor axis W of the ellipse of FIG. 38;

FIG. 40 is a plot of F-factor for a fiber according to an embodiment of the invention, the plot having axes showing lengths of the major axis L and the minor axis W of the ellipse of FIG. 38;

FIGS. 41(a) and (b) show various regions of interest in the L-W plane of FIGS. 39 and 40;

FIG. 42 is a diagram of a transverse cross section of a second PBG fiber structure according to an embodiment of the invention;

FIG. 43 is a plot of (i) field intensity (linear plot), (ii) azimuthally averaged field intensity (log. plot) and (iii) distribution of F-factor (linear plot) for ((a) and (b)) two orthogonal polarisation modes supported by the fiber of FIG. 42;

FIG. 44 is a diagram of a transverse cross section of a third PBG fiber structure according to an embodiment of the invention;

FIG. 45 is a diagram of a transverse cross section of a fourth PBG fiber structure according to an embodiment of the invention;

FIG. 46 is a diagram of a transverse cross section of a fifth PBG fiber structure according to an embodiment of the invention;

FIG. 47 is a diagram of a transverse cross section of a sixth PBG fiber structure according to an embodiment of the invention;

FIG. 48 is a diagram of another pre-form suitable for making a fiber according to embodiments of the present invention; and FIG. 49a is a microscope photograph of a glass rod attached to the outer periphery of a core boundary in a PBG fiber preform, suitable for forming an antiresonant bead in a PBG fiber structure and FIG. 49b is a scanning electron microscope image of such a bead in a PBG fiber.

BEST MODE FOR CARRYING OUT THE INVENTION, & INDUSTRIAL APPLICABILITY

FIG. 1 is a representation of a transverse cross-section of a fiber waveguide structure. In the Figure, the black regions represent fused silica glass and the white regions represent air holes in the glass. As illustrated, the cladding 100 comprises a triangular array of generally hexagonal cells 105, surrounding a seven-cell core defect 110. A core defect boundary 145 is at the interface between the cladding and the core defect. The core defect boundary has twelve sides—alternating between six relatively longer sides 140 and six relatively shorter sides 130—and is formed by omitting or removing seven central cells; an inner cell and the six cells that surround the inner cell. The cells would have typically been removed or omitted from a pre-form prior to drawing the pre-form into the fiber. As the skilled person will appreciate, although a cell comprises a void, or a hole, for example filled with air or under vacuum, the voids or holes may alternatively be filled with a gas or a liquid or may instead comprise a solid material that has a different refractive index than the material that surrounds the hole. Equally, the silica glass may be doped or replaced by a different glass or other suitable material such as a polymer, e.g. an organic polymer. For the sake of simplicity of description herein, however, the following exemplary embodiments are silica and air fibers.

This region of the cladding, although not shown in its entirety, typically extends outwardly to provide a specified degree of light confinement; where more cladding layers provide increased confinement. Typically, although not shown, there are further cladding layers surrounding the photonic band-gap structure. There may be an additional solid silica layer to provide strength and a coating layer to protect the silica and prevent light entering the fiber from the side, as in a normal fiber.

The waveguide of FIG. 1 has a substantially periodic structure comprising a triangular lattice of generally hexagonal holes. However, as discussed above, N. M. Litchinitser et al. have demonstrated that photonic bandgaps may be achieved in non-periodic structures. The properties of the core-cladding boundary are also important in non-periodic PBG structures and the invention is not limited to substantially periodic structures but encompasses structures with some or even a high degree of aperiodicity or irregularity in the cladding structure. However, the exemplary embodiments illustrated hereafter use a triangular lattice of the kind shown in FIG. 1, which will be familiar to the skilled artisan, in order not to obscure the present invention.

Hereafter, and with reference to FIG. 1, a region of glass 115, 175 between any two holes is referred to as a "vein" and a region of glass 120 where at least three veins meet is referred to as a "node".

A vein can be generally characterised by its transverse, cross-sectional length and thickness at a midpoint between the two nodes to which it is attached. Veins tend to increase in thickness from their midpoint to the nodes, although a region of substantially constant thickness at the middle of the vein tends to appear and then increase in length with increasing air-filling fraction. Nodes can be generally characterised by a transverse cross-sectional diameter, which is the diameter of the largest inscribed circle that can fit within the node. In the fiber structures investigated herein, node diameter is typically larger than the thickness of the veins attached to the node.

The core defect boundary 145 comprises the inwardly-facing veins of the innermost ring of cells that surround the core defect 110.

In practice, for triangular lattice structures that have a large air-filling fraction, for example above 75%, most of the cladding holes 105 assume a generally hexagonal form, as shown in FIG. 1, and the veins are generally straight.

Figures 2A, 2B:
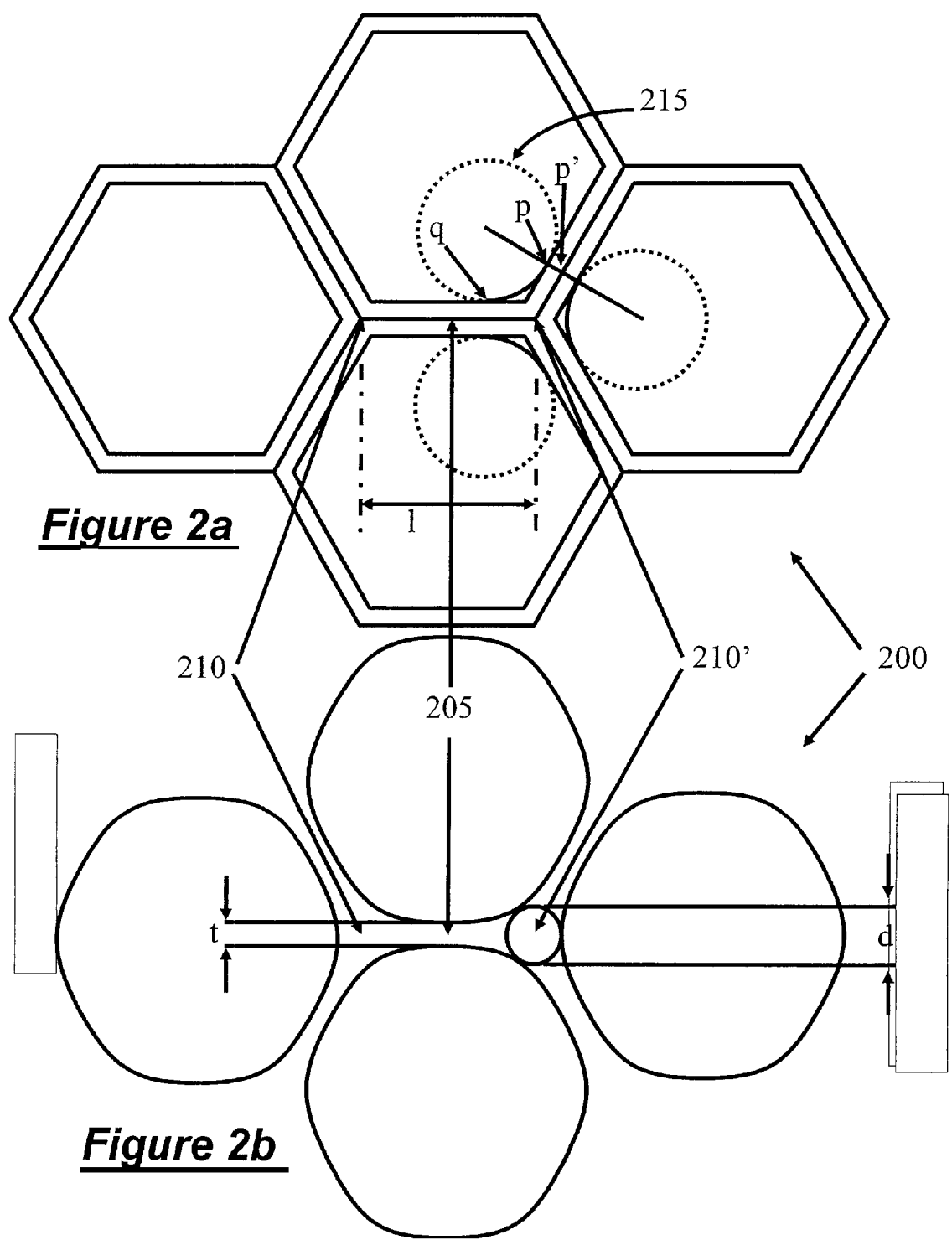
FIG. 2 is a diagram which illustrates how various physical characteristics of PBG fibers are defined herein.

FIGS. 2a and 2b are diagrams which illustrate how various dimensions of the cladding structure of FIG. 1 are defined herein, with reference to four exemplary cladding cells 200.

For the present purposes, a node 210' in the cladding, which is referred to herein as a "cladding node", is said to have a diameter measurement d defined by the largest diameter of inscribed circle that can fit within the glass that forms the node. A vein 205 in the cladding, which is referred to herein as a "cladding vein", has a length l, measured along its center-line between the circles of the cladding nodes 210 & 210' to which the cladding vein is joined and a thickness, t, measured at its mid-point between the respective cladding nodes. Generally, herein, veins increase in thickness towards the nodes to which they are joined.

The mid-point of a cladding vein is typically the thinnest point along the vein. Unless otherwise stated herein, generally, a specified vein thickness is measured at the mid-point of the vein between the two nodes to which the vein is joined.

According to FIG. 2, a cladding node is surrounded by three notional circular paths 215, each one being positioned between and abutting a different pair of neighboring cladding veins that join the node. These three paths, in effect, define the 'roundness' of the corners of the cladding holes and abut the notional inscribed circle that defines the diameter of the respective node. More particularly, the periphery of the node between each pair of veins is defined by the portions of the circular paths 215 which begin at a point p and end at a point q along first and second veins respectively. Points p and q are equidistant from the center of the node 210'. It will be appreciated that the diameter, d, of the node 210' is a function of the thickness, t, of the veins, the distance of p from the center of the node and the pitch Λ, or center to center distance between neighboring cells, of the structure.

The cells forming the innermost ring around the boundary of the core defect, which are referred to herein as "boundary cells", have one of two general shapes. A first kind of boundary cell 125 is generally hexagonal and has an innermost vein 130 that forms a relatively shorter side of the core defect boundary 145. A second kind of boundary cell 135 has a generally pentagonal form and has an innermost vein 140 that forms a relatively longer side of the core defect boundary 145.

Referring again to FIG. 1, there are twelve boundary cells 125, 135 and twelve nodes 150, which are referred to herein as "boundary nodes", around the core defect boundary 145. Specifically, as defined herein, there is a boundary node 150 wherever a vein between two neighboring boundary cells meets the core defect boundary 145. In FIG. 1, these boundary nodes 150 have slightly smaller diameters than the cladding nodes 160. Additionally, there is an enlarged region 165, "bead" or "nodule", of silica at the mid point of each relatively longer side of the core defect boundary 145. These nodules 165 coincide with the mid-point along the inner-facing vein 140 of each pentagonal boundary cell 135. The nodules 165 may result from a possible manufacturing process used to form the structure in FIG. 1, as will be described in more detail below. For the present purposes, the veins 130 (170) & 140 that make up the core defect boundary are known as "boundary veins".

In the prior art, photonic band-gap fibers typically comprise either plural concentric layers of dielectric material surrounding a core, to form an omni-directional waveguide, or a microstructured photonic band-gap cladding, comprising a triangular lattice of hexagonal holes, surrounding a core region. In the latter kind of band-gap fiber, there is a core defect boundary but the shape and form of the boundary has typically been a simple function or artefact of the pre-form and manufacturing process used to make the fiber.

As will be described below, it is possible to control the diameters of particular nodes and the existence or size of beads or nodules along the core defect boundary during manufacture of a fiber.

The structure in FIG. 1 and each of the following examples of different structures closely resemble practical optical fiber structures, which have either been made or may be made according to known processes or the processes described hereinafter. The structures share the following common characteristics:

a pitch Λ of the cladding chosen between values of approximately 3 μm and 6 μm (this value may be chosen to position core-guided modes at an appropriate wavelength for a particular application);

a thickness t of the cladding veins of 0.0586 times the chosen pitch Λ of the cladding structure (or simply 0.0586Λ);

an AFF in the cladding of approximately 87.5%; and a ratio R having a value of about 0.5.

Referring to FIG. 2, R is defined as the ratio of the distance of p' from the center of the nearest cladding node to half the length of a cladding vein, l/2; where p' is a point along the center-line of a cladding vein and is defined by a construction line that passes through the center-line of the vein, the center of circle 215 and the point p where the circle meets the vein.

In effect, R is a measure of the radius of curvature of the corners of the hexagonal cells within the cladding. It will be apparent that the maximum practical value of R is 1, at which value the radius of curvature is a maximum and the cladding holes are circular. The minimum value of R is dictated by the thickness t and length l of the veins and is the value at which the diameter of the circle 215 tends to zero and the cladding holes are hexagonal.

For all values of R below the maximum value, the veins appear to have a region of generally constant thickness about their mid-points, which increases in length with decreasing R. For example, a value of R=0.5 provides that around half the length of a vein, about its mid-point, has a substantially constant thickness. Likewise, a value of R=0.25 provides that around three quarters of the length of a vein, about its mid-point, has a substantially fixed thickness.

Given R, t and Λ, for practical purposes, the diameter d of the cladding nodes is found to be approximately:

$$d = \frac{2R\Lambda}{\sqrt{3}} - \Lambda R + t \quad \text{(Equation 1)}$$

In FIG. 1, the diameter of each boundary node 150, $d_e$, is smaller than the diameter of the cladding nodes 160, due to there being less glass available at the boundary for forming the nodes. A model similar to that shown in FIG. 2 may if required be used to define the form of the boundary nodes. The differences between FIG. 2 and the model for the boundary nodes are (1) the boundary node model includes the core defect 110 and two boundary cells rather than three cladding cells, (2) it is assumed that the value of R is a minimum, such that there is no measurable circular path inside the core defect 110; and, (3) the internal angles of the core defect and the boundary cells are different from each other and from the cells in the cladding.

The beads 165 shown in FIG. 1 are substantially oval shaped, each having a major dimension which is approximately ⅓ the length of the distance between the two node centers that lie on either side of the bead and a minor dimension which is ⅓ the length of the major dimension. The minor dimension of the bead, which defines the thickness of the associated vein at its mid-point, is slightly longer than the diameter of the respective boundary nodes 150.

For boundary veins with no beads, the thickness at the mid-point of the vein between boundary nodes is the same as the thickness of the cladding veins at the same point.

The present inventors have determined that it is possible to control the performance of PBG fibers in particular by aiming to maximise the amount of light that propagates in air within the fiber structure, even if some light is not in the core, in order to benefit from the properties of PBG fibers, such as reduced absorption, non-linearity and, in addition, reduced mode coupling.

For the purposes of comparing aspects of the performance of various different structures it is useful to consider the modes that are supported in the band gap of various PBG fiber structures. This may be achieved by solving Maxwell's vector wave equation for the fiber structures, using known techniques. In brief, Maxwell's equations are recast in wave equation form and solved in a plane wave basis set using a variational scheme. An outline of the method may be found in Chapter 2 of the book "Photonic Crystals—Molding the Flow of Light", J. D. Joannopoulos et al., ©1995 Princeton University Press.

Figure 3:
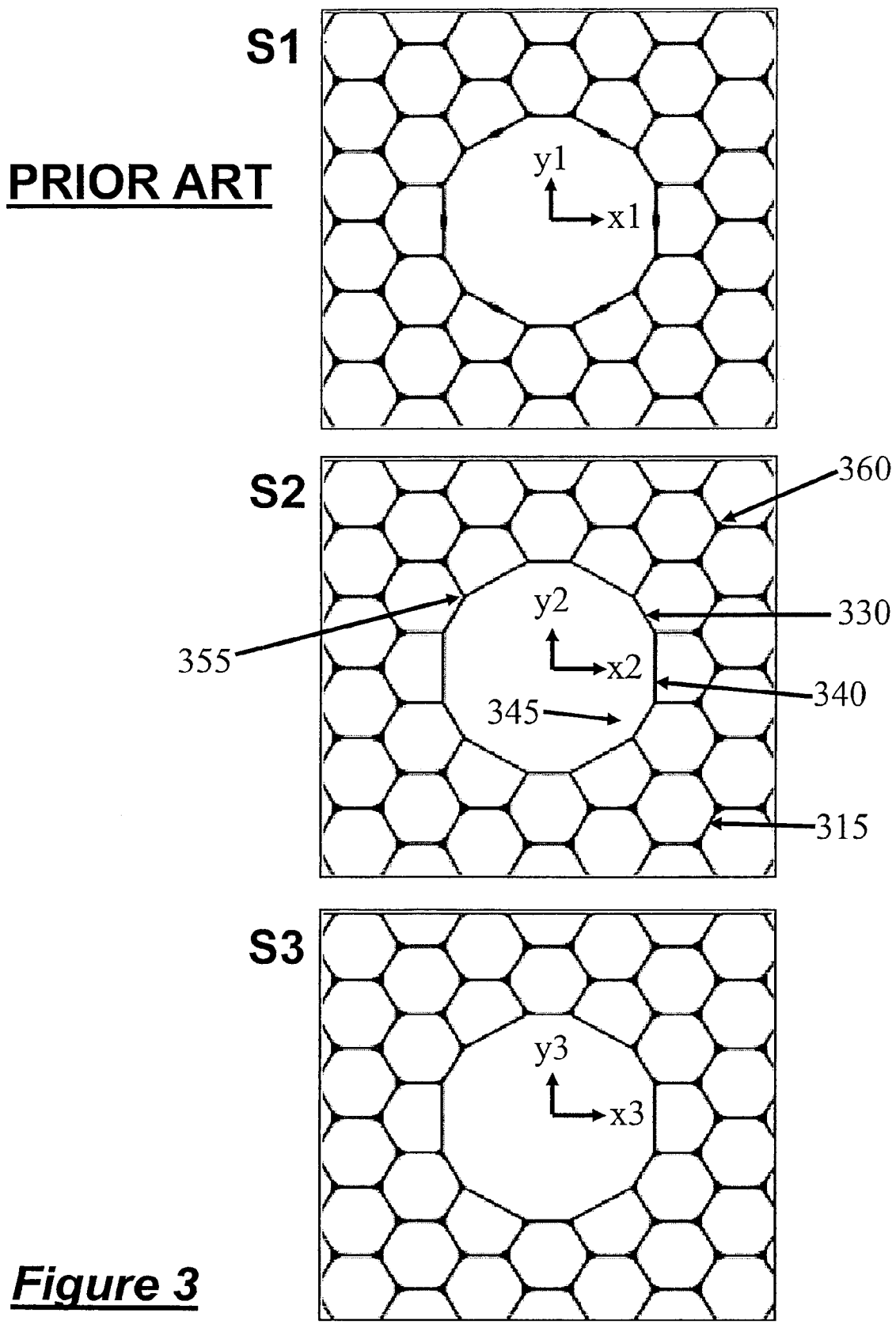
FIGS. 3, 4 and 5 show diagrams of various examples of PBG fiber structures.
Figure 4:
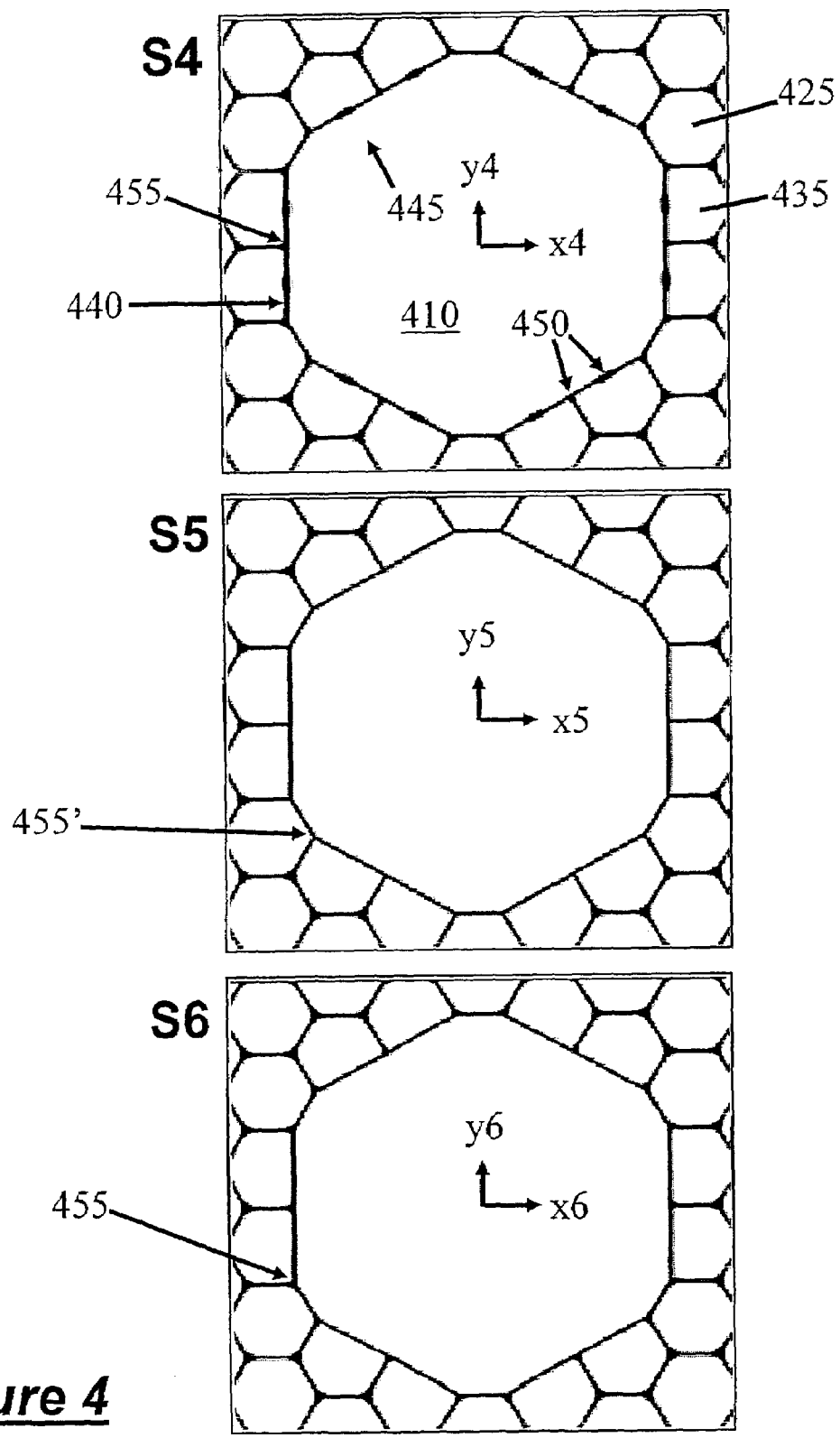

FIGS. 3 and 4 illustrate six exemplary PBG fiber structures that will be considered hereafter. FIG. 3 illustrates three structures identified as S1, S2 and S3 herein, which are seven-cell core defect structures. S1 is the same as the structure illustrated in FIG. 1 and is reproduced in FIG. 3 for convenience only. S2 and S3 reinforce various characteristics of the invention, as determined by the present inventors, and, in particular, are discussed herein in order to illustrate how the mode spectrum of a given structure may vary significantly without varying the size of the core defect but, instead, varying different core defect boundary characteristics.

FIG. 4 illustrates three structures identified as S4, S5 and S6, each having a nineteen-cell core defect. S4 is an exemplary embodiment of the present invention. S4, S5 and S6, apart from core defect size, have the same cladding characteristics as S1, S2 and S3 respectively. S1 to S3 have a maximum core defect radius of about 1.5Λ. In contrast, S4 to S6 have a maximum core defect radius of about 2.5Λ.

The characteristics of structures S2 to S6 will now be described in further detail.

There are a number of differences between the form of the core defect boundary in S1 and the boundary in S2. S2 has reduced boundary node diameters, which are significantly smaller than the cladding nodes 360, compared with S1, and no apparent beads along the core defect boundary 345. According to the definitions provided herein, the boundary nodes 355 in S2 have a minimum diameter; the associated values of R are at a minimum and, accordingly, there are no measurable circular paths defining the periphery of the nodes. The diameters of the boundary nodes 355 in S2 are only very slightly larger than the thickness of the boundary veins 330, 340. In contrast, as for S1, the cladding nodes 360 have diameters that are significantly larger than the thickness of their adjoining veins 315.

It may in practice be difficult to make the exact structure of S2 due to surface tension effects acting on the glass during the drawing process, which may cause the cladding veins to meet the boundary veins at slightly rounded corners; meaning R is not its theoretical minimum. However, it is useful to compare the characteristics of S2 with the other structures herein. Structures closely resembling S2, however, can be made according to a method that will be described in detail below.

The boundary in S3 has no apparent beads, as in S2, and the boundary nodes 355 have a similar diameter to those in S1.

The structure in S4 has an additional ring of cladding cells removed from around the core defect compared with S1. This forms a core defect 410 equivalent to nineteen missing cladding cells. Similar to S1, S4 has boundary nodes 450 that are significantly larger in diameter than the thickness of the respective boundary veins and there are hexagonal cells 425 at each corner of the core defect 410. However, in contrast to S1, which has one generally pentagonal cell along each side of the core defect boundary 145, S4 has two generally pentagonal cells 435 along each side of the core defect boundary 445. In addition, there are two beads 455 along each side of the core defect boundary 445, roughly coincident with the mid-point of the vein 440 of each pentagonal cell 425 that borders the core defect boundary 445. The minor dimension of each bead is slightly longer than the diameter of the nodes to which each respective vein is joined. There are also three boundary nodes 455 per relatively longer side of the core defect boundary 445, compared with two for the seven-cell core defect structures. Overall, S4 has eighteen cells sharing veins with the core defect boundary 445. S4 represents an exemplary embodiment of the present invention.

The boundary in S5 is similar to S2 in the respect that it has reduced-diameter boundary nodes 455', which do not have diameters that are significantly larger than the thickness of the respective veins, and there are no apparent beads. All other parameters of S5 are the same as S4. S5 represents an exemplary embodiment of the present invention.

The boundary in S6 has no apparent beads, as in S3, and the boundary nodes 455 have a similar diameter to those in S1. All other parameters of S6 are the same as S4. S6 represents an exemplary embodiment of the present invention.

Figure 5:
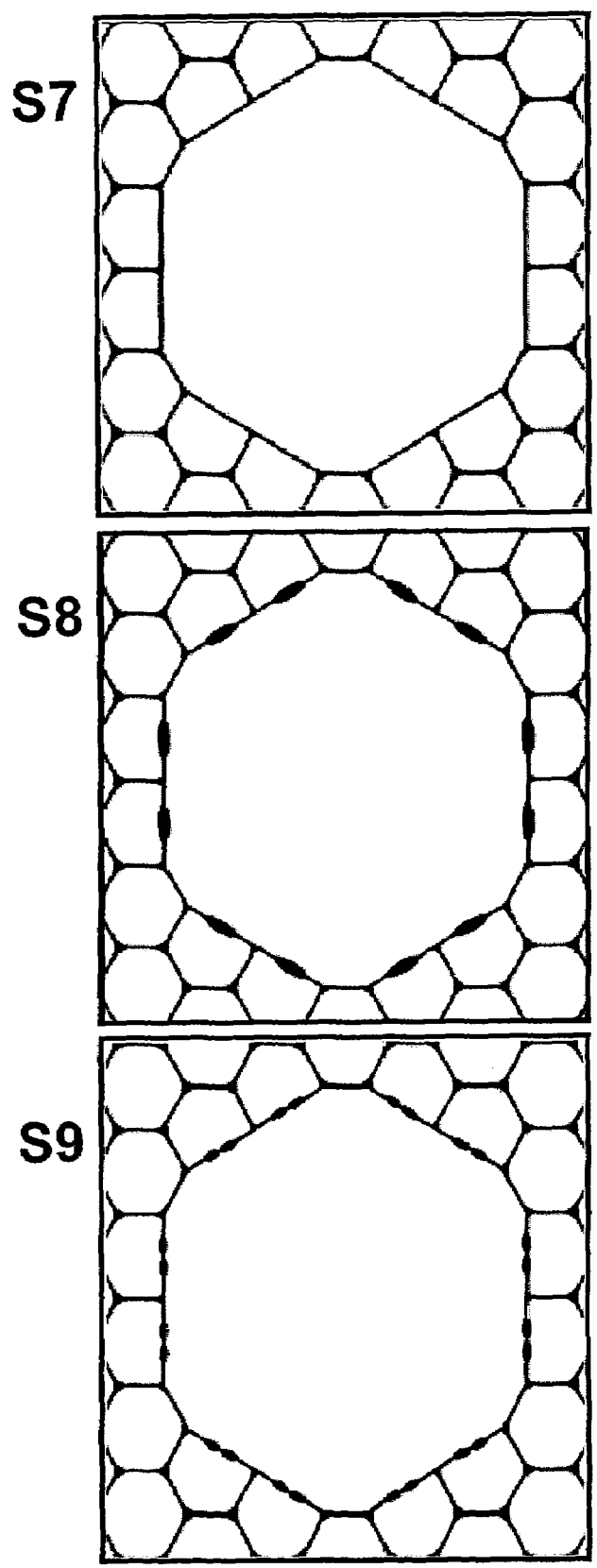

FIG. 5 illustrates three further nineteen-cell core defect structures, S7, S8 and S9, which have cladding arrangements very similar to those of structures S4-S6. The latter two structures are embodiments of the present invention. Structure S7 has no beads around the core defect boundary, S8 has enlarged beads around the core defect boundary (compared with the beads in S4) and S9 has two smaller beads in place of the single beads per vein of S8. Structures S8 and S9 are embodiments of the present invention.

Figure 6:
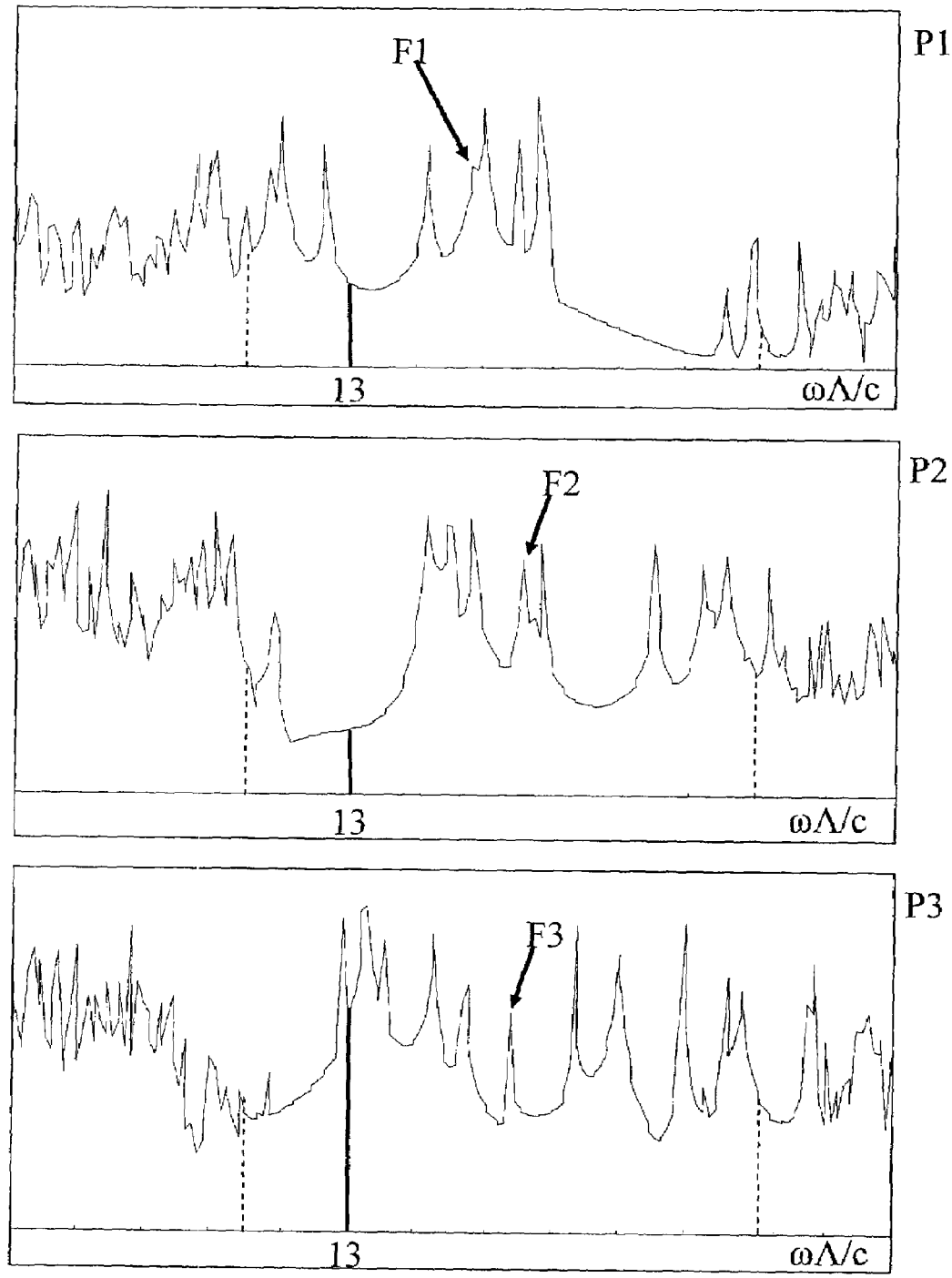
FIGS. 6 and 7 show mode spectra plots for the PBG fiber structures of FIGS. 3 and 4.
Figure 7:
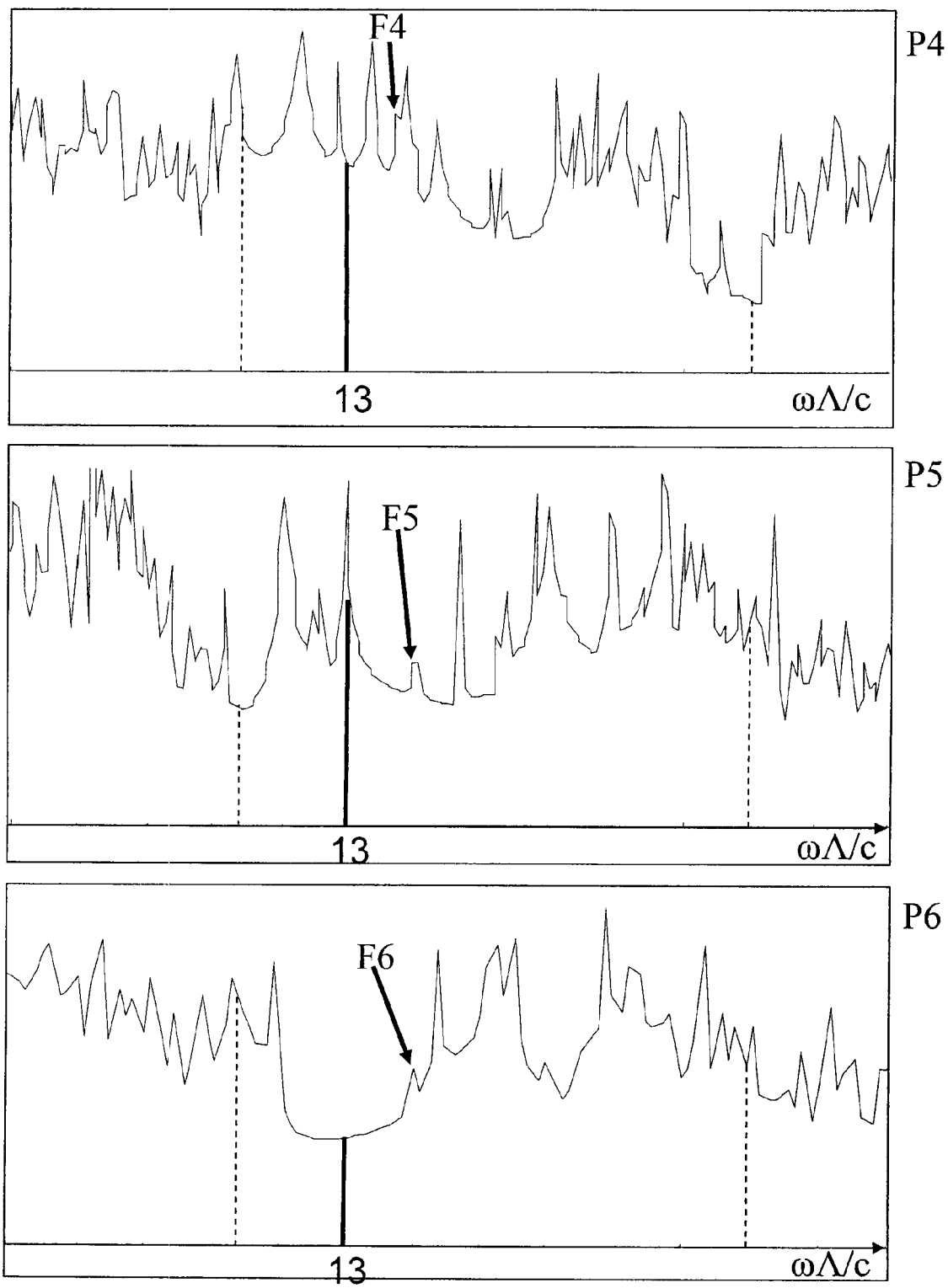

FIGS. 6 and 7 each show three mode spectra, identified as P1 to P3 and P4 to P6 respectively. Each spectrum P1 to P6 relates to a respective PBG fiber structure S1 to S6. The horizontal axis of each spectrum is normalised frequency, $\omega\Lambda/c$, where $\omega$ is the frequency of the light, $\Lambda$ is the pitch of the cladding structure, and c is the speed of light in a vacuum. The vertical axis of each spectrum relates to the response of the structure to a given input for a given normalised wave-vector $\beta\Lambda=13$, against which the spectrum is plotted, where $\beta$ is the chosen propagation constant for the calculations. The spectra are produced using a Finite-difference Time Domain (FDTD) algorithm, which computes the time-dependent response of a given hollow core structure to a given input. This technique has been extensively used in the field of computational electrodynamics, and is described in detail in the book "Computational Electrodynamics: The Finite-Difference Time-Domain Method", A. Taflove & S. C. Hagness, ©2000 Artech House. The FDTD technique may be readily applied to the field of PBG fibers and waveguides by those skilled in the art of optical fiber modelling.

With reference to spectra P1 to P6, each vertical spike indicates the presence of at least one mode at a corresponding normalised frequency. In some cases, multiple modes may appear as a single spike or as a relatively thicker spike compared with other spikes in a spectrum. This is due to the fact that the data used to generate the spectra is not of a high enough resolution to distinguish very closely spaced modes. As such, the mode spectra should be taken to provide only an approximation to the actual numbers of modes that exist for each structure, which is satisfactory for enabling a general comparison between spectra herein.

On each spectrum, a 'light line' for the respective structure is shown as a solid vertical line at $\omega\Lambda/c=13=\beta\Lambda$, and band edges, which bound a bandgap, are represented as two dotted vertical lines, one on either side of the light line, with a lower band edge of the bandgap at around $\omega\Lambda/c=12.92$ and an upper band edge of the bandgap at around $\omega\Lambda/c=13.30$. A bandgap in P1 to P6 is a range of frequencies of light for a given $\beta$. For the present examples, the bandgap is slightly wider than 0.35 (in units of $\omega\Lambda/c$). The inventors estimate that the minimum practical width for a PBG fiber bandgap would be around 0.05 in the present units of measure but, more preferably, would be greater than 0.1.

Modes that are between the light line and the lower band edge (that is, to the left of the light line) will concentrate in the glass and be evanescent in air whereas the modes that are between the light line and the upper band edge (that is, to the right of the light line) may be air-guiding.

As shown in P1, relating to S1, there are around three modes between the light line and the lower band edge and around nine modes between the light line and the upper band edge (taking the thicker spikes as two modes). It is clear that S1 supports a significant number of modes, some of which could be air-guiding; although, it is unlikely that all of these modes will be excited by a given light input. Analysis of the individual modes shown in the bandgap of P1 leads to a finding that the mode marked as F1 is an air-guiding mode, which most closely resembles the form of a fundamental mode in a typical standard optical fiber and supports the maximum amount of light in air. The mode is found to be degenerate, being one of a pair of very similar modes falling at about the same position in the bandgap.

As shown in P2, relating to S2, approximately two modes lie between the light line and the lower band edge and there are around twelve modes between the light line and the upper band edge. As with S1, S2 supports a significant number of modes, some of which could be air-guiding. The mode marked F2 in P2 is found to be a degenerate, air-guiding mode that most closely resembles the form of a fundamental mode in a typical standard optical fiber and supports the maximum amount of light in air.

The structural characteristics of S2 are not that different from those of S1; the only differences being the reduced boundary node sizes in S2 and omission of the beads. Notably, the core defect diameters of the two structures are the same. However, the mode spectra for the two structures are significantly different, there being more potentially-air-guiding modes supported by S2 but fewer modes that are evanescent in air.

As shown in P3, relating to S3, there are around three modes between the light line and the lower band edge and around thirteen modes between the light line and the upper band edge. Again, it is clear that S3 supports a significant number of modes, some of which could be air-guiding. The mode marked F3 in P3 is a degenerate, air-guiding mode that most closely resembles the form of a fundamental mode in a typical standard optical fiber and supports the maximum amount of light in air.

Again, the structural characteristics of S3 are only subtly different from those of either S1 or S2, with the core defect diameters of all structures being the same. However, the mode spectrum for S3 is, once more, significantly different from the mode spectra of either S1 or S2.

As shown in P4, relating to S4, which is a nineteen-cell core defect structure, there are approximately two to four modes between the light line and the lower band edge and in excess of twenty modes between the light line and the upper band edge of the bandgap region. Clearly, S4 appears to support significantly more modes than any of the foregoing seven-cell core defect structures. The mode marked F4 in P4 is again a degenerate, air-guiding mode that most closely resembles the form of a fundamental mode in a typical standard optical fiber and supports the maximum amount of light in air.

The core defect diameter of S4 is significantly larger than in S1, whereas the other parameters are substantially the same. On the basis of prior art thinking it is not a surprise that there appear to be significantly more modes supported in the nineteen-cell core defect structure of S4 than in any of the seven-cell core defect structures S1 to S3.

As shown in P5, relating to S5, there are approximately four modes between the light line and the lower band edge and around fifteen to twenty modes between the light line and the upper band edge. Again, S5 appears to support significantly more modes than the foregoing seven-cell core defect structures. The mode marked F5 in P5 is a degenerate, air-guiding mode that most closely resembles the form of a fundamental mode in a typical standard optical fiber and supports the maximum amount of light in air.

The mode spectra for S4 and S5 are similar in terms of numbers of modes, with both structures supporting a number of evanescent and possibly air-guiding modes.

As shown in P6, relating to S6, there is a single mode between the light line and the lower band edge and approximately twelve to fifteen modes between the light line and the upper band edge. Thus, S6 appears to support significantly fewer modes than either of S4 or S5, even though the core defect sizes are the same. Surprisingly, the mode spectrum of S6 appears to resemble, in both numbers and positions of modes, the mode spectrum of S2, which is a seven-cell core defect structure. This is contrary to prior art thinking, which indicates that larger core defects should support, proportionately, more modes. The mode marked F6 in P6 is again a degenerate, air-guiding mode that most closely resembles the form of a fundamental mode in a typical standard optical fiber and supports the maximum amount of light in air.

On the basis of the above six examples of different PBG fiber structures, it is clear that the numbers and locations of modes in a mode spectrum are not determined only by size of the core defect, index difference between a core and cladding and wavelength of light; even when the cladding structure is fixed. Taking S1 to S3, for example, it is clear that the locations of modes and, in particular, the number of modes that are likely to be evanescent in air or possibly air-guiding, can be varied significantly by varying the node size, and presence or absence of beads, about the core defect boundary, without the need to vary the core defect size. Additionally, while certain PBG fiber structures that support a greater number of modes—especially potentially air-guiding modes—may be made by increasing the core defect size for any given cladding structure, it also appears possible to increase the core defect size without significantly increasing the number of modes that are supported by the structure. This is surprising and contrary to the thinking in the prior art.

Figure 8:
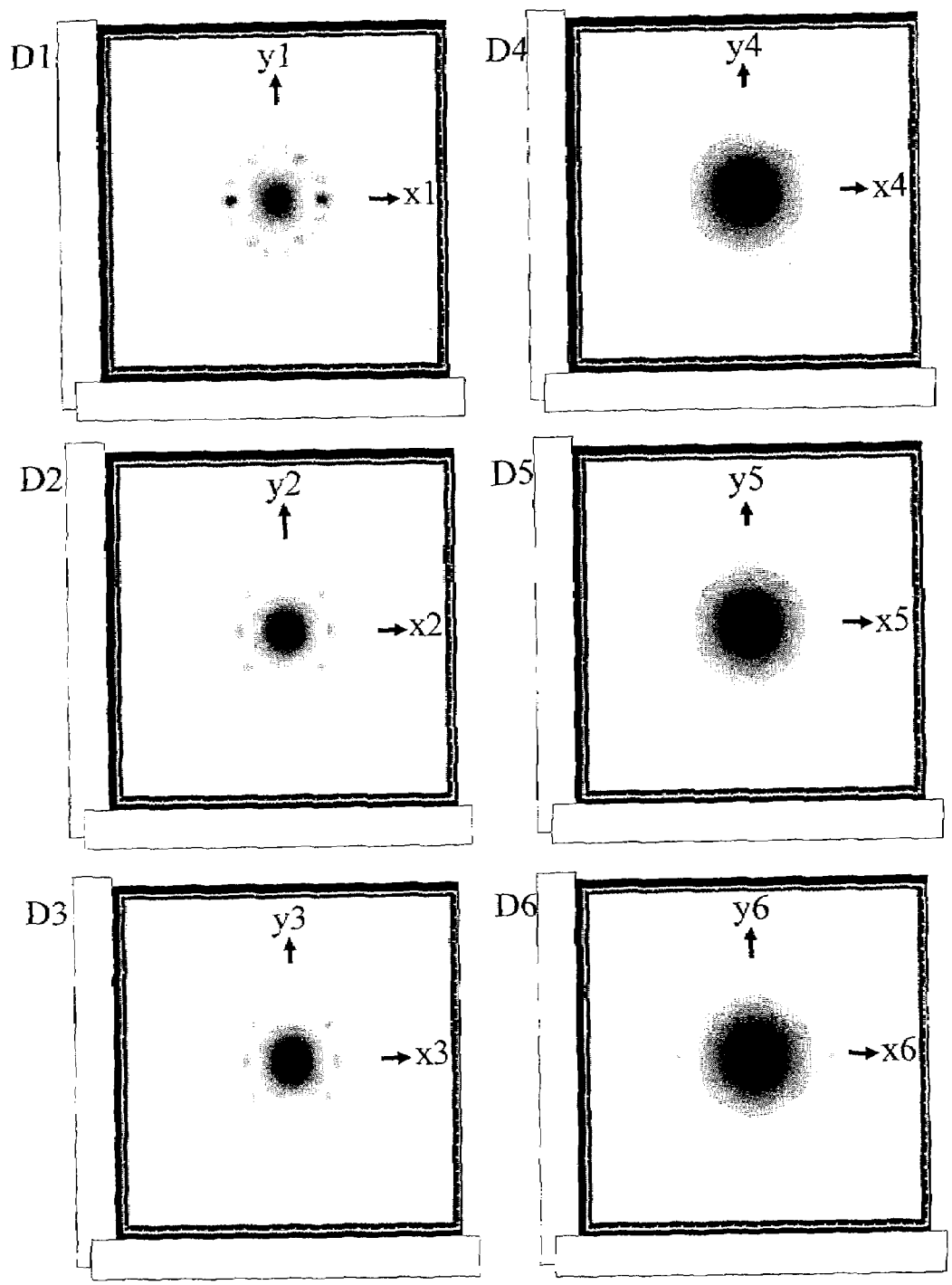
FIG. 8 shows mode intensity distribution plots for a mode, supported by each structure of FIGS. 3 and 4, which supports the highest amount of light in air.

FIG. 8 comprises six plots, D1 to D6, which show the mode intensity distributions, over a transverse cross-section of a respective PBG fiber structure, for modes F1 to F6 respectively. The shading of the plots is inverted, such that darker areas represent more intense light than lighter regions. Each plot shows the position and orientation of x and y planes, which correspond to the x and y planes of the structures, as illustrated in FIGS. 3 and 4. These plots were produced using the results obtained by solving Maxwell's equations for each structure, as described above.

Figure 9:
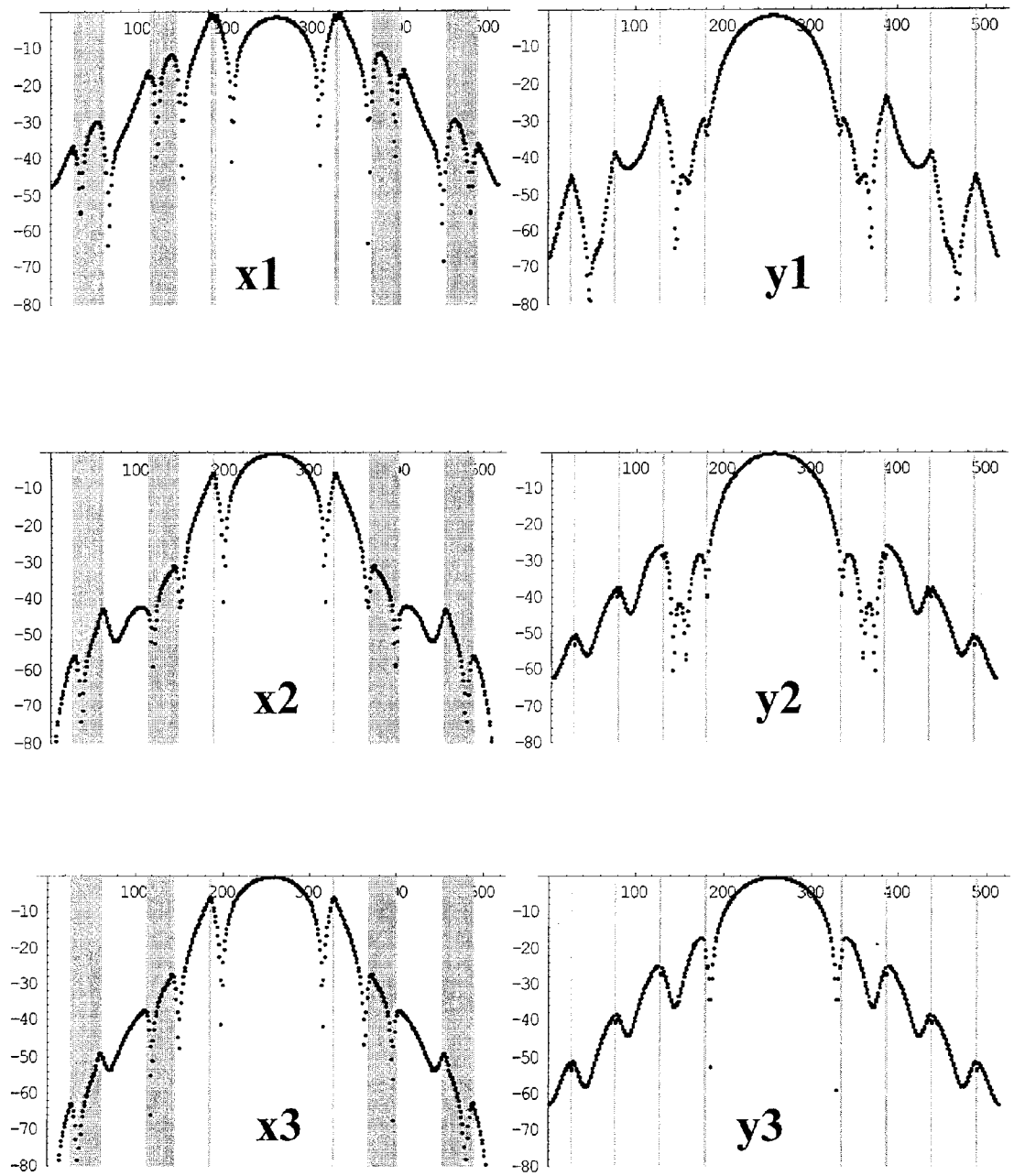
FIGS. 9 and 10 show graphs of mode intensity for x and y axes of the distributions of FIG. 8.
Figure 10:
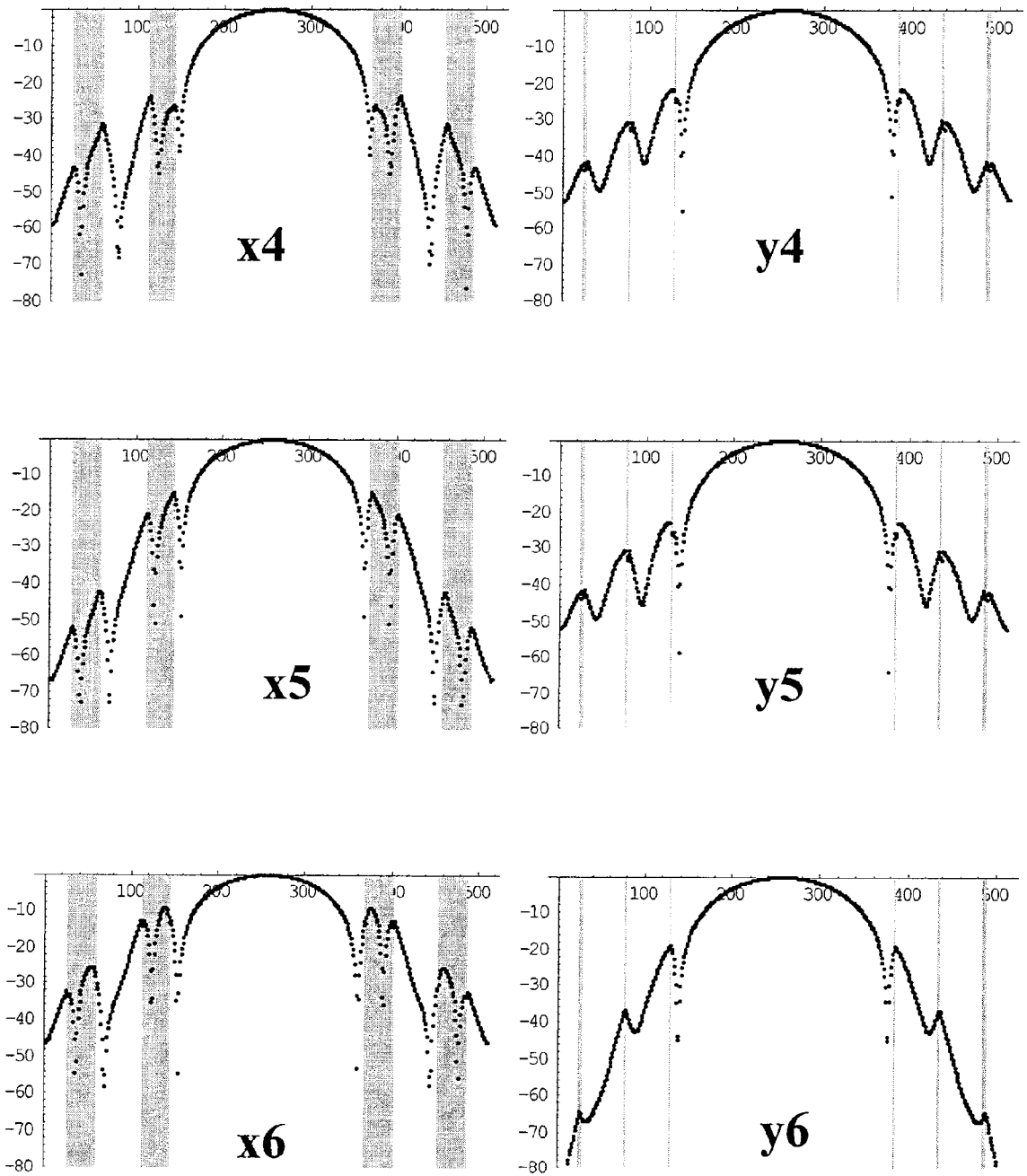

The graphs in FIGS. 9 and 10 show the mode intensity for modes F1 to F6 along longitudinal planes x and y of D1 to D6 respectively. The intensity values are normalised so that the maximum intensity of the mode is at 0 dB on the graph; the y-axis scale being logarithmic. The shaded vertical lines and bands across the graphs coincide with and represent the glass regions of the actual respective structure along the x and y planes. For the x and y planes, therefore, it is possible to see how the light intensity of the mode varies in the air and glass, and across the glass/air boundaries, of each structure.

Table 2 below shows, for modes F1 to F6, the approximate normalised frequency at which the mode lies within the bandgap of its respective structure and the percentage of light that is in air rather than in the high index silica regions.

TABLE 2

| Mode Number | Normalised frequency ($\omega\Lambda/c$) | % light in air |
| --- | --- | --- |
| F1 | 13.14 | 92.8 |
| F2 | 13.12 | 97 |
| F3 | 13.11 | 97.5 |
| F4 | 13.05 | 97.7 |
| F5 | 13.04 | 99.6 |
| F6 | 13.04 | 99.5 |

The percentage of light in air for modes is found by calculating the integral of the light intensity across only the air regions of the plots in FIG. 8 and normalising to the total power. Of course, the plots in FIG. 8 represent the intensity across only an inner region of the various PBG fiber structures. Accordingly, the respective percentages of light in air are calculated for the inner regions only and may be slightly different if calculated across entire PBG fiber structures instead. However, as will be seen, the intensities have typically reduced so considerably towards the edges of the plots that any light in regions outside of the inner regions, whether in air, glass or both, is unlikely to have any significant impact on the percentage of light in air values.

Plot D1 shows the mode intensity distribution for the F1 mode, which was found at a normalised frequency $\omega\Lambda/c$ of about 13.14. Plot D1 together with graphs x1 and y1 show that the F1 mode has a generally circular central region in the core defect. The central region of the mode is intense at its center and decays sharply towards the core defect boundary. There are two intense satellites to the left and right of the central region, coincident with the core defect boundary, and a number of less intense satellites that form a broken ring around the central region. As shown in graph x1, the satellites to the left and right of the central region have slightly higher intensities than the maximum intensity of the central region. It is significant to note that these intense satellites, along with the larger ones of the less intense satellites around the boundary, appear to coincide with the beads of S1. In addition, it would appear that the remainder of the less intense satellites appear to coincide with the boundary nodes of S1. There is evidence in D1 of some light being concentrated further out from the center of the structure than the core defect boundary although, as is supported by graphs x1 and y1, the light intensity drops-off rapidly away from the central region. The light that is outside the core defect appears to coincide with cladding nodes.

It is apparent that, for the seven-cell core defect structure S1, a significant amount of light concentrates in the pronounced beads. It is apparent, however, that the F1 mode is air-guiding, with a significant fraction of the light existing in the core defect and with a local intensity minimum of the mode falling within the core defect boundary. The intensity of the light in the glass of the cladding structure decreases significantly moving further away from the core defect boundary.

Plot D2 shows the mode intensity distribution of the F2 mode in the transverse plane of S2. The mode was found at a normalised frequency $\omega\Lambda/c$ of about 13.12. Plot D2 together with graphs x2 and y2 show that the F2 mode has a generally circular central region in the core defect. The central region is intense at its center and decays sharply towards the core defect boundary. There are six relatively lower intensity satellites about the central region, coincident with the core defect boundary, and lower intensity satellites in glass further out from the central region. The six satellites around the core defect boundary have a lower intensity than the maximum intensity of the central region, in contrast to the intense satellites of plot D1. It is believed that in plot D2 the intensities of the satellites around the core defect boundary are less than in plot D1 due to the removal of the pronounced beads; in-keeping with the observation that, for a seven-cell core defect structure, a significant amount of light concentrates in the pronounced beads.

As with the F1 mode, it is apparent that the F2 mode is air-guiding. It is also apparent that some of the light concentrates in the glass of the cladding structure.

The percentage of light in air for the F2 mode is 97%. This value is significantly larger than the value of 92.8% for the F1 mode even though the core defect size is the same. This increase in the amount of light in air is attributed to the reduction in diameter of the boundary nodes and omission of the beads. Accordingly, it is expected that S2 will have improved loss, non-linearity and mode coupling characteristics compared with S1.

Plot D3 shows the mode intensity distribution of the F3 mode in the transverse plane of S3. The mode was found at a normalised frequency ωΛ/c of about 13.11. The qualitative and quantitative characteristics of the F3 mode, as shown in plot D3 and graphs x3 and y3, very closely match those of the F2 mode. Similarly, the value of the percentage of light in air for the F3 mode is 97.5%, which is very close to the figure for the F2 mode. Accordingly, it is expected that S3 will also have improved loss, non-linearity and mode coupling characteristics compared with S1.

Plot D4 shows the mode intensity distribution of the F4 mode in the transverse plane of S4. The mode was found at a normalised frequency ωΛ/c of about 13.05. Plot D4 together with graphs x4 and y4 show that the F4 mode has a generally circular central region in the core defect. The central region is intense at its center and decays rapidly towards the core defect boundary, although not as rapidly as in Plots D1 to D3. The central region has a local minimum that falls close to and within the core defect boundary, which means that the central region of the mode in plot D4 has a diameter in the order of two pitches longer than for any of the seven-cell core defect structures.

There are a number of low intensity satellites around the central region in plot D4, which appear to coincide with the boundary nodes of S4. From graphs x4 and y4, these satellites appear to be more than 20 dB lower than the peak intensity of the central region. However, it should be noted that the x4 plane does not cross the core defect boundary at a bead, whereas planes x1 to x3 do, which means it is not possible to make a direct comparison of satellite intensity between graph x4 and graphs x1 to x3. The fact that the satellites in plot D4 appear so faint, though, does indicate that they have a significantly reduced intensity compared with satellites in plots D1 to D3.

The F4 mode is apparently air-guiding, with a significant fraction of the light existing in the core defect. Light which is guided outside of the core defect is concentrated in the glass. The percentage of light in air for S4 is 97.7%. This value is an improvement over the highest seven-cell core defect structure value by a small margin (0.2%) and a significant improvement (4.9%) over S1, which has a similar boundary node configuration. Accordingly, it is expected that S4 will have improved loss, non-linearity and mode coupling characteristics compared with S1.

Plot D5 shows the mode intensity distribution of the F5 mode in the transverse plane of S5. The mode was found at a normalised frequency ωΛ/c of about 13.04. Plot D5 together with graphs x5 and y5 show that the F5 mode is very similar in form to the F4 mode, with an intense central region and only very faint satellites outside of the central region. These satellites appear fainter than those in plot D4. Like the F4 mode, it is apparent that the F5 mode is air-guiding with a significant fraction of the light existing in the core defect.

The percentage of light in air for the F5 mode is 99.6%, which is significantly higher than the value of 97.7% for the F4 mode, even though the core defect sizes are the same. This increase in light in air value is attributed to the reduction in size of the boundary nodes and omission of the beads in S5 when compared with S4. It is expected that S5 will have significantly improved loss, non-linearity and mode coupling characteristics compared with S1 and S4.

Plot D6 shows the mode intensity distribution of the F6 mode in the transverse plane of S6. The mode was found at a normalised frequency ΩΛ/c of about 13.04. Plot D6 together with graphs x6 and y6, relating to the F6 mode, very closely match the qualitative and quantitative characteristics of the F5 mode. In addition, the percentage of light in air for the F6 mode is 99.5%, which is similar to the value for the F5 mode. Accordingly, like S5, it is expected that S6 will have significantly improved loss, non-linearity and mode coupling characteristics compared with S1 and S4, while at the same time not supporting a significantly increased number of modes compared with the seven-cell core defect structures of Structures S1 to S3.

Table 3 below provides data for six further exemplary waveguide structures, S10 to S15. The waveguide structures for S10-S15 very closely resemble S3, in that the boundaries have no apparent beads and the boundary nodes have a similar diameter to those in S1. Due to the similarity, and for reasons of brevity herein, S10-S15 are not independently represented in the Figures. The difference between the structures is only in boundary vein thickness, as shown in Table 3. The variations in boundary vein thickness are compensated for by slight variations in core defect diameter.

In Table 3, boundary vein width is normalised relative to the pitch Λ of the structures, which was the same for each structure. Structure S10 has a boundary vein thickness the same as the cladding vein thickness and, hence, was closest in form to S3. For each structure, the position of the mode having the highest percentage of light in air is presented as a frequency that is normalised with respect to the pitch of the structure.

TABLE 3

| Structure | Boundary Vein Width/Λ | Normalised frequency (ωΛ/c) | % light in air |
|---|---|---|---|
| S10 | 0.0383 | 13.11 | 98.6 |
| S11 | 0.0438 | 13.11 (13.29) | 98.2 (97.7) |
| S12 | 0.0493 | 13.10 | 96 |
| S13 | 0.0548 | 13.12 (13.28) | 96.9 (98.3) |
| S14 | 0.0602 | 13.11 | 97.3 |
| S15 | 0.0657 | 13.11 | 97.8 |

Discounting for the moment the values in parentheses in Table 3, the modes having the highest percentage of light in air for each structure were found to be ones which most closely resemble the fundamental mode in a standard optical fiber communications system. As can be seen, varying the width of the boundary veins has little effect on the position of the respective modes. In contrast, however, variation in boundary vein thickness has a significant impact on the percentage of light in air for the modes. Within the coarse range of boundary vein thicknesses examined, it can be seen that a candidate as a preferred structure in terms of maximum light in air is S10, which has a boundary vein thickness of around 0.0383Λ (around 70% of the cladding vein thickness). However, a significant improvement over S13 is also seen at a boundary vein thickness of around 0.0438Λ (around 80% of cladding vein thickness). It is worthy of note, also, that the improvement is not linear, with the boundary vein thickness of S12 (around 90% of cladding vein thickness) producing a lower percentage of light in air than either of S13 or S11. In addition, slight improvements over S13 are seen with S14 and S15, which have thicker boundary veins than S13.

Although not described herein in detail, the inventors have found that the mode spectra for structures S10 to S15 vary considerably with varying boundary vein thickness. The variations were at least as marked as those found by varying the boundary node size and bead presence in structures S1 to S3, which are very similar seven-cell core defect structures.

Turning now to the values in parentheses in Table 3, for structure S13, a mode having the values shown was found to be non-degenerate and to exist within the bandgap of S13 to the right of the light line. This mode was found to support the highest fraction of light in air for the structure.

All other modes, which have been shown herein to support the maximum fraction of light in air, have been degenerate.

As will be appreciated, a non-degenerate mode may find beneficial application, for example, in a system that is required to have minimal polarisation mode dispersion. This is because, once light has been launched or coupled into the non-degenerate mode, there is no scope for power to couple between degenerate mode pairs, which is the cause of such dispersion in practical systems.

The mode represented by the values in parentheses for S11 was also found to be non-degenerate. However, for this structure, the value of percentage of light in air for this mode was less than the value for the mode that most closely resembles the form of a fundamental mode.

It is expected that there are likely to be a number of non-degenerate modes supported by the present waveguide structures, as will be described hereinafter. However, whether or not the modes exist within the bandgap of a particular structure would depend on the relationship between the bandgap and the respective mode spectrum, which, as has been shown, can be extremely sensitive to core size and boundary form at least. The non-degenerate modes typically exist at higher frequencies than the fundamental-like modes. Similarly, the present inventors have found that nineteen cell core defect structures also support these non-degenerate modes.

Figure 11:
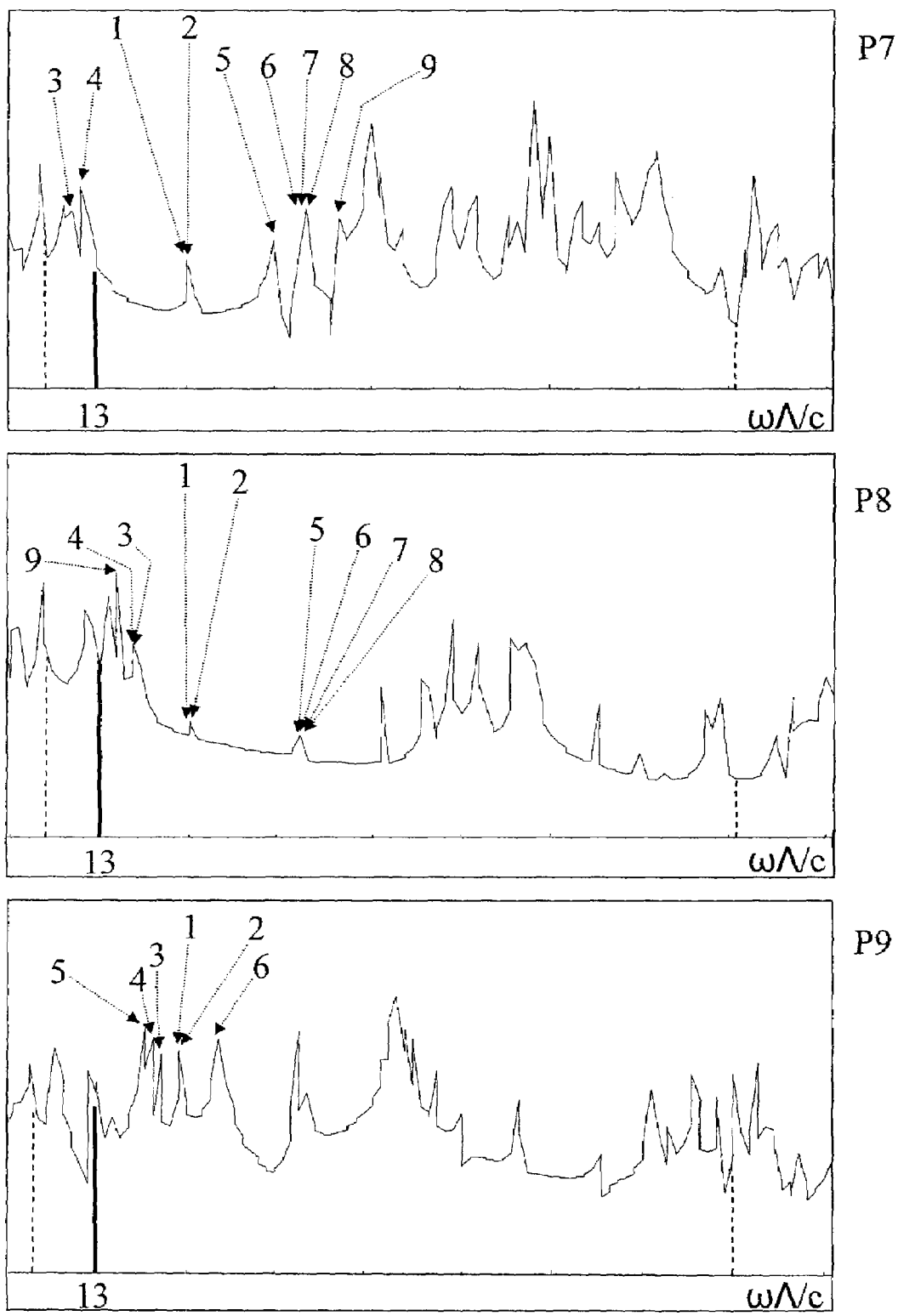
FIG. 11 shows mode spectra plots for the PBG fiber structures of FIG. 5.
Figure 16A:
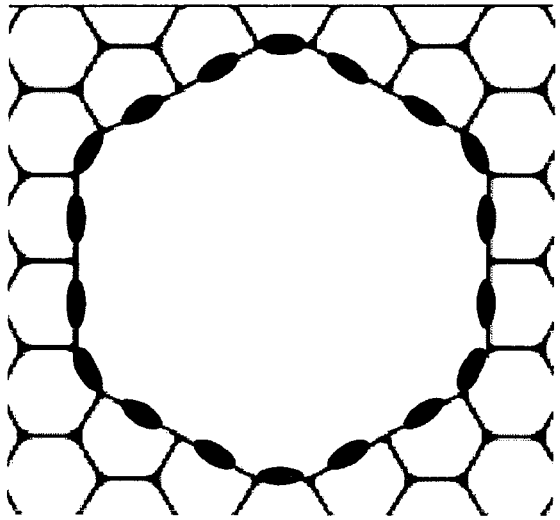
FIG. 16 shows four further alternative PBG fiber structures.
Figure 16B:
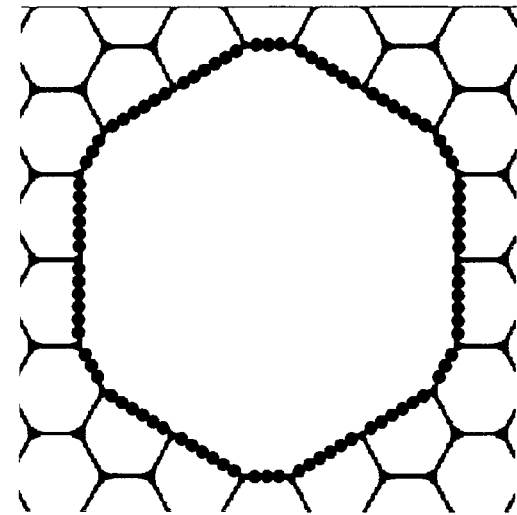
Figure 16C:
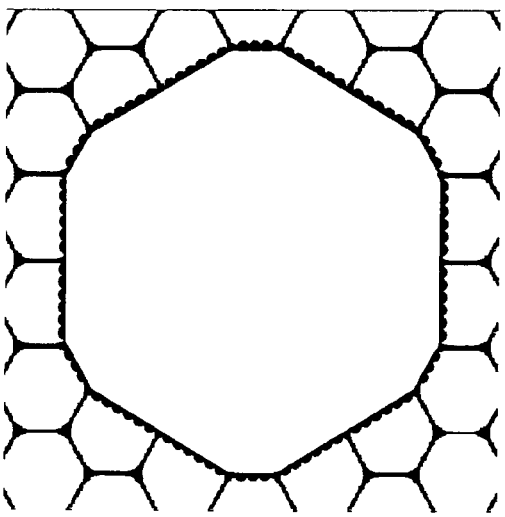
Figure 16D:
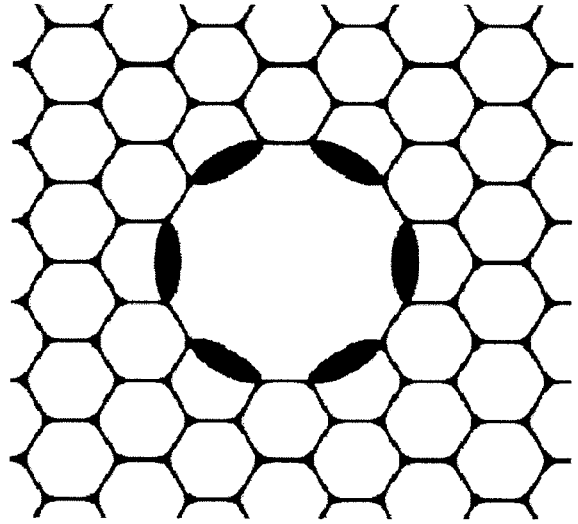

Mode spectra P7-P9 for respective structures S7 to S9 are shown in FIG. 11. In these spectra, the modes numbered 1 and 2 are degenerate, fundamental-like modes supported by the structure and the other numbered modes are the modes that are nearest to the fundamental modes. Each of the numbered modes has a respective mode intensity plot, identified as Dn-m in FIGS. 12 to 14 (where n is the structure number and m is the mode number).

Spectra P7, relating to S7, has a degenerate pair of fundamental modes D7-1 and D7-2 just to the right of the light line. To the right of the fundamental modes is a single mode D7-5, which can be identified as a so-called 'surface mode', which has a significant portion of its power in or near to the core defect boundary. Further to the right is a group of three core guided modes, D7-6 to D7-8. Further to the right is another surface mode D7-9. To the left of the light line, but still within the bandgap, are two surface modes D7-3 and D7-4. As can be seen, the fundamental modes in this spectrum P7 are reasonably well spaced from the other modes that are supported within the bandgap.

Spectrum P8, relating to S8, has the same degenerate pair of fundamental modes D8-1 and D8-2 just to the right of the light line. In this case, however, there is a group of four modes: two non-degenerate modes D8-5 and D8-8, resembling the $TM_{01}$ and $TE_{01}$ modes of a standard optical fiber, and a degenerate pair of similar looking modes D8-6 and D8-7, which resemble the $HE_{21}$ modes of a standard optical fiber. This group is further away from the fundamental modes that in P7. Just to the left of the fundamental modes, but still to the right of the light line, are three surface modes; D8-3, D8-4 and D8-9.

Spectrum P9, relating to S9, shows the two fundamental modes D9-1 and D9-2, closely surrounded on both sides by surface modes D9-3-D9-6.

From the mode spectra results for structures S7-S9 it is clear that it is possible to vary quite dramatically the modal characteristics of a given structure by adjusting only the core boundary characteristics thereof. In particular, while structure S8 has a relatively good spacing of modes from the fundamental pair structure, S9 has a number of surface modes in very close proximity to the respective fundamental pair. The present inventors expect, therefore, that structure S9 will experience far more loss due to mode coupling of power from the core modes to the boundary modes than either of S7 or S8 at the given operating wavelength.

The present inventors believe that slight variations on the core boundary have profound effects on the surface modes because these modes reside primarily in the glass of the core boundary. In contrast, slight variations in the core boundary are less likely to have an effect of the core modes, since very little of the light of these modes is in the core boundary.

In practical optical fiber transmission systems, it is expected that one fixed parameter will be operating wavelength. It is well-known that a PBG fiber can be designed for operation at a given wavelength, for example at around 1550 nm, since the dimensions of PBG structures simply scale with wavelength. However, the present inventors anticipate that there may be a need to tune a given PBG fiber structure, to optimise its performance at the given wavelength; for example, by manipulating the spectral positions of surface modes to move them away from the core modes of interest. Embodiments of the present invention find particularly beneficial application as a way of so tuning PBG fibers, independently or in addition to varying core diameter and other parameters of the fibers.

The structures illustrated in the diagram in FIG. 15 are seven cell core defect structures according to embodiments of the present invention.

FIG. 15a has a core boundary which includes six inwardly-facing nodules along the six relatively longer boundary veins. FIG. 15b is a diagram of an alternative structure, having outwardly-facing nodules along six relatively shorter boundary veins. FIG. 15c illustrates a similar structure, this time having alternating inwardly and outwardly facing nodules along the six relatively shorter boundary veins. FIG. 15d has relatively thick boundary veins extending between pairs of neighboring boundary nodes that coincide with hexagonal boundary cells. In this embodiment, the thickness of the thicker veins is about 2.5 times the thickness of the other boundary and cladding veins.

The structures illustrated in FIG. 16 are yet further embodiments of the present invention. FIG. 16a-16c are nineteen cell core defect structures. FIG. 16a has a core boundary comprising eighteen boundary veins and every vein includes a bead. In contrast, FIG. 16b has what might be considered a corrugated core defect boundary, since each boundary vein comprises a row of closely packed beads: six beads along each longer boundary vein and three beads along each shorter boundary vein. The structure in FIG. 16c is similar to the structure in FIG. 16b. However, in FIG. 16c, the beads only project outwardly from the core defect boundary. It would of course also be possible to provide a similar structure in which the beads projected only inwardly from the core defect boundary. FIG. 16d is an additional seven cell core defect structure, which has enlarged beads extending between respective pairs of more widely spaced neighboring nodes.

Figure 17:
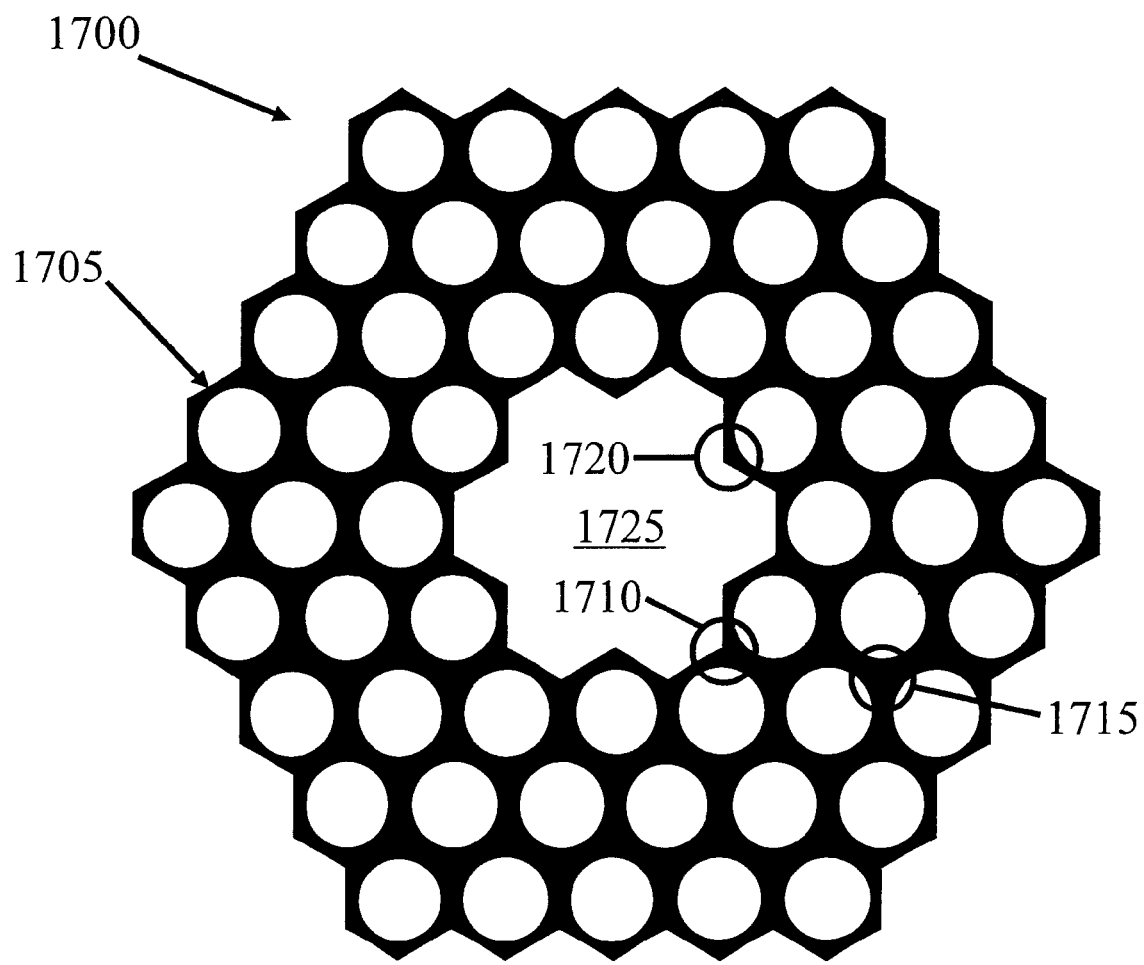
FIG. 17 is a diagram of a pre-form suitable for making a known PBG fiber.

With reference to FIG. 17, prior art structures of the kind exemplified by S1 may be made from a pre-form 1700 comprising a stack of hexagonal capillaries 1705. The hexagonal capillaries 1705 each have a circular bore. The cladding nodes 160 and boundary nodes 150 (from FIG. 1) of the PBG fiber structure result from the significant volume of glass that is present in the perform 1700 wherever the corners 1710, 1715 of neighboring capillaries meet. The beads 165 are formed from the glass of the inwardly-facing corners 1720 of the capillaries that bound an inner region 1725 of the pre-form 1700, which is to become the core defect region 110 (cf. FIG. 1) of a PBG fiber structure. These corners 1720, and the two sides of each capillary that meet at the corners, recede due to surface tension as the stack of capillaries is heated and drawn. Such recession turns the two sides and the corner 1720 into a boundary vein 140, with a bead 165. The inner region 1725 may be formed by omitting the inner seven capillaries from the pre-form and, for example, supporting the outer capillaries using truncated capillaries at either end of the stack, as described in PCT/GB00/01249 (described above) or by etching away glass from inner capillaries in accordance with either PCT/GB00/01249 or U.S. Pat. No. 6,444,133 mentioned above. In some prior art structures, the known beads may result from an etching process rather than being entirely due to use of hexagonal capillaries.

While it is possible to adapt the prior art processes in order to make the nineteen-cell core defect S4, which has beads on some of the boundary veins, the present inventors have appreciated that it would be more difficult to manufacture any of S5 or S9 using the prior art techniques. In particular, it would be difficult to control the diameters of boundary nodes using hexagonal cross section capillaries of the kind described with reference to FIG. 17. On the other hand, it is difficult to make structures having cladding nodes with diameters which are significantly larger than their respective veins by using purely circular capillaries, especially when the required AFF is high, for example higher than 75%. In addition, formation of beads or nodules (or the like) at selected locations around the core boundary is difficult using prior art processes.

Figure 18:
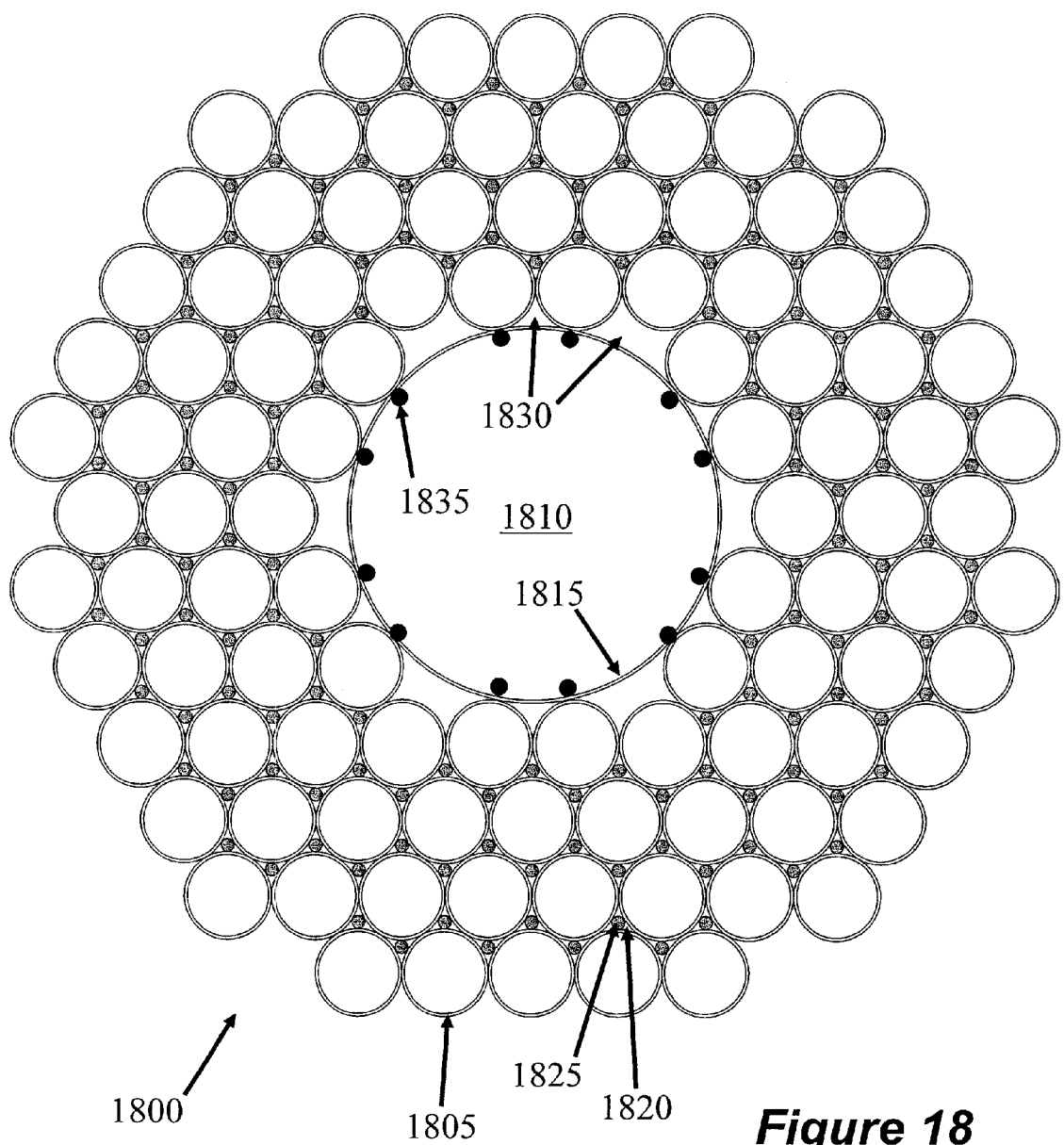
FIG. 18 is a diagram of a pre-form suitable for making a fiber according to examples of PBG fibers described hereinafter.

The diagram in FIG. 18 illustrates one way of forming a pre-form stack 1800, including a nineteen cell core region 1810, which is suitable for forming a PBG fiber structure S4 or S8. The core region 1810 is formed by assembling circular cross section capillaries 1805 in a close-packed triangular arrangement around a large diameter core capillary 1815, which is large enough to support capillaries around a region left by removal of nineteen capillaries: an inner capillary, the six capillaries around the inner capillary and the twelve capillaries around the six capillaries. The cladding capillaries 1805 have an outer diameter of about 1 mm and a wall thickness of about 0.05 mm and the large diameter core capillary 1815 has an outer diameter of about 4.5 mm and a wall thickness of about 0.05 mm. The large diameter core capillary 1815 supports the cladding capillaries while the stack is being formed and eventually becomes part of the material that forms a core defect boundary.

Interstitial voids 1820 that form at the at the mid-point of each close-packed, triangular group of three cladding capillaries are each packed with a glass rod 1840, which has an outer diameter of about 0.15 mm. The rods 1825 that are packed in voids assist in forming cladding nodes, which have a diameter d that is typically significantly greater than the thickness t of the veins that meet at the nodes mission of a rod from a void in the cladding leads to the formation of a cladding node that has a relatively smaller diameter, for example closer to the thickness of the respective adjoining veins.

The rods 1825 may be inserted into the voids after the capillaries have been stacked. Alternatively, the stack may be assembled layer by layer, with the rods that rest on top of capillaries being supported by an appropriate jig, for example positioned at either end of the stack, until the next upper layer of capillaries is in place to support those rods. In commercial scale operations, it is apparent that the manual task of forming a pre-form stack could readily be automated, using appropriately programmed robots, for example of the kind used in component laying for printed circuit boards.

The interstitial voids 1830 that are formed between the cladding capillaries 1805 and the large diameter capillary 1815 are not packed with any rods, thereby minimising the volume of glass that is available, during drawing of the stack 1800, for formation of boundary nodes.

As shown in FIG. 18, the large diameter capillary 1815 has attached to its inner surface twelve silica rods 1835. The rods 1835 are fused to the inside of the large diameter capillary 1815 in an additional heating step before the capillary is introduced to the stack 1800. When the stack 1800 is heated and drawn into fiber, these rods fuse with the large diameter capillary 1815, which itself fuses to the inwardly facing surfaces of the innermost cladding capillaries, to form core boundary beads of the kind described herein with reference to structures S4 and S8. The rods 1835 can be selectively positioned on the inside of the large diameter capillary 1815 to be aligned with either or both of the longer or shorter core boundary veins. Of course, within practical limits, any number of rods 1835 may be attached to the inside, or indeed outside, of the large diameter capillary 1815. If attached on the outside of the large diameter capillary 1815, the rods 1835 may be aligned with the larger interstitial voids 1830.

The diameters of the rods are selected to provide the required bead size and may be of similar size or vary in size around the periphery of the large diameter capillary 1815.

In principle, rods 1835 may be attached to the inside or to the outside of the large diameter capillary 1815. Indeed, rods 1950 (see FIG. 19) may in principle be attached to both the inside and the outside of the same region of the large diameter capillary, so that they form a relatively larger bead on the core boundary.

Figure 19:
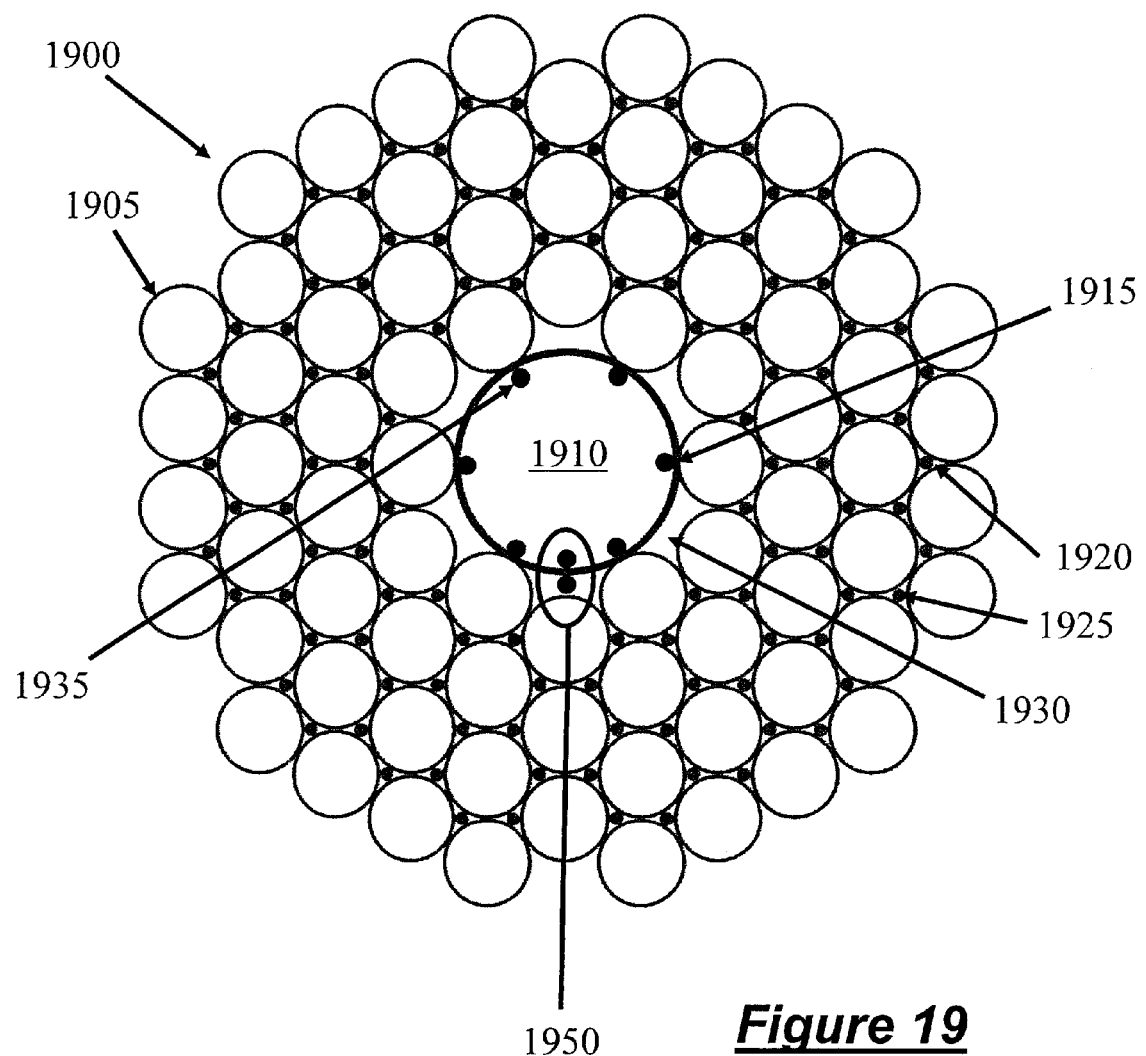
FIG. 19 is an alternative pre-form suitable for making a fiber according to examples of PBG fibers described hereinafter.

FIG. 19 illustrates a similar pre-form stack suitable for forming a PBG fiber according to structure shown in FIG. 15*a*.

The pre-form stack 1800 (or 1900) is arranged as described with reference to FIG. 18 (or FIG. 19) and is then over-clad with a further, relatively thick-walled capillary (see, for example, FIG. 26), which is large enough to contain the stack and small enough to hold the capillaries and rods firmly in place. The entire over-clad stack is then heated and drawn into a so-called cane, during which time all the relatively large interstitial voids 1830 and any remaining voids between the glass rods 1825 and the cladding capillaries 1805, collapse due to surface tension. Then, the cane is, again, over-clad with a further, thick silica cladding tube (not shown) and is heated and drawn into optical fiber in a known way. If surface tension alone is insufficient to collapse any of the interstitial voids, a vacuum may be applied to the interstitial voids, either or both during drawing of the stack into a cane or the cane into the fiber, for example according to the process described in WO 00/49436 (The University of Bath).

Figure 20A:
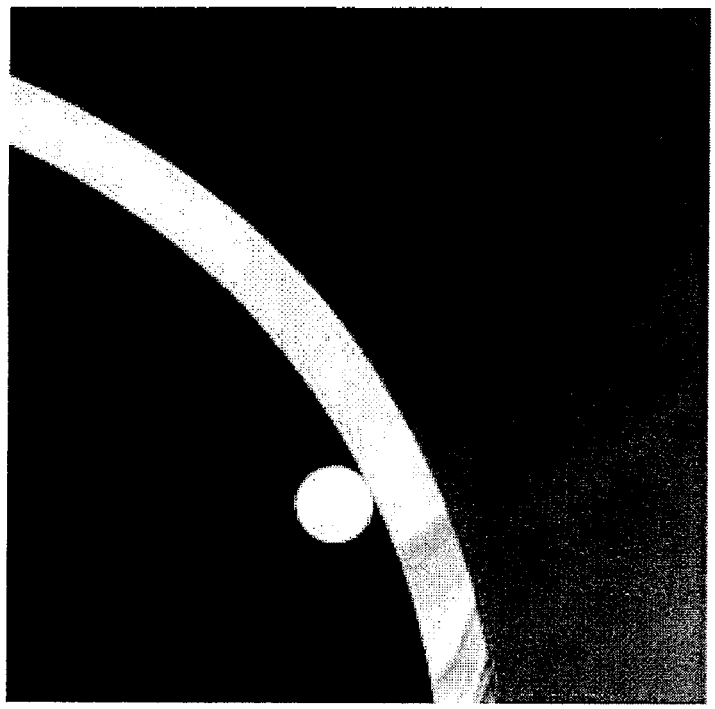
FIG. 20a is a photograph of a portion of a preform, according to an embodiment of the present invention, taken through a microscope.

FIG. 20*a* is a photograph, taken by the present inventors through a microscope, of a rod fused to a large diameter capillary before the capillary is introduced into a pre-form stack. Whether the rod becomes a bead along a core boundary, for example as in structures S1, S4, S8 or S9, or a relatively more pronounced nodule protruding only from one side of a core boundary, for example as shown in FIGS. 15*a*-15*c*, can be controlled by the fiber drawing conditions. For example, hotter drawing conditions under lower tension permit a rod and boundary to fuse completely, thereby forming a bead. In contrast, a colder draw under higher tension prevents complete fusing of the rod and core boundary, leaving the rod as a nodule on the surface of the core boundary in a final fiber structure. Clearly, a nodule can be arranged to form on an inner or outer periphery of a core boundary, depending on whether the respective rod is positioned on an inner or outer periphery of a large diameter capillary of the pre-form stack. The properties of a final fiber structure are expected to vary with bead and/or nodule size and placement.

Figure 20B:
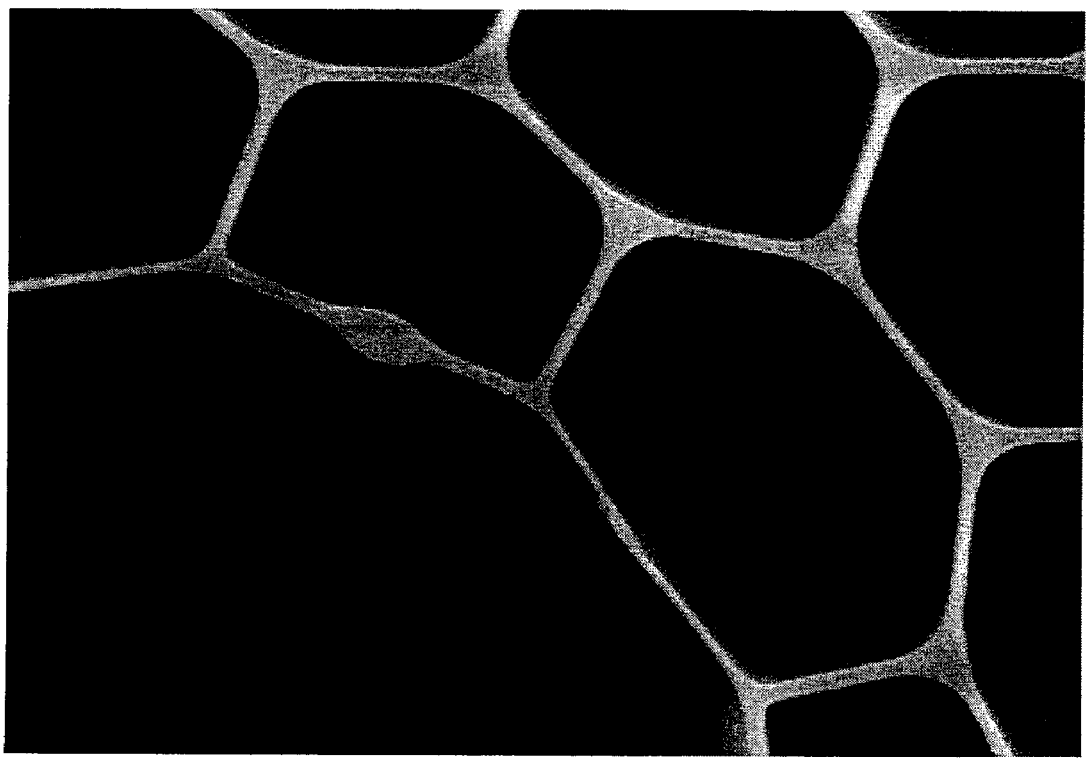

FIG. 20b is an SEM image of a bead, which forms part of a PBG cladding structure according to an embodiment of the present invention. As shown, the bead has formed along a relatively shorter vein of the cladding structure. The structure is a result of heating and drawing a preform containing the rod shown in FIG. 20a. The drawing conditions included a heating temperature of about 2050° C., a draw speed of about 2 $ms^{-1}$ and a draw tension of about 240 g. Clearly, the rod has fused completely with the capillary under these drawing conditions. It is expected that cooler and/or faster drawing conditions would lead to the formation of a nodule on the inner surface only of the capillary.

Figure 21:
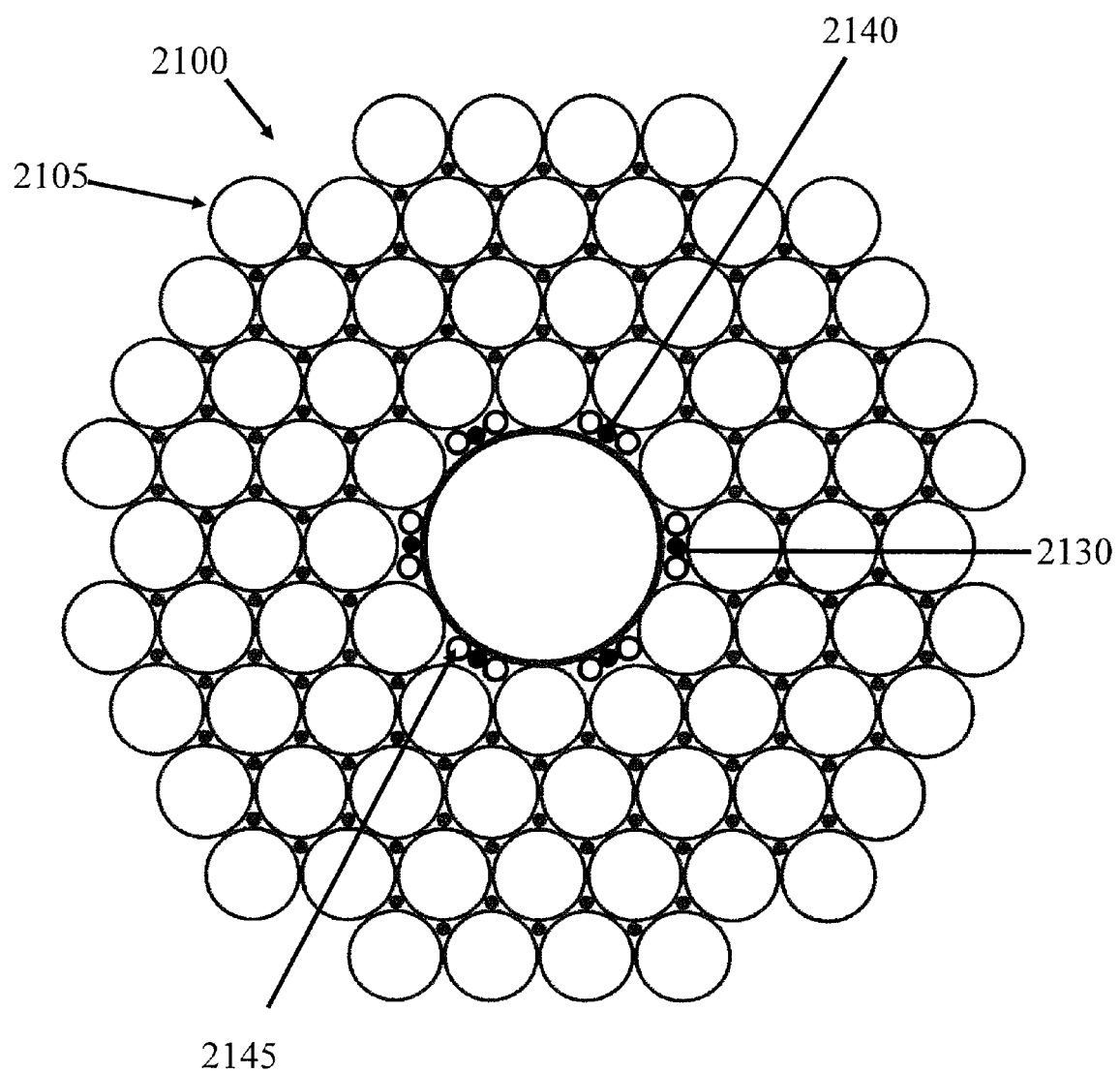
FIGS. 21 to 25 are diagrams of alternative pre-forms suitable for making fibers according to embodiments of the present invention.

An alternative method of forming a pre-form stack 2100, which results in beads on shorter boundary veins only, is illustrated in FIG. 21. Generally, the stack 2100 comprises the same arrangement of cladding capillaries 2105, and a large diameter capillary, as stack 1900. In this example, however, the larger interstitial voids 2130, which form between every other one of the innermost capillaries and the large diameter capillary 2115, are packed with a glass rod 2140 and two thin-walled capillaries 2145, which act to hold the glass rod 2140 in a central position in the void during drawing down into a cane. Unlike in stack 1900, the rods 2140 and capillaries 2145 are not fused to the large diameter capillary 2115 before it is introduced to the stack 2100. Rather, they are introduced into the stack during assembly thereof. When the stack 2100 is heated and drawn down, the rods 2140 form beads on the shorter boundary veins and the thin-walled capillaries collapse entirely—if necessary with the application of a vacuum—adding an insignificant amount of material to the overall structure.

Figure 22:
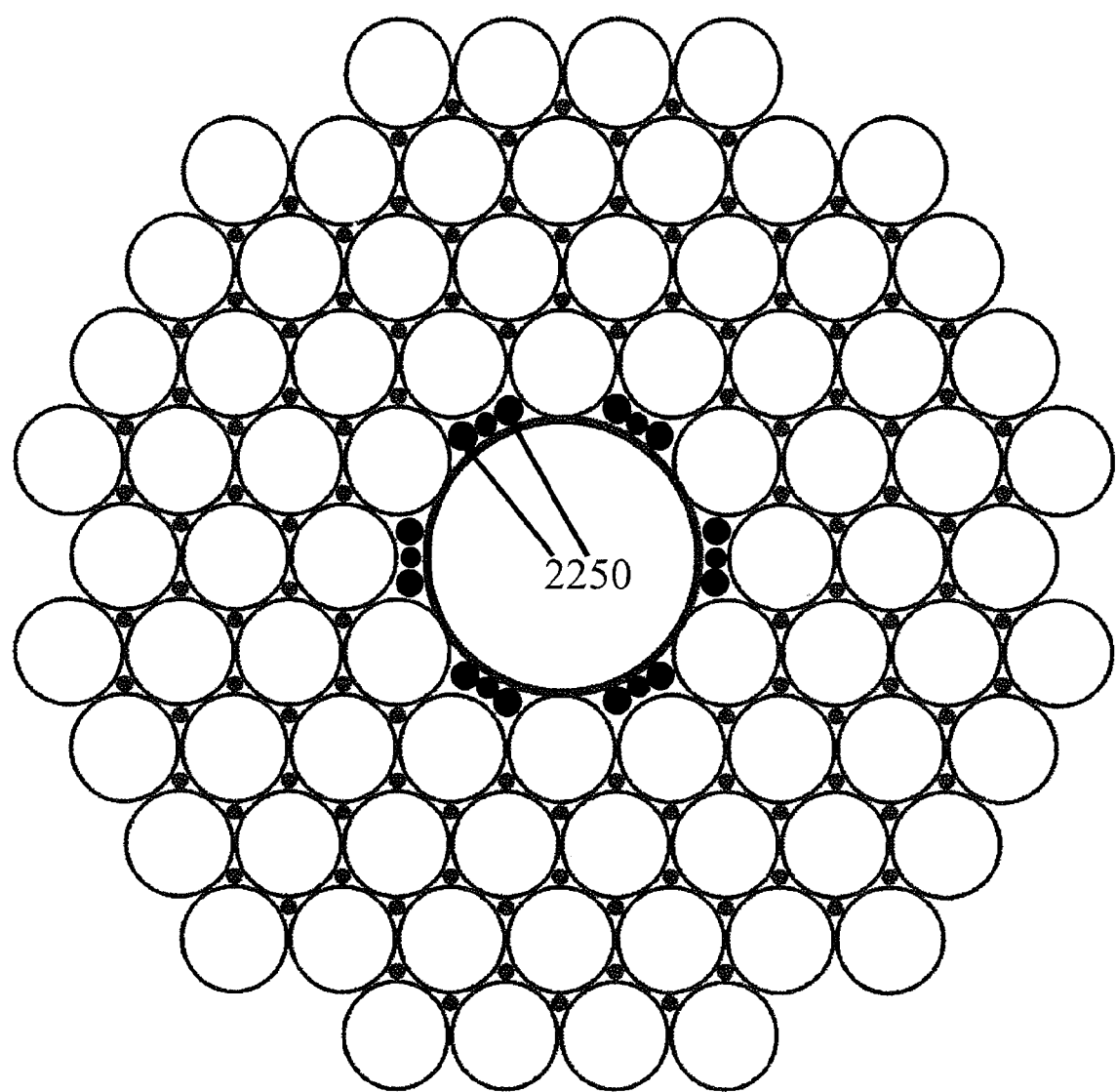

The pre-form stack of FIG. 21 may be modified slightly as shown in FIG. 22, whereby the thin-walled capillaries 2145, on either side of the glass rods 2140, are replaced by additional glass rods 2250. The effect is that, when the stack is drawn down to a fiber, the three glass rods in each void increase the overall thickness of the associated boundary vein, whereby thicker boundary veins are created, as in the structures in FIG. 15d.

Figure 23:
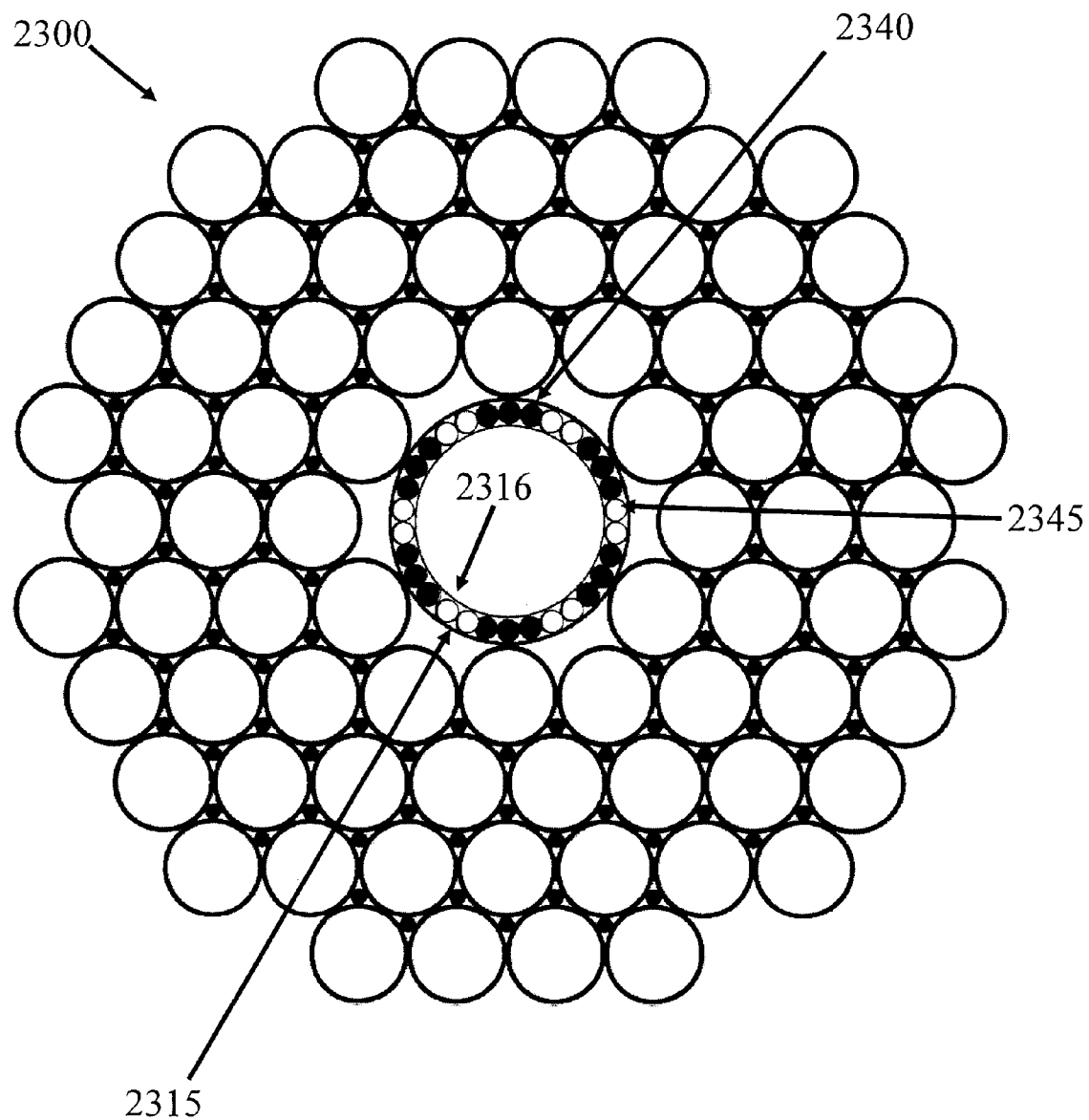

Thicker boundary veins may alternatively be formed in accordance with the pre-form stack 2300 shown in the diagram in FIG. 23. While the cladding capillaries are arranged in the same way as in previously described stacks, the inner region of the stack 2300 is formed using two concentric, slightly different sized, large diameter capillaries, 2315 and 2316. The larger of the large diameter capillaries supports the cladding capillaries, while the smaller of the large diameter capillaries fits within the larger one. The smaller large diameter capillary is sufficiently small that relatively small rods 2340 and capillaries 2345 can fit in the space between the larger and smaller large diameter capillaries.

When the stack 2300 is heated and drawn down into a cane and a fiber, the rods 2340 become thicker boundary veins and the capillaries 2345 collapse to form part of the thinner boundary veins.

Figure 24A:
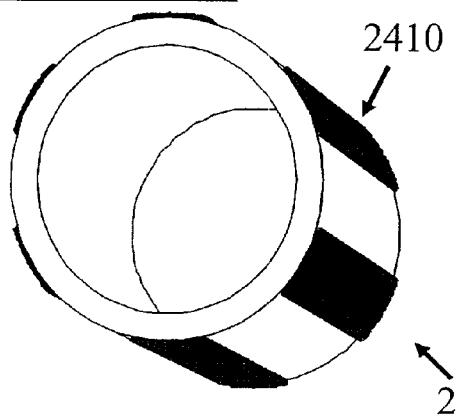
Figure 24B:
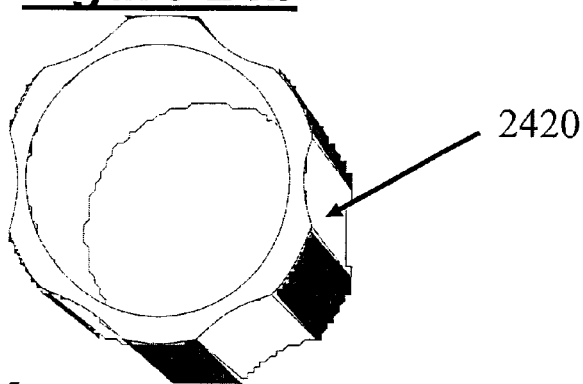
Figure 24C:
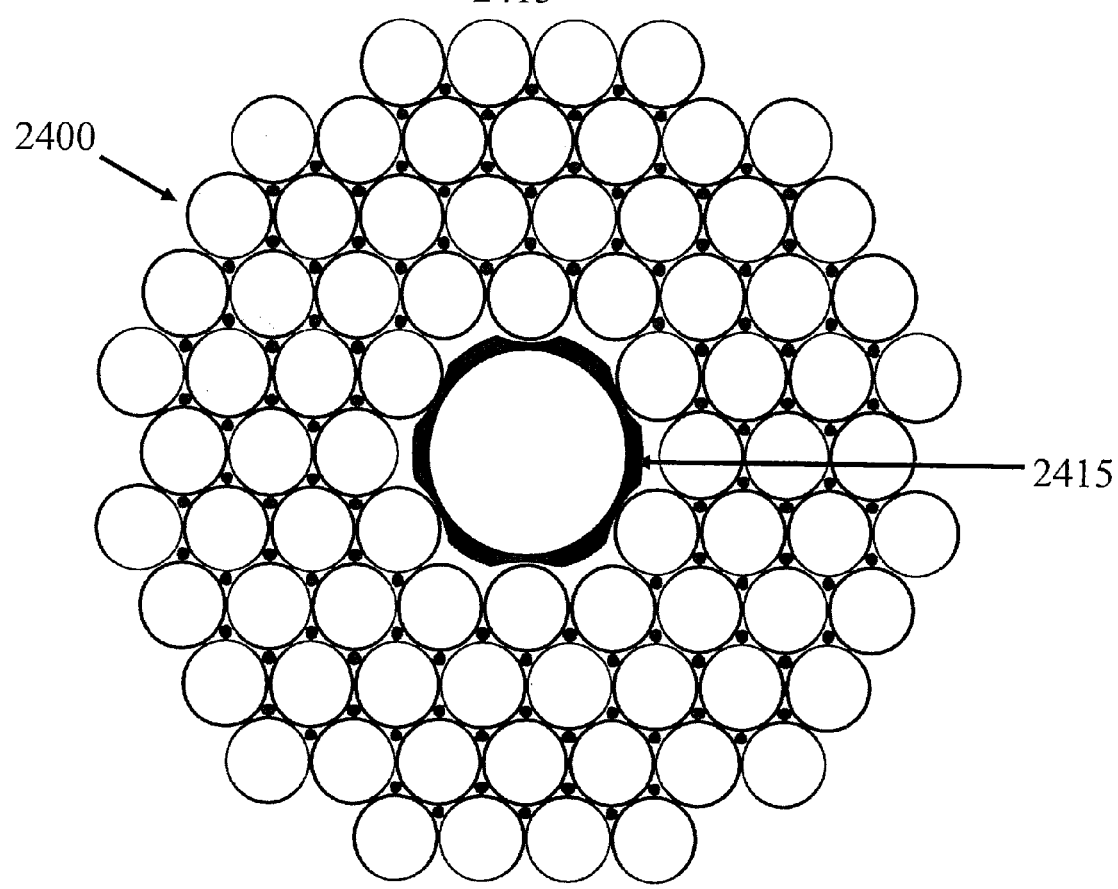

Thicker boundary veins may alternatively be produced by pre-profiling a large diameter capillary 2415, for example by using an etching process. First, as shown in FIG. 24a, a masking agent 2410 is applied to a large diameter capillary 2415 in positions which correspond to required regions of increased thickness in a final fiber structure. The masking agent 2410 is one which inhibits etching by HF, for example a polymer-based photo-resist or a noble metal-based material. According to FIG. 24b, the capillary is subjected to a flow of HF in an MCVD lathe (in a known manner), whereby the unmasked capillary surfaces 2420 are etched away to the degree required. Finally, the mask is removed and, as shown in FIG. 24c, the capillary 2415 is used in a capillary stack 2400, in which the thicker regions of the capillary 2415 are aligned with the regions of the stack where thicker boundary veins are required. Of course, masking and etching may selectively be applied to inner and/or outer surfaces and regions of the capillary depending of the required final form of the capillary.

Alternatively, a core boundary may comprise a predominantly thick-walled core boundary (not shown) around which relatively short regions of material have been etched away. This is in contrast to the thin-walled boundary with a number of relatively short thicker regions. A similar, predominantly thick-walled core boundary may be made in a different manner by heating and 'pinching' regions of a large diameter capillary prior to it being inserted into a capillary stack. Pinched regions of the capillary would form relatively short, thinner regions in a final core boundary, and addition of several appropriately-placed pinches may be used to fine-tune the resulting fiber structure. The capillary could be pinched between two elongate tungsten blades, one on the inside of the capillary and the other aligned with the first on the outside, for example, while the capillary is hot enough to be deformed.

Figure 25:
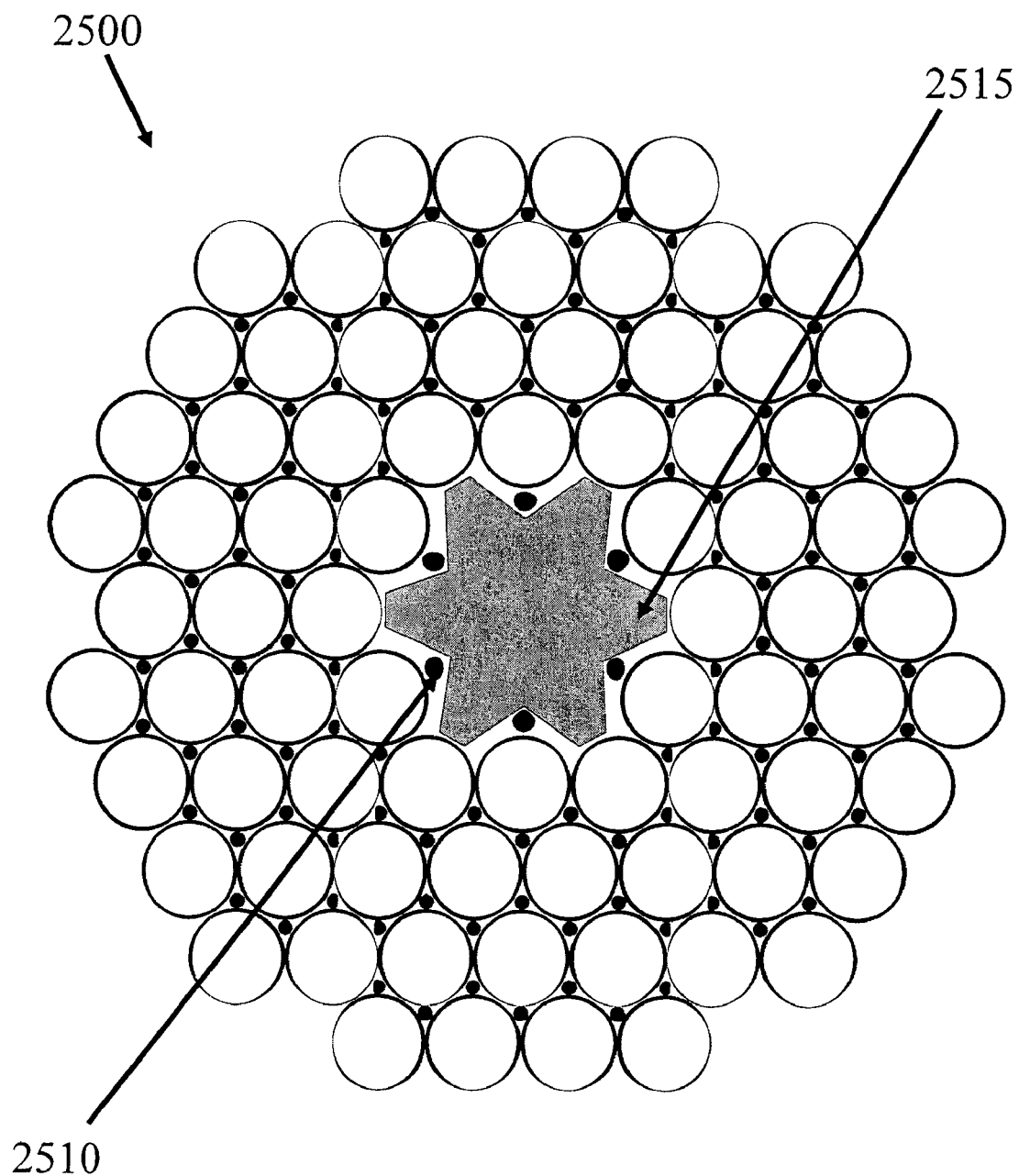

An alternative method for forming a capillary stack 2500, which does not require a large diameter capillary, is illustrated in FIG. 25. A large diameter capillary is omitted and an insert 2515 is used instead; for example made of graphite, platinum, tungsten or a ceramic material, which has a higher melting point than silica glass and, preferably, a higher coefficient of thermal expansion.

The insert 2515 is shaped, by having detents, to support cladding capillaries and rods and also to support additional glass rods 2510, which eventually become pronounced beads 150.

The stack 2500, including the insert 2515, is heated to allow the capillaries and rods to fuse into a pre-form. The pre-form is then allowed to cool and the insert 2515 is removed. It will be apparent that, at this point, the inwardly-facing walls of the innermost capillaries take on the general shape of the insert 2515. An advantage of using an insert material having a higher coefficient of thermal expansion than silica is that, when the pre-form and insert are heated, the insert expands and, relatively-speaking, increases the area of the central region in which the insert is located. When permitted to cool down again, the insert shrinks back down to its original size and the silica solidifies before shrinking fully back down, leaving an inner region that is larger than the insert. The insert 2515, which, as a result, is loose-fitting in the central region, may then be removed readily from the pre-form with reduced risk of damaging or contaminating the pre-form 2500. The resulting pre-form is then heated and drawn in the usual way, in one or more drawing steps.

A further alternative way to form the fiber is by using a process similar to that described in PCT/GB00/01249, wherein the cladding capillaries and rods, and additional capillaries and/or rods for shaping the boundary, are supported by truncated capillaries at either end of the stack. The stack may be drawn to an optical fiber in the normal way, and the parts of the fiber incorporating the truncated capillary material may be discarded. In principle, truncated capillaries may also be used to support the stack part way along its length.

Figure 26:
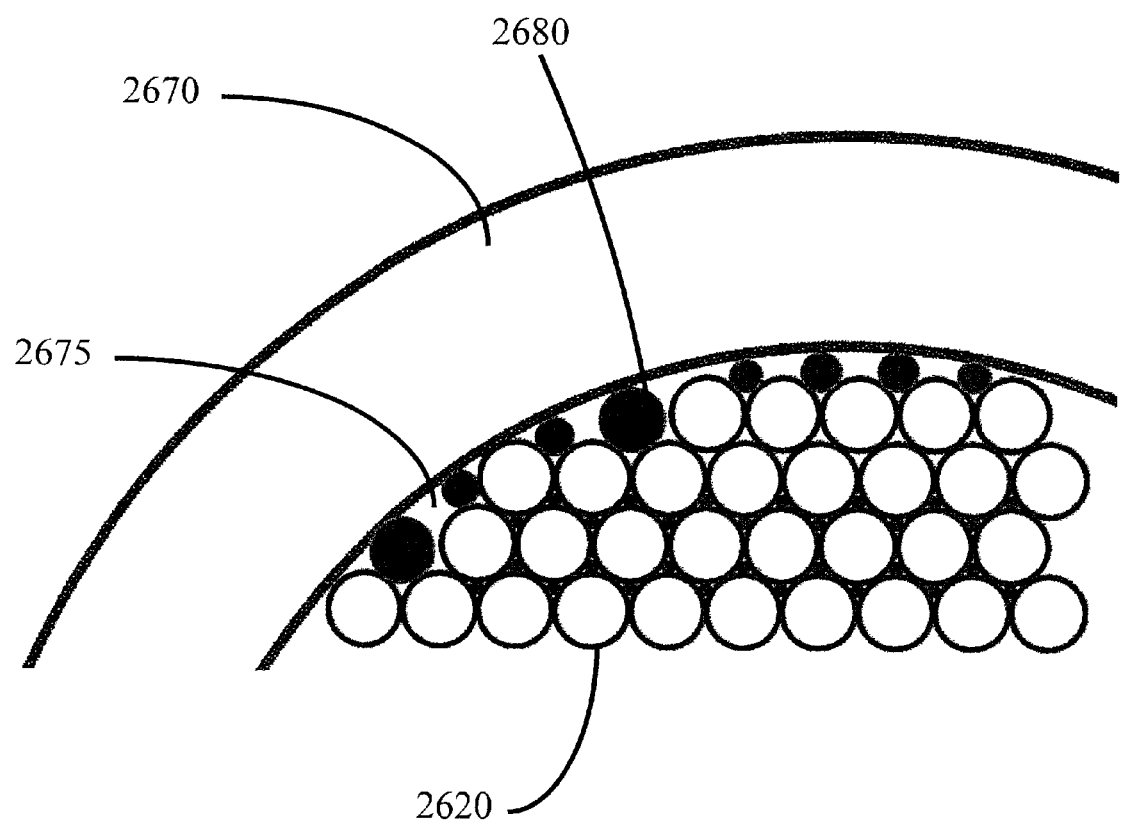
FIG. 26 is a diagram of an outer region of a pre-form stack according to embodiments of the present invention, wherein the stack is contained in a large, thick-walled capillary and interstitial regions between the inner surface of the large, thick-walled capillary and the stack contain various sizes of solid packing rod.

The diagram in FIG. 26 illustrates a small portion of an outer region of a pre-form stack 2600 made from circular cross section capillaries 2620. In this embodiment, the entire stack is contained in a large circular cross section capillary tube 2670, having a generally circular bore, which is large enough to receive the entire assembled stack as a sliding fit. As shown, interstitial voids 2675 form between the edges of the stack and the internal surface of the large capillary. It has been found beneficial to pack these interstitial voids with circular cross section packing rods 2680, having various sizes selected to support all cladding capillaries in their appropriate positions within the large capillary. These rods melt and fuse with the large circular capillary to form a homogeneous outer layer of glass that surrounds the microstructured inner region.

Figure 32:
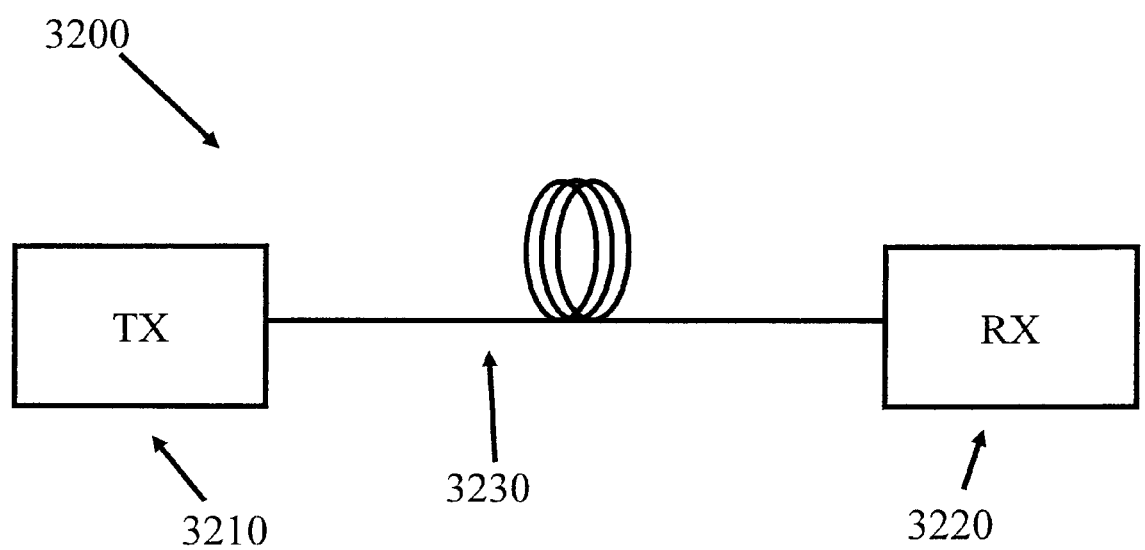
FIG. 32 is a diagram of a transmission system that can be adapted to incorporate a fiber according to the present invention.

FIG. 32 is a diagram of a transmission system 3200 comprising an optical transmitter 3210, an optical receiver 3220 and an optical fiber 3230 between the transmitter and receiver. The optical fiber 3230 comprises along at least a part of its length an optical fiber according to an embodiment of the present invention. Other components or systems, for example to compensate for dispersion and loss, would typically be included in the system but are not shown in FIG. 32 for the sake of convenience only.

The following examples of different structures closely resemble practical optical fiber structures, which have either been made by the present inventors or may be made according to known processes or the processes described hereinafter. The exemplary structures share the following common characteristics:

a pitch Λ of the cladding chosen between values of approximately 3 µm and 6 µm (this value may be chosen to position core-guided modes at an appropriate wavelength for a particular application);

a thickness t of the cladding veins of about 0.06 times the chosen pitch Λ of the cladding structure (or simply 0.0586Λ);

an AFF in the cladding of approximately 91%; and a ratio R having a value of about 0.6.

For other features and parameters referred to in the following, reference is made to FIGS. 1 and 2 and the discussion above.

In particular, a figure of merit, identified herein as F-factor, is used by the present inventors as a measure of the degree to which the guided light propagating in a PBG fiber is subject to scattering from small scale irregularities of the air-silica interfaces. F-factor is also believed to be a strong indicator of likely mode-coupling characteristics of a PBG-fiber. The most relevant F-factor is typically the F-factor only of the mode of interest (for example, the fundamental mode, ignoring higher-order modes).

Scattering due to small scale irregularities acts in addition to the Rayleigh scattering due to index inhomogeneity within silica, or any other such optical guiding medium. The latter loss mechanism is strongly suppressed in air-core PBG fibers, if most of the light power is in air. It remains to ascertain the limit that hole interface scattering places on loss, given that some interface roughness is always present. The amount of scattering associated with air-silica boundaries can be minimised by ensuring that impurities are eliminated during the draw process; such impurities can act as scattering (and absorption) centers directly, and can operate as nucleation sites for crystallite formation. With these imperfections removed, there still remains interface roughness governed by the thermodynamics of the drawing process. The inventors believe that such fluctuations are likely to be difficult or impossible to remove altogether.

The Rayleigh scattering due to small scale roughness at the air-silica interfaces may be calculated by applying a perturbation calculation. The analysis has a simple interpretation in terms of effective particulate scatterers distributed on the interfaces. If the root-mean square (RMS) height roughness is $h_{rms}$ and the correlation lengths of the roughness along the hole direction and around the hole perimeter are $L_z$ and $L_\phi$ respectively, then a typical scatterer has a volume $h^{rms}L_zL_\phi$. The induced dipole moment of the typical scatterer is then given by $$p = \Delta \varepsilon E_0 h_{rms} L_z L_\phi \quad (2)$$

where $\Delta\varepsilon$ is the difference in dielectric constant between silica and air, and $E_0$ is the E-field strength at the scatterer. This induced dipole moment radiates a power, in the free space approximation, given by $$P_{sc} = \frac{1}{12\pi}\left(\frac{\omega}{c}\right)^4 \left(\frac{\varepsilon_0}{\mu_0}\right)^{1/2} |p|^2 \quad (3)$$
$$= \frac{1}{12\pi}\left(\frac{\omega}{c}\right)^4 \Delta\varepsilon^2 h_{rms}^2 L_z^2 L_\phi^2 \left(\frac{\varepsilon_0}{\mu_0}\right)^{1/2} |E_0|^2.$$

The number density of particles on the interface will be $\sim 1/(L_zL_\phi)$ so that the total radiated power from a section of length L of the perturbed fiber will be approximately $$P_{rad} \sim \frac{1}{12\pi}\left(\frac{\omega}{c}\right)^4 \Delta\varepsilon^2 h_{rms}^2 L_z L_\phi L \left(\frac{\varepsilon_0}{\mu_0}\right)^{1/2} \oint_{hole\ perimeters} ds|E_0|^2 \quad (4)$$

The loss rate is thus given by $$\gamma = \frac{P_{rad}}{P_0 L} \sim \frac{1}{6\pi}\left(\frac{\omega}{c}\right)^4 \Delta\varepsilon^2 h_{rms}^2 L_z L_\phi \left(\frac{\varepsilon_0}{\mu_0}\right)^{1/2} \frac{\oint_{hole\ perimeters} ds|E_0|^2}{\int dS(E_0 \wedge H_0^*)\cdot\hat{z}} \quad (5)$$

where the incident power $P_0$ has been expressed as a Poynting flux.

Equation (5) shows that the mode shape dependence of the Rayleigh interface roughness scattering strength is governed by an F-factor, given by $$F = \left(\frac{\varepsilon_0}{\mu_0}\right)^{1/2} \frac{\oint_{hole\ perimeters} ds|E_0(r')|^2}{\int_{x-section} dS(E_0 \wedge H_0^*)\cdot\hat{z}}. \quad (6)$$

For values stated herein, F-factor has units of $\Lambda^{-1}$. The lower the F-factor is, the less interaction there is between light and air/glass interfaces and the lower the degree of scattering and mode coupling is. Embodiments of the present invention are intended to have reduced F-factor compared with prior art fibers.

The inventors have found that a comparison of the interface scattering strength from guided modes of different fibers with similar interface roughness properties can be based purely on the F-factor. Indeed, the thermodynamic limit to surface roughness is not expected to vary greatly with small variations in the fiber geometry, so that the F-factor can be used directly as a figure of merit for any fiber which has interfaces which cause scattering and contribute to loss.

The F-factor of a particular structure can also be measured indirectly for a real fiber structure by the following method. A SEM or atomic force microscopy (AFM) image is taken of the cross-sectional structure of the fiber in question. An accurate representation of the structure, suitable for use in computer modelling, is obtained from the image by estimating the position of the structural boundaries throughout the cross-section. Based on this representation, the mode field can be simulated by solving Maxwell's vector wave equation for the fiber structure, using known techniques, as already described. Knowledge of the electric and magnetic field distributions enables both the numerator and denominator in Equation (6) above to be calculated.

The very small size of the thin veins in the structure means that great care must be taken when interpreting an SEM image. The apparent thickness of a vein in the image may be slightly different from the true thickness, but the small discrepancy will have a large impact on the F-factors determined from it. It is therefore advisable to confirm the validity of the process by which the model structure is determined from the SEM image, to yield a reliable fit. One way to confirm the fit would be through spectral measurements of the loss of the fiber, which often show peaks at particular wavelengths due to mode crossings [see, for example, Smith et al., "Low-loss hollow-core silica/air photonic bandgap fiber", Nature, Vol. 424 pp 657-659, 7 Aug. 2003].

In arriving at the present invention, the present inventors have analysed the performance of various fiber structures, which are generally similar to the structure shown in FIG. 1. The structures analysed herein, however, differ from one other and from the structure in FIG. 1 by having different sizes and shapes of bead around the core boundary.

Figure 27:
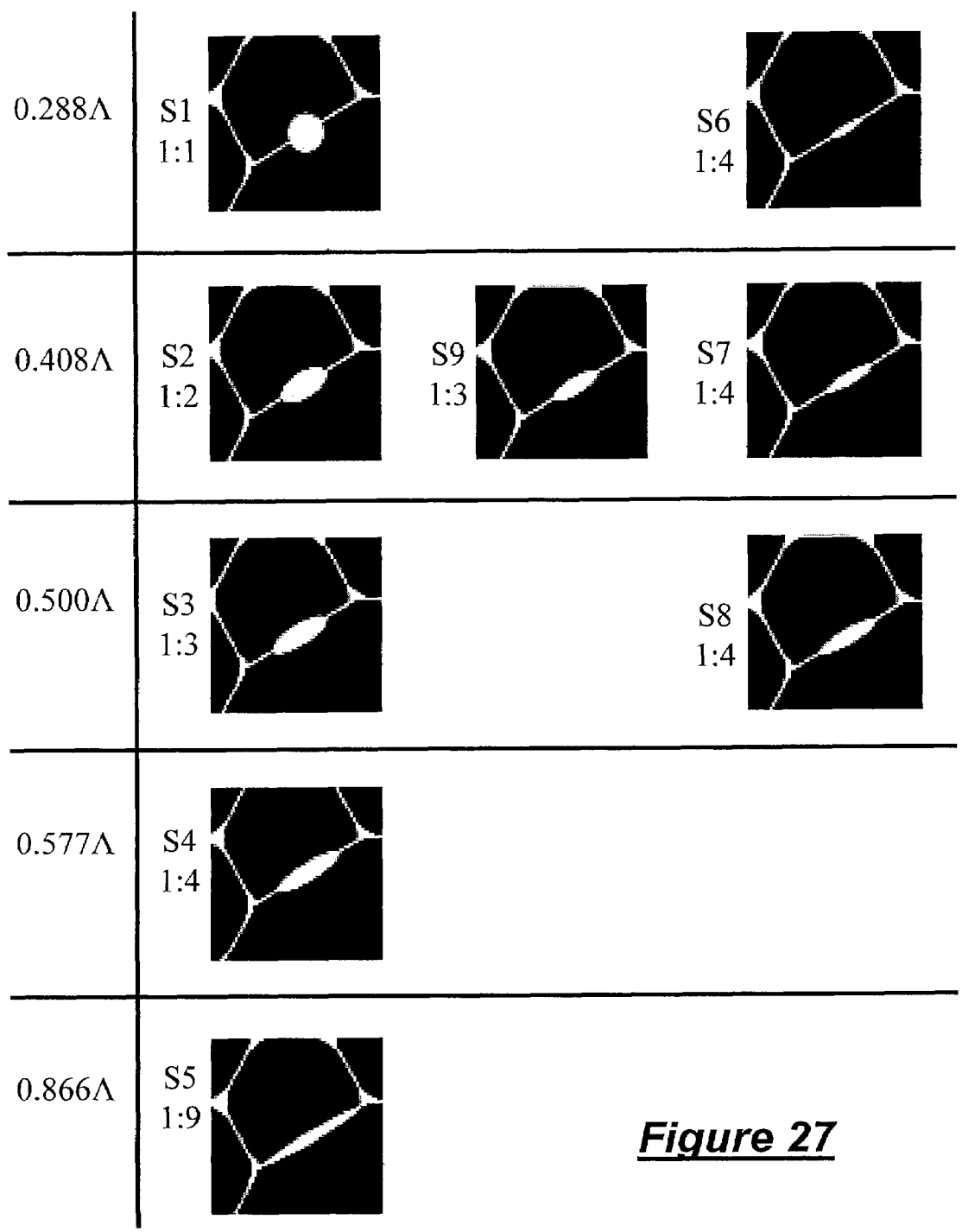
FIG. 27 shows diagrams of the various beads that were incorporated in the fiber structures described hereinafter.

The different bead types described herein are illustrated schematically in the diagrams in FIG. 27. In FIG. 27, there are nine beads types, labelled S1 to S9. Beads S1 to S9 have the aspect ratios shown as (minor dimension: major dimension). Beads S1 to S5 have in common the same cross-sectional area and beads S6 to S8 have in common the same aspect ratio. Also, beads S1 and S6 share the same major dimension, which is shown in FIG. 3 as a fraction 0.288 of the pitch, or 0.288Λ. Beads S2 and S3 share the same identified major dimensions with beads S7 and S8 respectively.

Bead S9 is an exception to the others in that it is arranged to be generally representative of the prior art beads, having an aspect ratio of 1:3 and a major dimension which is just over 0.4Λ. The form of the prior art bead S9 was established by carefully measuring the relatively low resolution images in the respective prior art scientific papers.

In all fiber structures analysed herein, the beads are located midway along every other one of the longer boundary veins, which are associated with the pentagonal boundary cells; similar to the beads shown in the diagram in FIG. 1. That is, each fiber structure has six beads around the core boundary, which encloses a seven cell core defect, and the beads are substantially the same in any given structure. While other kinds of structures are not described in detail herein, the present inventors believe that similar principles of bead-type selection will apply to other forms of structure, for example a nineteen cell core defect structure, and the skilled person, on reading the present description, will be able to analyse a broad range of bead sizes and types with different kinds of fiber structure.

Figure 28:
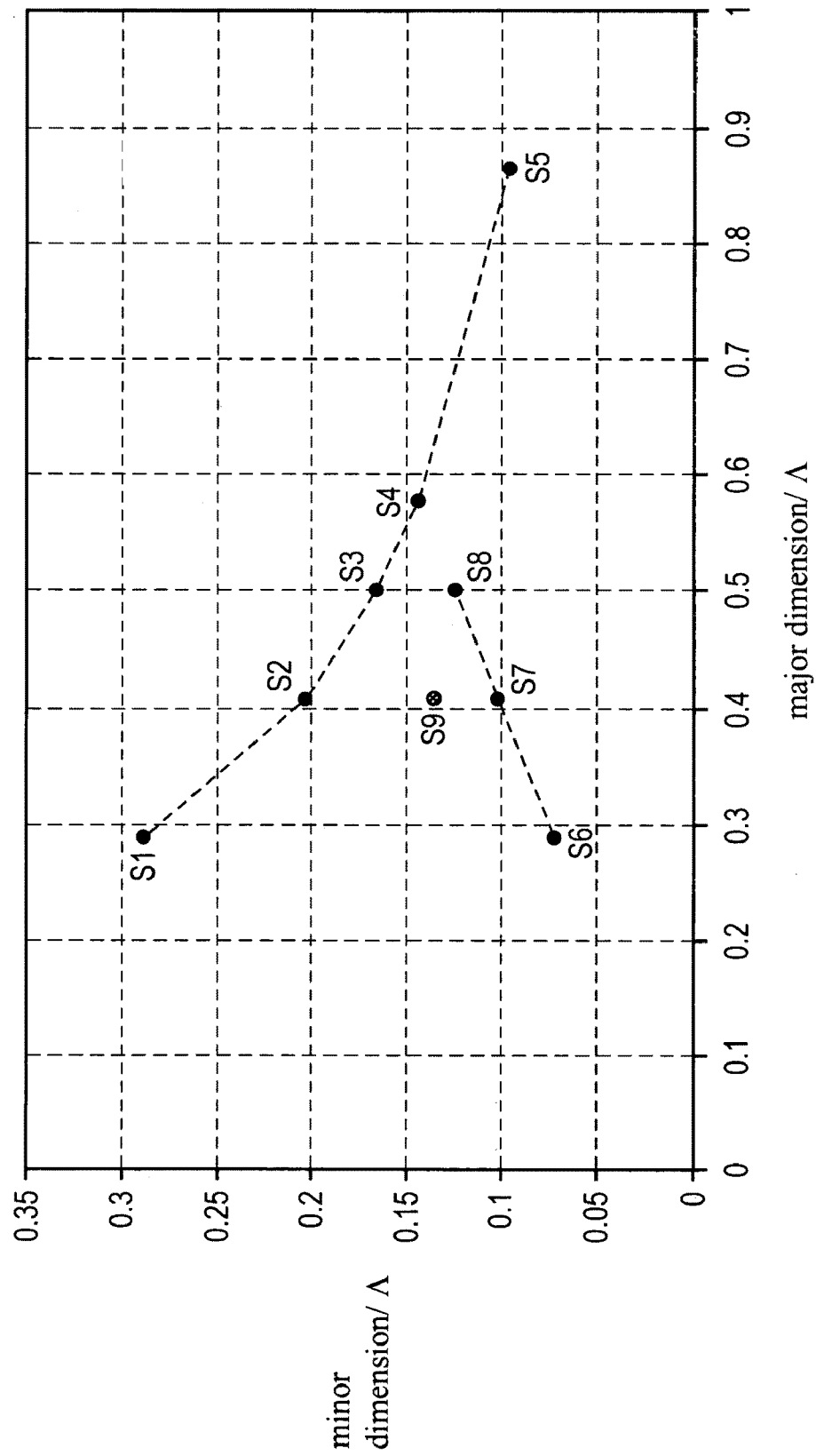
FIG. 28 is a graph showing the physical dimensions of the beads shown in FIG. 27.

The relative form of the beads S1 to S9 is shown on the graph in FIG. 28, which plots minor dimension against major dimension, both in units of pitch Λ.

Figure 29:
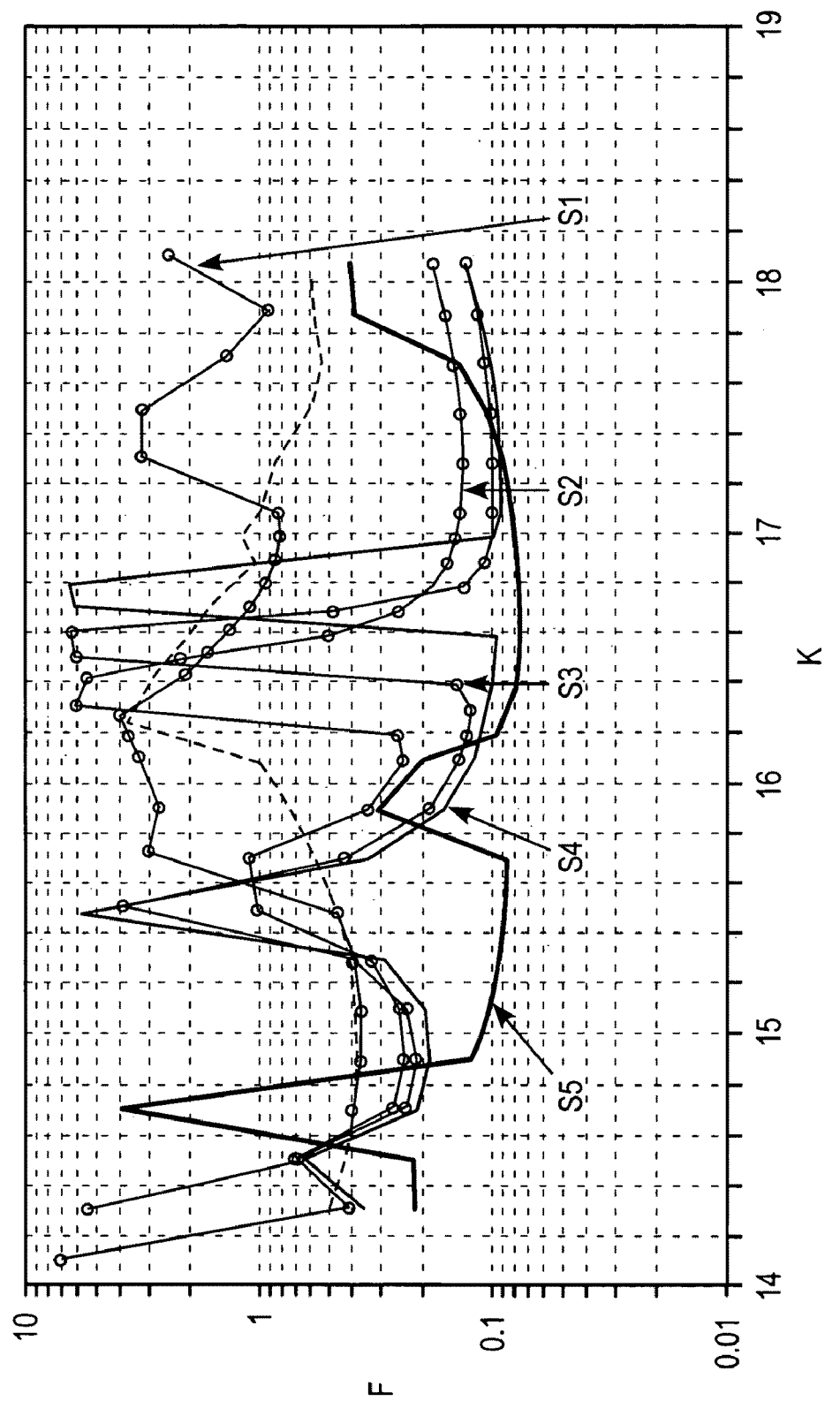
FIG. 29 is a graph plotting the variation in F-factor for fiber structures comprising around a core boundary beads according to FIG. 27.

The graph in FIG. 29 plots F-factor against normalised propagation constant K ($2\pi\Lambda/\lambda$) for structures S1 to S5, which share in common the same area. As shown in the graph, the values for F-factor vary significantly for each structure with varying wavelength. The peaks in each plot are believed to be due to mode crossings. The subject of mode crossings is beyond the scope of the present description. However, the reader is referred to papers, such as the aforementioned paper "Surface modes and loss in air-core photonic band-gap fibers", for a more detailed analysis of mode crossings.

A clear trend apparent from the graph in FIG. 29 is that, for a given bead area, F-factor decreases with decreasing aspect ratio. In other words, the F-factor appears to be at a highest level when the beads are substantially round (S1) and tends to decrease in value as the beads become more elongate. The fiber structure having beads of the form of S5 clearly has the best F-factor characteristics and is, therefore, expected to produce a low loss transmission fiber.

Figure 30:
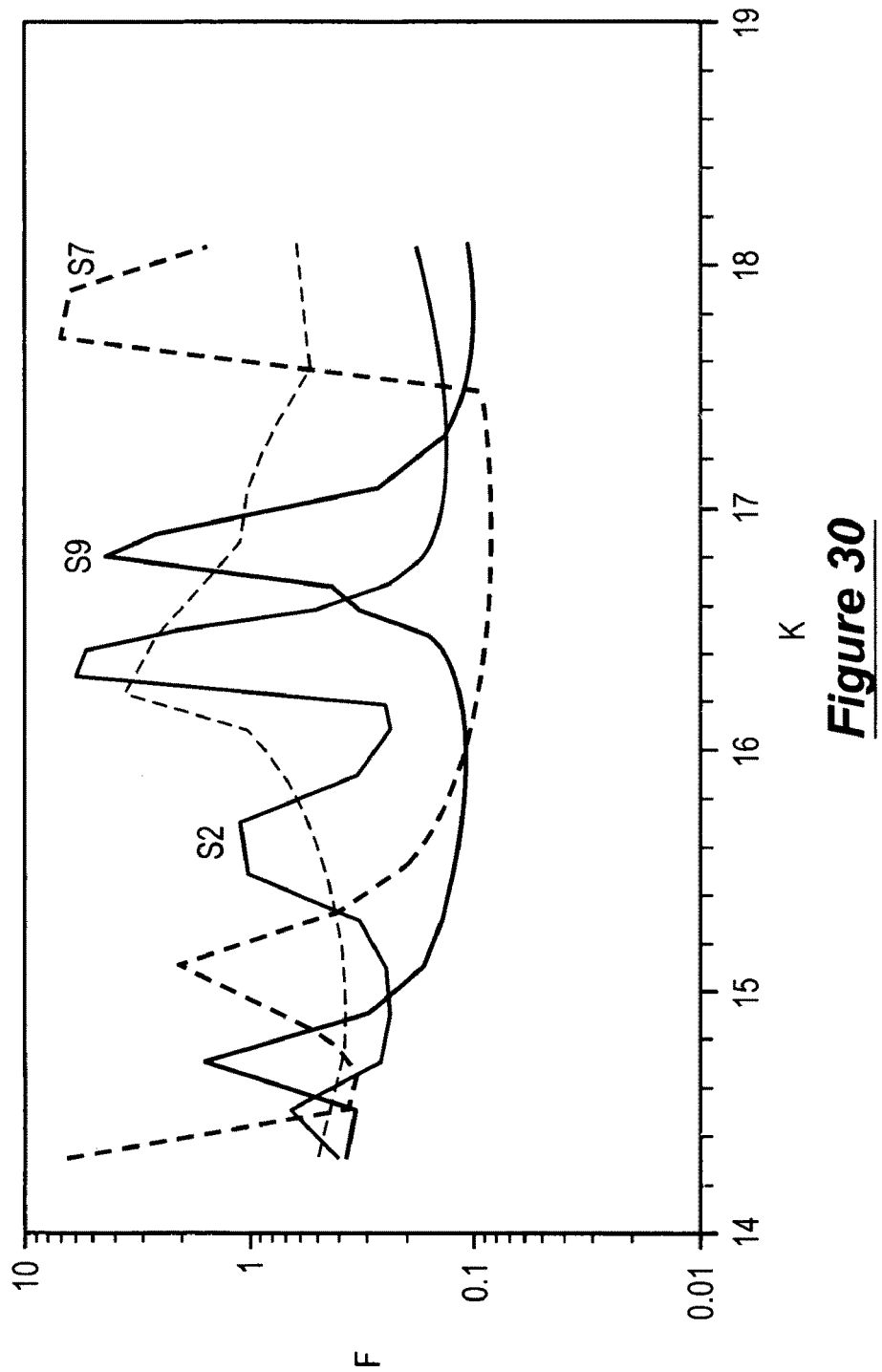
FIG. 30 is a graph plotting the variation in F-factor for fiber structures comprising around a core boundary other beads according to FIG. 27.

A similar graph is plotted in FIG. 30 for structures S2, S7 and S9, which share in common a major dimension of 0.408Λ. FIG. 30 clearly shows that, for a given major dimension, F-factor decreases with decreasing aspect ratio, with a fiber having beads of the form of S7 exhibiting the lowest F-factor characteristics.

A summary of lowest achieved F-factor for fiber structures having each kind of bead is illustrated in the graph in FIG. 31, and summarised in the following table 4. Each structure is represented by a circle on the graph, where the diameter of each circle represents the respective lowest F-factor.

TABLE 4

| Bead | Minor dimension/Λ | Major dimension/Λ | Aspect Ratio | Lowest F-factor |
|---|---|---|---|---|
| Constant Area | | | | |
| S1 | 0.288 | 0.288 | 1.00 (1:1) | 0.359 |
| S2 | 0.204 | 0.408 | 0.50 (1:2) | 0.132 |
| S3 | 0.167 | 0.500 | 0.33 (1:3) | 0.098 |
| S4 | 0.144 | 0.577 | 0.25 (1:4) | 0.090 |
| S5 | 0.096 | 0.866 | 0.11 (1:9) | 0.075 |
| Constant Ratio | | | | |
| S6 | 0.072 | 0.288 | 0.25 (1:4) | 0.183 |
| S7 | 0.102 | 0.408 | 0.25 (1:4) | 0.085 |
| S8 | 0.125 | 0.500 | 0.25 (1:4) | 0.088 |
| Prior Art | | | | |
| S9 | 0.136 | 0.408 | 0.33 (1:3) | 0.101 |

Figure 31:
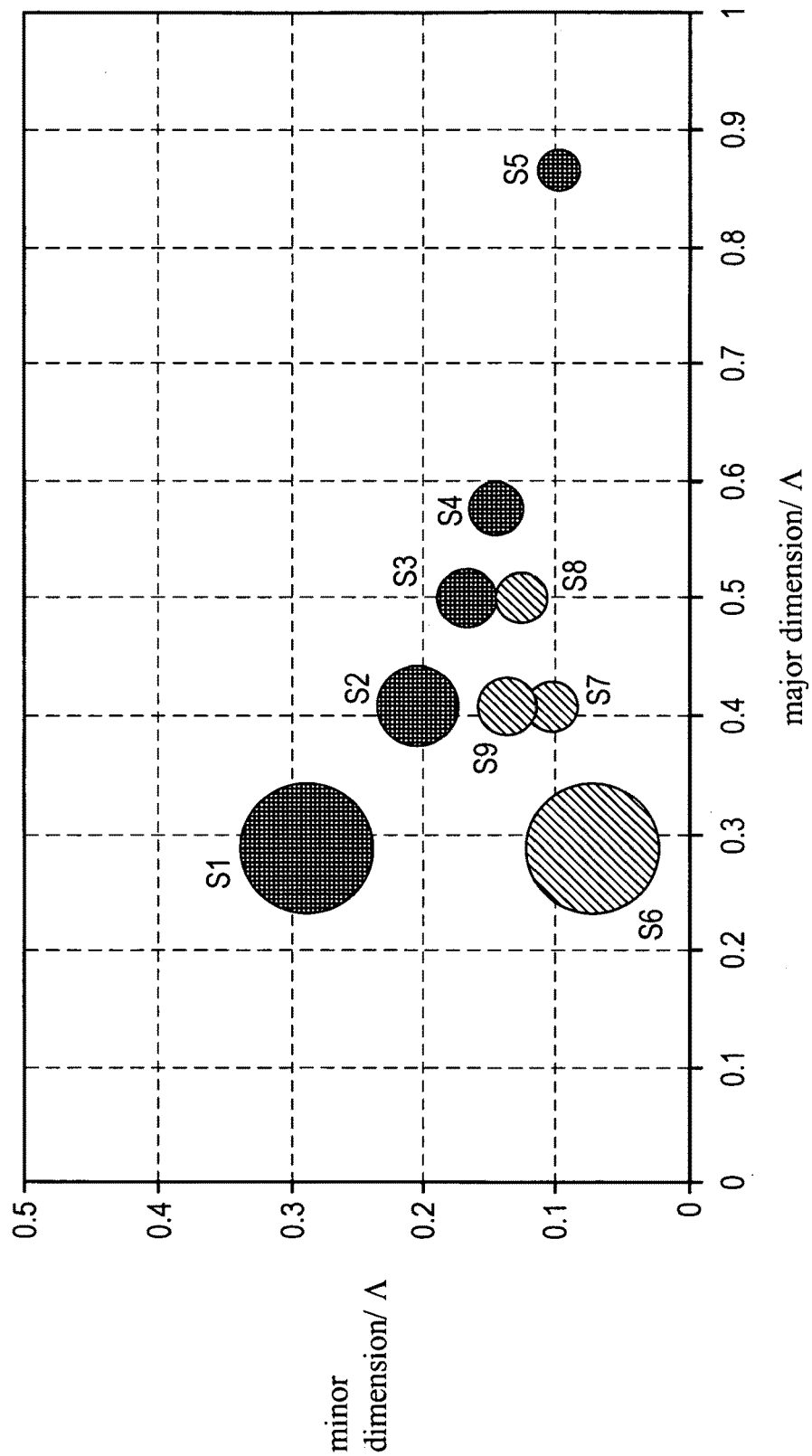
FIG. 31 is a chart which plots the minimum F-factors achieved by fibers incorporating beads shown in FIG. 27.

Even though the graph in FIG. 31, and the values in the table, do not represent the variation in F-factor across the waveband, the lowest F-factor values do represent their respective general trends (shown in the graphs in FIGS. 29 and 30) and so do provide a valid indication of likely relative performance of the various structures.

It is clear that the prior art beads perform better, in terms of F-factor, than a number of the other bead forms. For example, beads S1, S2 and S6, have relatively high associated F-factors and would be unlikely to perform as well as S9 in a practical fiber. In contrast, beads S3, S4, S5, S7 and S8, have varying degrees of improved (lower) F-factor, compared with S9, where S3 exhibits only a marginal improvement and S5 exhibits an extremely significant improvement. In other words, a fiber structure incorporating beads such as S5 is likely to produce a lower loss fiber than a prior art fiber incorporating beads such as S9.

In practical optical fiber transmission systems, it is expected that one fixed parameter will be operating wavelength. It is well-known that a PBG fiber can be designed for operation at a given wavelength, for example at around 1550 nm, since the dimensions of PBG structures simply scale with wavelength. However, the present inventors anticipate that there may be a need to tune a given PBG fiber structure, to optimise its performance at the given wavelength; for example, by manipulating the spectral positions of surface modes to move them away from the core modes of interest. Embodiments of the present invention are expected to find particularly beneficial application as a way of so tuning PBG fibers, independently or in addition to varying core diameter and other parameters of the fibers. This belief is supported by the graphs in FIGS. 29 and 30, where mode crossing peaks clearly move around the spectrum as a result of changing only the form of the beads.

With reference to FIG. 17, prior art structures of the kind exemplified in FIG. 1 may be made from a pre-form 1700 comprising a stack of hexagonal capillaries 1705. The hexagonal capillaries 1705 each have a circular bore. The cladding nodes 160 and boundary nodes 150 (from FIG. 1) of the PBG fiber structure result from the significant volume of glass that is present in the preform 1700 wherever the corners 1710, 1715 of neighboring capillaries meet. The beads 165 are formed from the glass of the inwardly-facing corners 1720 of the capillaries that bound an inner region 1725 of the pre-form 1700, which is to become the core defect region 110 (cf. FIG. 1) of a PBG fiber structure. These corners 1720, and the two sides of each capillary that meet at the corners, recede due to surface tension as the stack of capillaries is heated and drawn. Such recession turns the two sides and the corner 1720 into a boundary vein 140, with a bead 165. The inner region 1725 may be formed by omitting the inner seven capillaries from the pre-form and, for example, supporting the outer capillaries using truncated capillaries at either end of the stack, as described in PCT/GB00/01249 (described above) or by fusing a complete stack of capillaries together and then etching away glass from inner capillaries in accordance with either of the processes described in PCT/GB00/01249 or U.S. Pat. No. 6,444,133. In some prior art structures, it is believed that the beads may result from an etching process rather than being entirely due to use of hexagonal capillaries. In either event, though, the beads are merely an artefact of the process used to make the fiber, rather than being an intentional feature of the final structure.

While it may be possible to adapt prior art processes for making fibers according to embodiments of the present invention, in which bead size and shape are selectively varied, the present inventors believe it would be difficult. For example, it would be difficult to adapt the preform in FIG. 17 to produce larger or more elongate beads than those shown in FIG. 1, without interfering with one or more other characteristics of the fiber. In general, formation of different sizes and shapes of beads or nodules (or the like) at selected locations around the core boundary is likely to be difficult using prior art processes.

The diagram in FIG. 19 illustrates one way of forming a pre-form stack 1900, including a seven cell core region 1910, which is suitable for forming a PBG fiber structure according to embodiments of the present invention. The core region 1910 is formed by assembling circular cross section capillaries 1905 in a close-packed triangular arrangement around a large diameter core capillary 1915, which is large enough to support capillaries around a region left by removal of seven capillaries: an inner capillary and the six capillaries around the inner capillary. The large diameter core capillary 1915 supports the cladding capillaries while the stack is being formed and eventually becomes part of the material that forms a core defect boundary.

Interstitial voids 1920 that form at the mid-point of each close-packed, triangular group of three cladding capillaries are each packed with a glass rod 1925. The rods 1925 that are packed in the voids assist in forming cladding nodes, which have a diameter d that is typically significantly greater than the thickness t of the veins that meet at the nodes. Omission of a rod from a void in the cladding leads to the formation of a cladding node that has a relatively smaller diameter, for example closer to the thickness of the respective adjoining veins.

The rods 1925 may be inserted into the voids after the capillaries have been stacked. Alternatively, the stack may be assembled layer by layer, with the rods that rest on top of capillaries being supported by an appropriate jig, for example positioned at either end of the stack, until the next upper layer of capillaries is in place to support those rods. In commercial scale operations, it is apparent that the manual task of forming a pre-form stack could readily be automated, using appropriately programmed robots, for example of the kind used in component laying for printed circuit boards.

The interstitial voids 1930 that are formed between the cladding capillaries 1905 and the large diameter capillary 1915 are not packed with any rods, thereby minimising the volume of glass that is available, during drawing of the stack 1900, for formation of boundary nodes.

As shown in FIG. 19, the large diameter capillary 1915 has attached to its inner surface twelve silica rods 1935. The rods 1935 are fused to the inside of the large diameter capillary 1915 in an additional heating step before the capillary is introduced to the stack 1900. When the stack 1900 is heated and drawn into fiber, these rods fuse with the large diameter capillary 1915, which itself fuses to the inwardly facing surfaces of the innermost cladding capillaries, to form core boundary beads of the kind described herein. The rods 1935 can be selectively positioned on the inside of the large diameter capillary 1915 to be aligned with either or both of the longer or shorter core boundary veins. Of course, within practical limits, any number of rods 1935 may be attached to the inside, or indeed outside, of the large diameter capillary 1915. If attached on the outside of the large diameter capillary 1915, the rods may be aligned with the larger interstitial voids 1930. Of course, the size of the bead required in the fiber structure dictates the selected diameter of the respective rod 1935.

In principle, rods 1935 may be attached to the inside or to the outside of the large diameter capillary 1915. Indeed, rods may in principle be attached to both the inside and the outside of the same region of the large diameter capillary 1950, so that they form a relatively larger bead on the core boundary.

The pre-form stack 1900 is arranged as described with reference to FIG. 19 and is then over-clad with a further, relatively thick-walled capillary, which is large enough to contain the stack and small enough to hold the capillaries and rods firmly in place. The entire over-clad stack is then heated and drawn into a so-called cane, during which time all the relatively large interstitial voids 1930 and any remaining voids between the glass rods and the cladding capillaries, collapse due to surface tension. Then, the cane is, again, over-clad with a further, thick silica cladding tube and is heated and drawn into optical fiber in a known way. If surface tension alone is insufficient to collapse any of the interstitial voids, a vacuum may be applied to the interstitial voids, either or both during drawing of the stack into a cane or the cane into the fiber, for example according to the process described in WO 00/49436 (The University of Bath).

FIG. 20*a* is a photograph, taken by the present inventors through a microscope, of a rod fused to a large diameter capillary before the capillary is introduced into a pre-form stack. The shape of the resulting bead can be controlled by the fiber drawing conditions. For example, hotter drawing conditions under lower tension permit a rod and boundary to fuse completely, thereby forming a more elongate bead. In contrast, a colder draw under higher tension forms a bead with a shorter major dimension.

FIG. 20b is an SEM image of a bead along the core boundary of a fiber. The structure is a result of heating and drawing a preform containing the rod shown in FIG. 10a. The drawing conditions included a heating temperature of about 2050° C., a draw speed of about 2 ms$^{-1}$ and a draw tension of about 240 g. Clearly, in order to form a bead of the kind illustrated by S3, S4 or S5, it would be necessary to use a rod (or rods) having a greater cross section area.

An alternative method of forming a pre-form stack 2100, which results in beads on shorter boundary veins only, is illustrated in FIG. 21. Generally, the stack 2100 comprises the same arrangement of cladding capillaries 2105, and a large diameter capillary, as in stack 1900 of FIG. 19. In this example, however, the larger interstitial voids 2130, which form between every other one of the innermost capillaries and the large diameter capillary 2115, are packed with a glass rod 2140 and two thin-walled capillaries 2145, which act to hold the glass rod 2140 in a central position in the void during drawing down into a cane. Unlike in stack 1900, the rods 2140 and capillaries 2145 are not fused to the large diameter capillary 2115 before it is introduced to the stack 2100. Rather, they are introduced into the stack during assembly thereof. When the stack 2100 is heated and drawn down, the rods 2140 and thin-walled capillaries, which collapse entirely (if necessary with the application of a vacuum), form elongate beads on the shorter boundary veins. Such beads can resemble those illustrated by S5 or S8. In principle, a similar arrangement of rods and thin-walled capillaries may be fused to the inner surface of a large diameter capillary, in the event the resulting beads are to be positioned along the longer boundary veins.

A further alternative way to form the fiber is by using a process similar to that described in PCT/GB00/01249, wherein the cladding capillaries and rods, and additional capillaries and/or rods for shaping the boundary, are supported by truncated capillaries at either end of the stack. The stack may be drawn to an optical fiber in the normal way, and the parts of the fiber incorporating the truncated capillary material may be discarded. In principle, truncated capillaries may also be used to support the stack part way along its length.

FIG. 32 is a diagram of a transmission system 3200 comprising an optical transmitter 3210, an optical receiver 3220 and an optical fiber 3230 between the transmitter and receiver. The optical fiber 3230 comprises along at least a part of its length an optical fiber according to an embodiment of the present invention. Other components or systems, for example to compensate for dispersion and loss, would typically be included in the system but are not shown in FIG. 32 for the sake of convenience only.

The structure in FIG. 1 and each of the following examples of different structures closely resemble practical optical fiber structures, which have either been made or may be made according to known processes or the processes described hereinafter. The structures share the following common characteristics:

a pitch Λ of the cladding chosen between values of approximately 3 μm and 6 μm (this value may be chosen to position core-guided modes at an appropriate wavelength for a particular application);

a thickness t of the cladding veins of 0.0548 times the chosen pitch Λ of the cladding structure (or simply 0.0548Λ);

an air-filling fraction (AFF) in the cladding of approximately 87.5%.

For other features and parameters referred to in the following, reference is made to FIGS. 1 and 2 and the discussion above.

The present inventors have determined that it is possible to control the performance of PBG fibers in particular by aiming to maximise the amount of light that propagates in air within the fiber structure, even if some light is not in the core, in order to benefit from the properties of PBG fibers, such as reduced absorption, non-linearity and, in addition, reduced mode coupling.

In particular, the inventors have identified the importance of the shape of the boundary for controlling the amount of light that propagates in air within the structure and for controlling the F-factor of the structure.

The core-cladding interface region of an air core PBG waveguide such as a photonic crystal fiber can be designed to exploit an anti-resonance effect to enhance the fraction of the mode power which resides in air. The geometry giving rise to the anti-resonance discussed here is based on a number of substantially localized regions of silica (nodules 165) placed on the core surround.

As described above, FIG. 1 shows examples of locally concentrated high index regions (nodules 165) encircling an air core 110. Thin silica veins or struts 130, 140 connect the nodules together. Those struts directly connect onto to the PBG cladding region. If the struts connecting the concentrated regions of silica are thin, having a thickness less than 0.15 times the operational wavelength λ (which they are in the case of FIG. 1), then the struts 130, 140 connecting the localized high index regions do not themselves induce an anti-resonance effect; the anti-resonance is associated with substantially isolated high index regions 165. Indeed, it is found that localized regions of high index on a thin core surround can confine light better than a continuous core surround which possesses an approximately even density of silica, although alternatively a continuous core surround can be optimised, as described in co-pending International Patent Application.

The fiber of FIG. 1 has a structure similar to structures disclosed in several prior art publications, for example, "Low Loss (13 dB/km) Air Core Photonic Bandgap Fiber", Venkataraman et al., Proc. ECOC 2002, Copenhagen; "Interferometric Chromatic Dispersion Measurement of Photonic Band-gap Fiber", Mueller et al., Proc. SPIE 2002, Vol. 4870, Boston; "Photonic Crystal Fibers", West et al., Proc. ECOC 2001, paper ThA22, Vol. 4, Amsterdam; and "Photonic Crystal Fibers: Effective-Index and Band-Gap Guidance", Gallagher et al., Photonic Crystals and Light Localization in the 21$^{st}$ Century, pp. 305-320, Kluver (ISBN 0-7923-6947-5); "Dispersion and nonlinear propagation in air-core photonic band-gap fibers", Ouzounov, Ahmad, Gaeta, Müller, Venkataraman, Gallagher, Koch, CLEO 2003. The nodules present in those structures appear to be artefacts of the process used to manufacture the waveguides described. None of the prior art documents attach any significance to the features and there is no suggestion that the features exhibit any antiresonance effect. Moreover, the present inventors have investigated the structures disclosed in those prior art documents and have found nothing to suggest that those structures exhibit antiresonance: generally the nodules appear to be too small. However, the inventors have discovered that structures similar to the prior art structures do exhibit beneficial antiresonance effects. The inventors have discovered that presence or absence of these effects is very sensitive to the geometry of the structure, such as the dimensions of the nodules. Investigations by the inventors suggest that the described prior art structure has nodules with L in the range 0.27Λ to 0.45Λ and W in the range 0.11Λ to 0.21Λ; however, calculation of those values is based on an analysis of the SEM images in the prior art documents and the accuracy of the analysis is dependent upon the quality of those images. Those prior art structures, be they corresponding to those ranges or otherwise, are hereby disclaimed.

Figure 33:
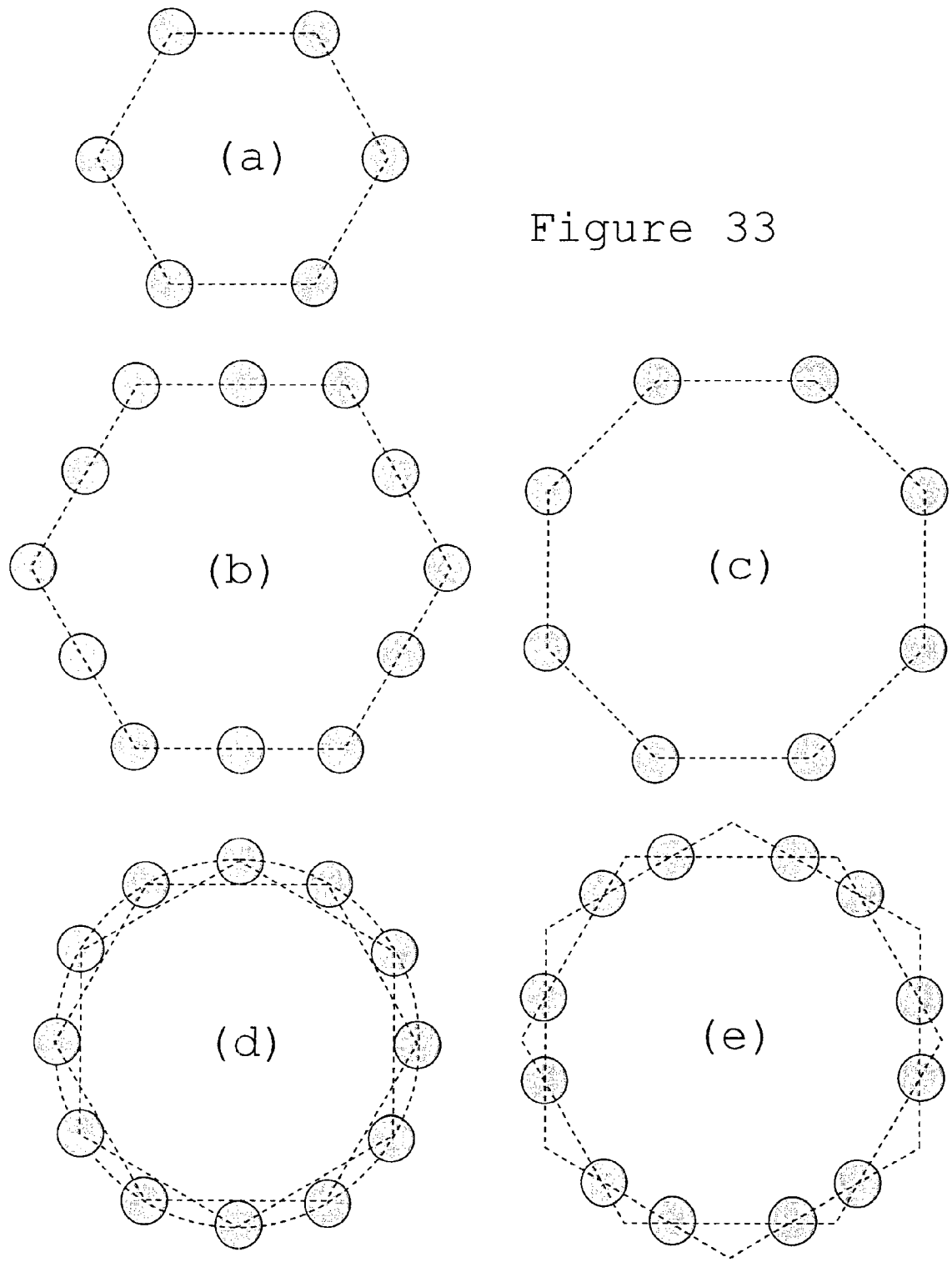
FIG. 33 is a schematic diagram of some examples of corral systems comprising dielectric cylinders in air (the dashed lines are used for geometric construction purposes)

The mechanism by which anti-resonance due to localized regions of high index can occur may be understood by considering a corral of high index cylinders distributed around a closed loop, which may or may not be a circle. Examples of such a geometry are shown in FIG. 33. The cylinders are everywhere surrounded by air. This system may be analysed quickly and accurately by employing a multiple scattering approach which fully exploits Mie-scattering theory; the field scattered from each cylinder is expanded in a multipole series. By applying the electromagnetic boundary conditions at the surfaces of the cylinders, an eigenvalue equation is derived. The method invokes radiating boundary conditions and can readily calculate leaky modes as well as guiding modes of the system; the former are obtained as solutions with complex β-values, with β the wavevector component along the direction of a cylinder axis. The guided modes, which are concentrated in the cylinders, satisfy Re[β]>ω/c, Im[β]=0. Only leaky modes with small imaginary β components, and which therefore leak only slowly, are retained; leakage rate is proportional to Im[β]. Re[β] for the leaky mode solutions lies close to and just below the air light-line value ω/c.

Figure 34:
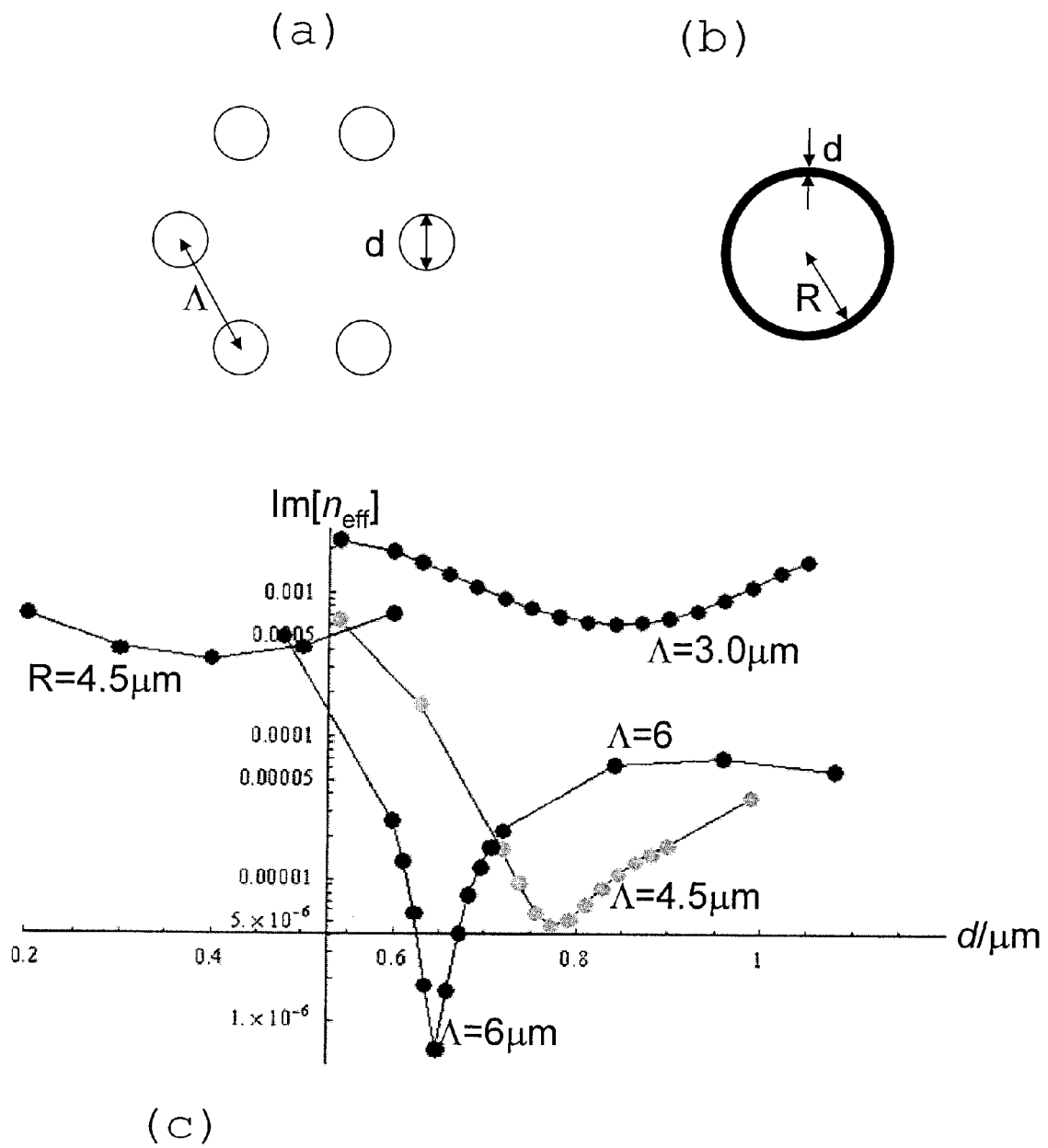
FIG. 34 is a plot showing the imaginary part of the effective mode index neff for a corral system comprising six identical silica cylinders in air arranged hexagonally; the distance between the cylinders is Λ=3.0, 4.5 and 6.0 μm and the wavelength is λ=1.55 μm; Im[neff], which is plotted against cylinder diameter d, is related to Im[β] by $$\mathrm{Im}[n_{\mathit{eff}}] = \frac{\lambda \mathrm{Im}[\beta]}{2\pi};$$

A corral system, such as any of the examples shown in FIG. 33, is found to support an $LP_{01}$-like leaky mode solution, which possesses an approximately Gaussian intensity profile centered at a point p in the air region which is enclosed by the corral arrangement. Those solutions exist close to the air light line, β=ω/c, so that the cylinders have a strong influence on the field. The cylinders force near nulls in the field intensity to occur close to their boundaries. For a given cylinder arrangement, by adjusting the size of the cylinders, the near nulls can be placed very close to the positions on the cylinder boundaries which lie closest to the point p. It is observed that Im[β] of the leaky mode solution is minimised when this occurs, meaning that the leakage rate is minimised. That is interpreted as an anti-resonance of the corral system; anti-resonances of more simple confining systems such as a dielectric ring are also signalled by a near-null occurring very close to the innermost dielectric interface. FIG. 34(c) plots Im[β] against the cylinder diameter d for 6 cylinders evenly spaced around a circle (FIG. 34(a)), with circle radii R=3.0, 4.5 and 6.0 μm. (As is well known, the imaginary part of a refractive index corresponds physically to loss in the medium.) Also shown is Im[β] for a circular silica ring against its thickness d, for a ring radius of R=4.5 μm (FIG. 34(b)). The wavelength was set to λ=1.55 μm. The superior confinement ability of the cylinder corral system at Λ=4.5 μm is clearly observed.

The confining ability of a corral system is very dependent on the number and the location of the high index regions. If the regions are too far apart, such that for the $LP_{01}$-like leaky mode solution $|\sqrt{(\omega/c)^2 - \beta^2}|d$ exceeds approximately π, with d the largest separation of neighbouring high index regions in the corral, confinement will be weak. That is because the mode can resolve one or more of the gaps between the high index regions and so escape. That resolution argument can also be invoked to explain why the corral system supports far fewer leaky modes than a continuous element such as a dielectric ring. The in-plane wavevector associated with higher order modes exceeds that of the more slowly varying $LP_{01}$-like mode, so that in the corral system, the higher order modes are more able to resolve the gaps between the high-index regions and leak away. This is an advantage of the corral system over the continuous design; the latter will generally support more modes within and nearby the band gap region and will therefore be more subject to mode coupling loss.

Optimum confinement induced by a number of identical, parallel high-index cylinders in a corral geometry is achieved when the cylinders are evenly spaced over the circumference of a circle. The optimum number of cylinders to place around the circle depends on its radius R. The width of the anti-resonance as a function of parameters such as cylinder radius or wavelength is increased by including more cylinders, but increasing the number of cylinders beyond a certain number will weaken the confinement that can be achieved.

Although the circular corral arrangement of cylinders is optimum, the $LP_{01}$-like leaky mode is able to accommodate significant movement in cylinder positions without incurring much increase in loss; the field associated with this mode redistributes itself to move the near nulls of the field so that they remain close to the cylinder boundaries. The loss penalty incurred by the movement is small as long as the area of the region existing within the corral exceeds $\sim 10\lambda^2$ and the separation of neighbouring cylinders remains below the resolution capacity of the mode. FIGS. 35 (a) and (b) shows the field intensity distribution for two different arrangements of 12 identical silica cylinders. In each case, the radius of the cylinders was chosen to correspond to anti-resonance. The maintenance of the positions of nulls close to the cylinder boundaries is clearly observed. FIG. 36 compares the confinement ability of the two arrangements of 12 cylinders as a function of the cylinder diameter d. The difference in the confinement ability of the two geometries is not severe. The confinement of the 12 cylinders evenly distributed around the hexagon, shown in FIG. 35(b), is found to be virtually identical with 12 cylinders distributed evenly around a circle with an area equal to that of the hexagon.

As described above, the present inventors have determined that it is possible to control the performance of PBG fibers in particular by minimising the F-factor or maximising the amount of light that propagates in air within the fiber structure, even if some light is not in the core, in order to benefit from the properties of PBG fibers, such as reduced absorption, non-linearity and, in addition, reduced mode coupling. The present inventors use light power in air and F-factor as proxies to anti-resonance exhibited by the core boundary.

Corral systems comprising parallel elongated elements with different shapes in cross-section, such as ellipses, will behave similarly to the cylinder case described above. The confining ability of the anti-resonance will depend upon the shape and orientation of the elements; shapes with smooth surfaces with no locally high rates of curvature can be expected to induce better confinement than shapes which possess sharp features on their surfaces. Numerical simulations of air core PBG fibers which incorporate concentrated high index regions located around the core surround have shown that the corral anti-resonance effect remains present even in such a complex geometry. As a function of a parameter such as the size of the concentrated high index regions, broad maxima are observed in the power in air fraction η and broad minima appear in the factor F given by, Eqn. 7

$$F = \left(\frac{\varepsilon_0}{\mu_0}\right)^{1/2} \frac{\oint_{hole\ perimeters} ds |E_0|^2}{\int_{x-section} dS(E_0 \wedge H_0^*) \cdot \hat{z}} \tag{7}$$

The quantity F measures field intensity at the dielectric interfaces and gives a direct relative measure of the strength of small-scale interface roughness scattering and provides an indication of the relative strength of mode coupling effects due to longer scale fluctuations. Upon examination of the $LP_{01}$-like mode field intensity profile at maximum η and minimum F, it is observed that near nulls occur close to the boundaries of the concentrated high index regions at locations closest to the position of peak intensity p. That confirms the mechanism in operation has the character of anti-resonance. The band gap cladding region can be interpreted as simply completing the confinement of the mode, which has already been substantially localized by the corral effect. Indeed, exploiting a corral anti-resonance can render the field intensity everywhere within the cladding to be more than 20 dB below the peak intensity value. The analysis of the simple cylinder corral system presented above can be used to estimate the optimum number of concentrated elements to place around the core surround, give an indication of the size that these elements should have, and indicate the sensitivity to the parameters. Detailed numerical investigation of PBG photonic crystal fibers with concentrated index elements around the core supports this view.

In considering the variation of light in air and F-factor with any particular parameter, it should be noted that interactions between the mode being investigated and so-called surface modes near to the core boundary may lead to ghost resonance peaks. This kind of interaction is also identified in Müller, D. et al. "Measurement of photonic band-gap fiber transmission from 1.0 to 3.0 µm and impact of surface mode coupling." QTuL2 Proc. CLEO 2003 (2003). This paper supports the present inventors' view that mode power from the air-guided modes may couple to lossy surface modes, which concentrate in or near to the core boundary. The result is increased loss, attendant increased F-factor and reduced light in air fraction. Indeed, for the case of a core boundary of uniform thickness, it is found that such mode crossings are suppressed for core thicknesses close to the anti-resonant value, but become abundant for core thicknesses away from anti-resonance. This surface mode exclusion property associated with the anti-resonance renders the curves for F-factor and amount of light in air smoother as they reach optimum values at core boundary thicknesses close to the anti-resonant point.

That an antiresonant core boundary is desirable for reducing the impact and/or number of surface modes in a PBG fiber is surprising and counter-intuitive, particularly when one considers the prior art, for example the teachings in the book "Photonic Crystals: Molding the Flow of Light". From such a reference, the skilled man would understand that surface modes can form due to the inclusion of a defect in a PBF structure; for example a hollow core defect in a PBG fiber. After appreciating this, it would appear sensible to include only a single defect in the structure; where plural defects could lead to plural sets of surface modes. Hence, it would appear reasonable to form a core defect boundary that, as closely as possible, matches the veins in the cladding structure. Otherwise, the core defect boundary might been 'seen' by the light as a additional defect, or even a waveguide in its own right, since it neither matches the core defect nor the cladding. In other words, having a core defect boundary that is significantly different, for example thicker in transverse cross section, than the individual cladding veins of the PBG cladding structure, would not have been a natural choice for the skilled person who wanted to avoid the formation of surface modes.

In order to remove the ghost resonance peaks, it is either necessary to remove the surface states or adjust the operating point of the waveguide to avoid mode crossings. Moving the operating point for a given geometry can be achieved by varying the operating wavelength within the band gap and/or adjusting the pitch Λ of the photonic band-gap structure. Clearly the avoidance of mode crossings facilitated by a core surround close to anti-resonance will typically enable a wider wavelength bandwidth to be of practical use.

The inventors have investigated the effect of varying the size of nodules 165. To that end, an ellipse may be fitted to the nodule. FIG. 37 shows how ellipses are fitted to nodules 165 in a waveguide boundary region.

The light power-in-air fraction of a particular structure is directly measurable. The method of measuring light power-in-air involves taking a near-field image of light as it leaves the structure, overlaying it on an SEM image of the structure and directly calculating the light power-in-air fraction from the overlap of the two images.

The F-factor can also be calculated for a real fiber structure by the following method. A Scanning Electron Micrograph (SEM) is taken of the cross-sectional structure of the fiber in question. An accurate representation of the structure, suitable for use in computer modelling, is obtained from the SEM by estimating the position of the structural boundaries throughout the cross-section. The mode profile is then calculated from the estimated structure using a computer modelling scheme described below. This provides knowledge of the electric and magnetic field distributions which enables both the numerator and denominator in Equation (5) above to be calculated.

The very small size of the thin veins in the structure means that great care must be taken when interpreting an SEM image. The apparent thickness of a vein in the image may be slightly different from the true thickness, but the small discrepancy will have a large impact on the light power-in-air fraction and F-factors determined from it. It is therefore advisable to confirm the validity of the process by which the model structure is determined from the SEM image, to yield a reliable fit. One way to confirm the fit would be through spectral measurements of the loss of the fiber, which often show peaks at particular wavelengths due to mode crossings. [see Smith et al., "Low-loss hollow-core silica/air photonic bandgap fiber", Nature, Vol. 424 pp 657-659, 7 Aug. 2003]

The % light in air may also be calculated by superimposing the modelled mode on the modelled structure. FIG. 38 shows an idealised schematic of a portion of the fiber structure. Once the nodule is represented by an ellipse, the nodule is characterised by two parameters, the length L of the ellipse's major axis and the length W of its minor axis. In the example of FIG. 1, the strut width is 0.05477Λ, the length L of the fitted ellipse is 0.5Λ and the length W is 0.5Λ/3.

FIGS. 39 and 40 show how the proportion of light in air and the F-factor, respectively, of mode guided in a fiber having a structure of the general form of FIG. 1 varies with the parameters L and W, at an operating wavelength of 1550 nm. In generating the plots of FIGS. 39 and 40, the fiber structure of FIG. 1 was modelled on a computer and the proportion of light in air and the F-factor were calculated for various combinations of L and W. Each circle in the plots of FIGS. 39 and 40 represents one such combination of L and W; the diameter of the plotted circle is proportional to the proportion of light power in air or F-factor, with smaller circles representing better performance, that is a higher proportion of light in air or a lower F-factor. The largest circle in FIGS. 39 and 40, at co-ordinate (4Λ/12,4Λ/36) in each plot, corresponds to a % light in air of 96.7% and an a F-factor of $0.74\Lambda^{-1}$. The smallest circle in FIGS. 39 and 40, at co-ordinate (5Λ/12,6Λ/36) in each plot, corresponds to a % light in air of 99.3% and an a F-factor of $0.13\Lambda^{-1}$.

Plots of the kind shown in FIGS. 39 and 40 have been shown to provide a reliable means for distinguishing between good and bad structures and ascertaining antiresonant core wall behaviour. Obviously, a more rigorous numerical analysis might involve plotting the proportion of light in air and F-factor for all values of wavelength within the band-gap for any one given structure, since the plots can vary slightly at different wavelengths, particularly in the vicinity of mode crossings, as already described.

For the purposes of comparing aspects of the performance of various different structures it is useful to consider the modes that are supported in the band gap of various PBG fiber structures. This may be achieved by solving Maxwell's vector wave equation for the fiber structures, using known techniques. In brief, Maxwell's equations are recast in wave equation form and solved in a plane wave basis set using a variational scheme. An outline of the method may be found in Chapter 2 of the book "Photonic Crystals—Molding the Flow of Light", J. D. Joannopoulos et al., ©1995 Princeton University Press.

Figure 41B:
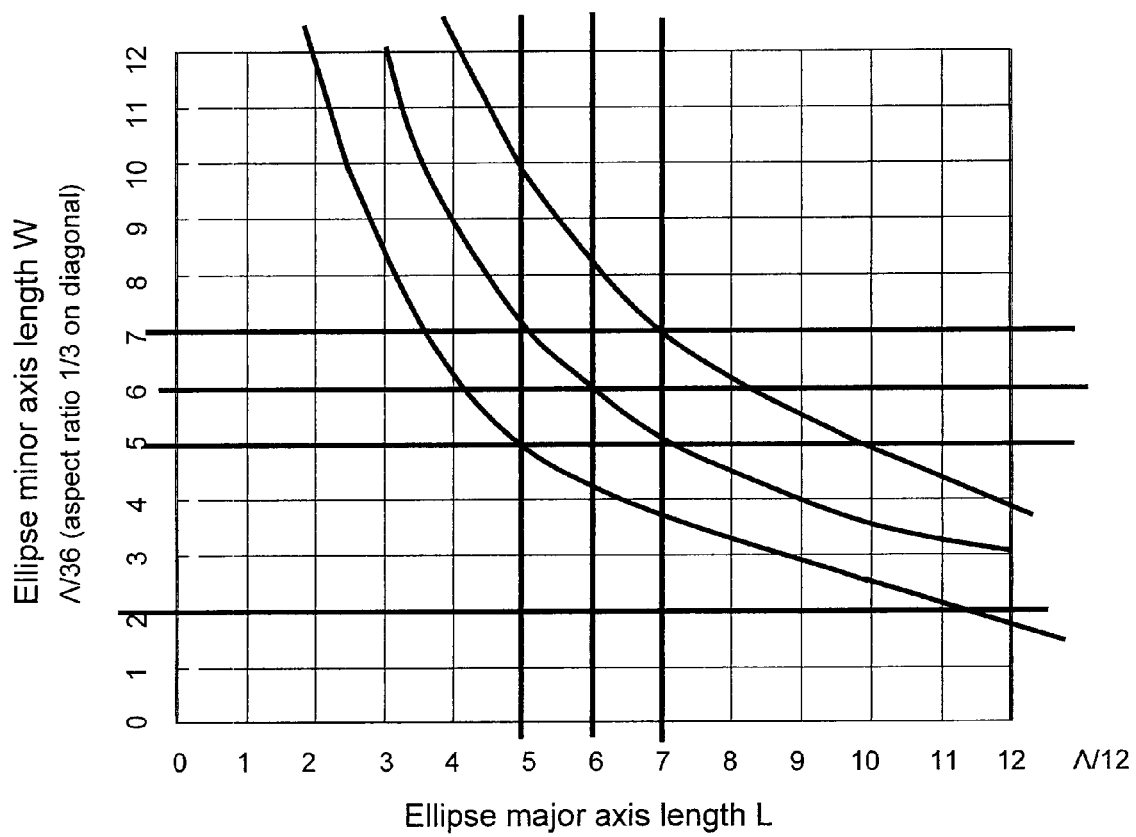

It can be seen that the performance is different in different regions of the plane, that is, for different values of L and W. FIGS. 41(a) and (b) show examples of lines defining various regions of the L-W plane that are believed to be of particular interest for the structure of FIG. 1. Other lines in addition to those shown in FIG. 41 may be of interest. The structure of FIG. 1 has a pitch of 3.2 μm and is designed for guiding light centered on the wavelength 1.55 μm; however the results of FIGS. 39 to 41 are independent of pitch and wavelength (when both are scaled congruently) and apply to a broad range of structures having the general form of FIG. 1.

In another example of an embodiment of the invention (FIG. 42) a waveguide is provided having a larger core region 110. Core region 110 corresponds to 19 unit cells of the cladding structure of the waveguide, whereas core 110 in FIG. 1 corresponds to 7 unit cells. Omission of the ring of 12 unit cells results in a different boundary from the boundary of the waveguide of FIG. 1. The boundary of the FIG. 42 waveguide has 12 longer veins 140 and 6 shorter veins (in FIG. 1, there were 6 longer veins 140 and six shorter veins 130). Nodules 165 are provided on each of the longer veins 140. The nodules are elliptical in form with a major axis of length 0.5Λ and a minor axis of length 0.1667Λ. The cladding air filling fraction is 87.5%. Away from nodules 165, the core wall thickness is 0.055Λ.

The performance of the structure of FIG. 42 is significantly improved over that of FIG. 1. For the 7-cell structure, best results achieved were 99.3% light in the low refractive index regions (i.e. air) and an F-factor of 0.1345 $\Lambda^{-1}$. For the 19-cell structure, 99.7% of the light is in the low refractive index regions and the F-factor is 0.0636 $\Lambda^{-1}$.

Field intensity plots (FIG. 43 (i) and (ii)) show that light in the two orthogonal polarisation modes ((a) and (b)) guided in the fiber is concentrated in a single-lobed pattern (resembling the fundamental mode of a standard optical fiber, although the pattern guided in the present fiber consists of multiple transverse modes). FIG. 43 (iii) shows the distribution of F-factor, that is, which air-silica boundaries are contributing most to the F-factor. A bright pixel shows a section of boundary that is interacting with a high intensity part of the field. The plots demonstrate that there is significant overlap of the light in the guided mode with the core boundary and illustrate the importance of nodule dimensions.

Other PBG waveguides having different PBG boundary shapes are shown in FIGS. 44 to 47. In FIG. 44, nodules 4465 are at the mid-points of the longer veins, as in previously described embodiments, but in this case are semi-elliptical in shape, being flat on the surface of the vein furthest from the core and elliptical on the surface of the vein closest to the core. Conversely, in FIG. 45, nodules 4565 are semi-elliptical in shape, being flat on the surface of the vein closest to the core and elliptical on the surface of the vein furthest from the core.

In the embodiment of FIG. 46, the waveguide has a 'nineteen-cell' core, as in FIG. 42, but in this case the nodules 4665 are nodes joining pairs of longer veins at their ends and also joining them to other parts of the photonic band-gap structure.

In the embodiment of FIG. 47, the waveguide again has a 'nineteen-cell core', but in this case the nodules 4765 are provided form the six shortest veins in the boundary region.

It will thus be understood that the nodules may take any suitable form and location in the boundary. For example, the nodules need not be at the mid-point of a vein and may indeed be at a node joining two veins. Furthermore, the nodules need not be elliptical or circular in cross-section; they may for example be 'lumpy', for example a 'double lump' may be made by fusing two side-by-side rods together during drawing of the fiber.

With reference to FIG. 17, fibers such as that of FIG. 1 may be made from a preform 1700 comprising a stack of hexagonal capillaries 1705. The hexagonal capillaries 1705 each have a circular bore. The cladding nodes 160 and boundary nodes 150 (from FIG. 1) of the PBG fiber structure result from the significant volume of glass that is present in the perform 1700 wherever the corners 1710, 1715 of neighboring capillaries meet. The nodules 165 are formed from the glass of the inwardly-facing corners 1720 of the capillaries that bound an inner region 1725 of the pre-form 1700, which is to become the core defect region 110 of a PBG fiber structure. These corners 1720, and the two sides of each capillary that meet at the corners, recede due to surface tension as the stack of capillaries is heated and drawn. Such recession turns the two sides and the corner 1720 into a boundary vein 140, with a nodule 165. The inner region 1725 may be formed by omitting the inner seven capillaries from the pre-form and, for example, supporting the outer capillaries using truncated capillaries at either end of the stack, as described in PCT/GB00/01249 (described above) or by etching away glass from inner capillaries in accordance with either PCT/GB00/01249 or U.S. Pat. No. 6,444,133 mentioned above.

FIG. 48 illustrates one way of arranging a stack of capillaries 1200 to be drawn into a pre-form and fiber of the kind shown in FIG. 16. The cladding is formed by stacking round cross section capillaries 1205 in a close-packed, triangular lattice arrangement. The cladding capillaries 1205 have an outer diameter of 1.04 mm and a wall thickness of 40 μm. The inner region 1210 of the stack contains a large diameter capillary 1215 having an outer diameter of 4.46 mm and a wall thickness of 40 μm. The large diameter capillary 1215 supports the cladding capillaries while the stack is being formed and eventually becomes part of the material that forms a core defect boundary 145.

Interstitial voids 1220 that form between each close-packed, triangular group of three cladding capillaries are each packed with a glass rod 1225, which has an outer diameter of 0.498 mm. The rods 1225 are inserted into the voids 1220 after the capillaries have been stacked. The rods 1225 that are packed in voids 1220 assist in forming cladding nodes 160, which have a diameter that is significantly greater than the thickness of the veins that meet at the nodes. Omission of a rod from a void in the cladding would lead to the formation of a cladding node that has a significantly smaller diameter.

In a similar manner, rods 1230 are inserted into voids between the large-diameter capillary 1215 and between pairs of capillaries 1205 that are closest to the large diameter capillary 1215. (The triangular cladding structure naturally divides the innermost ring of capillaries 1205 into such pairs.)

Rods 1230 are kept in place by thin-walled capillaries 1239. Smaller gaps 1235 formed within the pairs are not filled. Rods 1230 form, with silica from surrounding capillaries, nodules 4765 (cf. FIG. 47), while the silica around gaps 1235 forms veins.

The stack 1200 is arranged as described with reference to FIG. 48 and is then over-clad with a further, relatively thick walled capillary (not shown), which is large enough to contain the stack and, at the same time, small enough to hold the capillaries and rods in place. The entire over-clad stack is then heated and drawn into a pre-form, during which time all the interstitial voids at the boundary, and remaining voids between the glass rods and the cladding capillaries, collapse due to surface tension. The pre-form is, again, over-clad with a final, thick silica cladding and is heated and drawn into optical fiber in a known way. If surface tension alone is insufficient to collapse the interstitial voids, a vacuum may be applied to the interstitial voids of the pre-form, for example according to the process described in WO 00/49436 (The University of Bath).

FIGS. 19 and 18 illustrate alternative preform stacks used for making fibers according to embodiments of the present invention. The stack in FIG. 19 includes a large diameter core capillary replacing seven cladding capillaries. Six rods are fused onto the large diameter capillary; each one coinciding with a point where a cladding capillary abuts the large diameter capillary. This stack is suitable for making a fiber of the kind shown in FIG. 1 or in FIG. 44. The stack in FIG. 18 is similar to the stack in FIG. 19, apart from the large diameter capillary replacing nineteen cladding capillaries and there being twelve rods attached to the large diameter capillary; each one coinciding with a point where a cladding capillary abuts the large diameter capillary. This stack is suitable for making a fiber of the kind illustrated in FIG. 42.

In a further alternative way to form the fiber, a graphite insert is provided as an alternative to large diameter capillary 1215 (of FIG. 48). The graphite insert is shaped to be a mould for the desired boundary shape. During a first drawing step, the stack of capillaries 1205 collapses onto the graphite insert and is moulded to its shape. As the partly drawn fiber cools, the graphite insert becomes loose and is removed before a second drawing step, in which the final fiber is drawn.

A further alternative way to form the fiber is by using the process described in PCT/GB00/01249 (described above), wherein the inner capillaries are replaced by truncated capillaries, which support the outer capillaries at either end of the stack. The stack may be drawn to an optical fiber in the normal way, and the parts of the fiber incorporating the truncated capillary material may be discarded. In principle, truncated capillaries may also be used to support the stack part way along its length.

FIG. 20a is a photograph, taken by the present inventors through a microscope, of a rod fused to a large diameter capillary before the capillary is introduced into a pre-form stack, for example of the kind illustrated in FIG. 19. Whether the rod becomes a bead along a core boundary (for example as shown in FIG. 1) or a relatively more pronounced nodule protruding only from one side of a core boundary (for example as shown in FIG. 44) can be controlled by the fiber drawing conditions. For example, hotter drawing conditions under lower tension permit a rod and boundary to fuse completely, thereby forming a bead. In contrast, a colder draw under higher tension prevents complete fusing of the rod and core boundary, leaving the rod as a nodule on the surface of the core boundary in a final fiber structure. Clearly, a nodule can be arranged to form on an inner or outer periphery of a core boundary, depending on whether the respective rod is positioned on an inner or outer periphery of a large diameter capillary of the pre-form stack. The properties of a final fiber structure are expected to vary with bead and/or nodule size and placement.

FIG. 20b is a SEM image of a bead, magnified by a factor of about 4000, which forms part of a PBG cladding structure according to an embodiment of the present invention. As shown, the bead has formed along a relatively shorter vein of the cladding structure. The structure is a result of heating and drawing a preform containing the rod shown in FIG. 20a. The drawing conditions included a heating temperature of about 2050° C., a draw speed of about 2 ms$^{-1}$ and a draw tension of about 240 g. Clearly, the rod has fused completely with the capillary under these drawing conditions. It is expected that cooler and/or faster drawing conditions would lead to the formation of a nodule on the inner surface only of the capillary.

FIG. 49a is a photograph taken through a microscope of a rod fused to the outer periphery of a core boundary in a preform stack. In this case, the rod was initially fused inside a cladding capillary and the cladding capillary was rotated so that the rod was aligned with the point where the cladding capillary abutted the large diameter core capillary in the stack. The SEM image in FIG. 49b shows how the rod becomes a bead along the core boundary of a fiber drawn from a preform of the kind shown in FIG. 49a.

FIG. 32 is a diagram of a transmission system 3200 comprising an optical transmitter 3210, an optical receiver 3220 and an optical fiber 3230 between the transmitter and receiver. The optical fiber 3230 comprises along at least a part of its length an optical fiber according to an embodiment of the present invention. Other components or systems, for example to compensate for dispersion and loss, would typically be included in the system but are not shown in FIG. 32 for the sake of convenience only.

The skilled person will appreciate that the various structures described above may be manufactured using the described manufacturing process or a prior art processes. For example, rather than using a stacking and drawing approach to manufacture, a pre-form may be made using a known extrusion process and then that pre-form may be drawn into an optical fiber in the normal way.

In addition, the skilled person will appreciate that while the examples provided above relate exclusively to PBG fiber cladding structures comprising triangular arrays, the present invention is in no way limited to such cladding structures. For example, the invention could relate equally to square lattice structures, or structures that are not close-packed. In general, the inventors propose that given a cladding structure that provides a PBG and a core defect in the cladding structure that supports guided modes, the form of the boundary at the interface between the core defect and the cladding structure will have a significant impact on the characteristics of the waveguide, as described herein.

It will be appreciated that, in practical fibers, it is difficult to control the fabrication process to achieve exact dimensions, for example, of core boundary nodules. However, the antiresonance minima in F-number (maxima in light in air fraction) are quite broad, compared with resonances, which are characterised by sharp peaks at certain thicknesses of core boundary. Thus, a core boundary nodule having dimensions in the region of an antiresonance minimum, even if not exactly at the minimum, will still provide an advantage over other waveguides. It is expected that, as fabrication processes improve, it will be possible to make a core boundary having nodules having a shape very close to desired shape. There may be reasons for making a core boundary nodule which is not optimum according to a strict antiresonance analysis. One exemplary reason may be mode crossings, which can have deleterious effects of the transmission characteristics of a fiber, as discussed above.

The distinctive features of the boundary region between the core and cladding regions have been typically described as deformations in the form of enlarged regions, such as beads or nodules on a boundary region having the form of an annular ring. The form of the boundary region may of course—depending on the frame of reference—just as well be described in other ways, such as by indentions or by indentations AND enlarged regions.

The skilled person will appreciate that the structures described herein fit on a continuum comprising a huge number of different structures, for example having different combinations of core defect size, boundary node size, boundary vein thickness and, in general, boundary and cladding form. Clearly, it would be impractical to illustrate each and every variant of PBG waveguide structure herein. In particular, where numerical values or ranges of values are given herein for a particular parameter, all combinations with values or ranges of values of other parameters given herein are disclosed unless such combinations are not physically possible. As such, the skilled person will accept that the present invention is limited in scope only by the present claims and equivalents thereof.

The invention claimed is:

1. An elongate waveguide for guiding light comprising:
a core comprising an elongate region of relatively low refractive index;
a microstructured region around the core comprising elongate regions of relatively low refractive index interspersed with elongate regions of relatively high refractive index; and
a boundary at the interface between the core and the microstructured region, the boundary comprising, in the transverse cross-section, a boundary region of relatively high refractive index, which is connected to the microstructured region at a plurality of nodes, and at least one relatively enlarged region around the boundary, said enlarged region having a major dimension and a minor dimension, wherein the length of the major dimension divided by the length of the minor dimension is more than 3.0;
wherein said microstructured region comprises a photonic band-gap structure and wherein said relatively low refractive index regions make up more than 90% by volume of the photonic bandgap structure.

2. The waveguide according to claim 1, wherein the boundary region has a shape such that, in use, light guided by the waveguide is guided in a transverse mode in which, in the transverse cross-section, more than 95% of the guided light is in the regions of relatively low refractive index in the waveguide.

3. The waveguide as claimed in claim 2, in which the boundary region has a shape such that, in use, light guided by the waveguide is guided in a transverse mode in which, in the transverse cross-section, more than 50% of the guided light is in the region of relatively low refractive index in the core.

4. The waveguide as claimed in claim 2, in which the boundary region has a shape such that, in use, light guided by the waveguide is guided in a transverse mode providing an F-factor of less than 0.23 $\mu m^{-1}$ (0.7 $\text{Å}^{-1}$).

5. The waveguide as claimed in claim 1, in which the core has, in the transverse cross-section, an area that is significantly greater than the area of at least some of the relatively low refractive index regions of the photonic bandgap structure, such as, an area that is greater than twice the area of at least some of the relatively low refractive index regions of the photonic band gap structure.

6. The waveguide as claimed in claim 1, in which the boundary region comprises, in the transverse cross-section, a plurality of relatively high refractive index boundary veins joined end-to-end around the boundary between boundary nodes, each boundary vein being joined between a leading boundary node and a following boundary node, and each boundary node being joined between two boundary veins and to a relatively high refractive index region of the microstructured region, and in which at least one of the boundary veins comprises, along its length or at its end, an enlarged region that takes the form of a nodule.

7. The waveguide as claimed in claim 6, in which the nodule has a substantially elliptical shape in the transverse cross-section, such that an ellipse having a major axis of length L and a minor axis of length W substantially fits to the shape of the nodule in the transverse cross-section.

8. The waveguide as claimed in claim 7, in which the major axis extends along the boundary vein in which the nodule is comprised.

9. The waveguide as claimed in claim 7, in which the lengths W, L of the minor and major axes, respectively, have a mutual relation to each other selected from the group of relations consisting of $W \leq 0.467L$, $$W \approx \frac{L}{3}$$

$W \geq 0.238L$.

10. The waveguide as claimed in claim 7, arranged to guide light at a wavelength $\lambda_1$, which is in the ultraviolet, visible or infrared parts of the electromagnetic spectrum.

11. The waveguide as claimed in claim 10, there being a parameter X that is equal to the wavelength $\lambda_1$ in which the mutual relationships between parameters W, L, X are selected from the group of relationships consisting of $$L \geq \frac{5X}{12}, L \approx \frac{X}{2}, L \leq \frac{7X}{12}, W > \frac{X}{18}, W > \frac{5X}{36}, W \approx \frac{X}{6},$$

$$W \leq \frac{7X}{36}, \quad L \times W \geq 0.058 X^2, L \times W \approx \frac{X^2}{12}, L \times W \leq 0.113 X^2,$$

$$W \leq \left(\frac{1}{18} + \frac{L}{3}\right)X, W \geq \left(-\frac{1}{18} + \frac{L}{3}\right)X, W \geq \left(\frac{5}{18} - \frac{L}{3}\right)X,$$

$$W \leq \left(\frac{7}{18} - \frac{L}{3}\right)X, W \geq (-0.133 + 0.467L)X, W \leq (0.095 + 0.238L)X,$$

$$W \geq (0.333 - 0.467L)X, W \leq (0.333 - 0.238L)X,$$

$$W \leq (0.467 - 0.467L)X, W \leq (0.238 - 0.238L)X.$$

12. The waveguide as claimed in claim 7, arranged to guide light at a wavelength $\lambda_2$, wherein light guided at the wavelength $\lambda_2$ exhibits lower loss than light guided in the waveguide at any other wavelength.

13. The waveguide as claimed in claim 12, there being a parameter X that is equal to the wavelength $\lambda_2$ in which the mutual relationships between parameters W, L, X are selected from the group of relationships consisting of $$L \geq \frac{5X}{12}, L \approx \frac{X}{2}, L \leq \frac{7X}{12}, W > \frac{X}{18}, W > \frac{5X}{36}, W \approx \frac{X}{6},$$

$$W \leq \frac{7X}{36}, \quad L \times W \geq 0.058X^2, L \times W \approx \frac{X^2}{12}, L \times W \leq 0.113X^2,$$

$$W \leq \left(\frac{1}{18} + \frac{L}{3}\right)X, W \geq \left(-\frac{1}{18} + \frac{L}{3}\right)X, W \geq \left(\frac{5}{18} - \frac{L}{3}\right)X,$$

$$W \leq \left(\frac{7}{18} - \frac{L}{3}\right)X, W \geq (-0.133 + 0.467L)X, W \leq (0.095 + 0.238L)X,$$

$$W \geq (0.333 - 0.467L)X, W \leq (0.333 - 0.238L)X,$$

$$W \leq (0.467 - 0.467L)X, W \leq (0.238 - 0.238L)X.$$

14. The waveguide as claimed in claim 7, wherein the microstructured region may comprise a substantially periodic array of elements characterized by a unit cell and a pitch $\Lambda$, there being a parameter X that is equal to the pitch $\Lambda$ in which the mutual relationships between parameters W, L, X are selected from the group of relationships consisting of $$L \geq \frac{5X}{12}, L \approx \frac{X}{2}, L \leq \frac{7X}{12}, W > \frac{X}{18}, W > \frac{5X}{36}, W \approx \frac{X}{6},$$

$$W \leq \frac{7X}{36}, \quad L \times W \geq 0.058X^2, L \times W \approx \frac{X^2}{12}, L \times W \leq 0.113X^2,$$

$$W \leq \left(\frac{1}{18} + \frac{L}{3}\right)X, W \geq \left(-\frac{1}{18} + \frac{L}{3}\right)X, W \geq \left(\frac{5}{18} - \frac{L}{3}\right)X,$$

$$W \leq \left(\frac{7}{18} - \frac{L}{3}\right)X, W \geq (-0.133 + 0.467L)X, W \leq (0.095 + 0.238L)X,$$

$$W \geq (0.333 - 0.467L)X, W \leq (0.333 - 0.238L)X,$$

$$W \leq (0.467 - 0.467L)X, W \leq (0.238 - 0.238L)X.$$

15. The waveguide according to claim 6, wherein a plurality of enlarged regions are positioned along veins and spaced apart from any nodes.

16. The waveguide according to claim 6, wherein an enlarged region comprises a relatively thick vein, compared to the thickness of at least one other vein, extending between a pair of neighboring nodes.

17. The waveguide according to claim 6, wherein an enlarged region is coincident with a node such that the node has an uncharacteristic form relative to the photonic band-gap cladding.

18. The waveguide according to claim 6, wherein said nodule has a major dimension and the length of the major dimension is at least 0.42 times the distance between the two adjacent nodes on either side of the enlarged region and the length of the major dimension is less than 0.98 times the distance between the two adjacent nodes.

19. The waveguide according to claim 1, wherein there are more than six enlarged regions around the boundary, such as twelve or more enlarged regions around the boundary, such as eighteen enlarged regions around the boundary.

20. The waveguide according to claim 1, wherein the boundary has no more than two fold rotational symmetry about any longitudinal axis thereof at least in part by virtue of the presence or placement of the or each relatively enlarged region.

21. The waveguide according to claim 20, wherein the boundary has only two fold rotational symmetry.

22. A preform for the elongate waveguide of claim 1, the preform comprising
 a stack of parallel, first elongate elements supported, in the plane cross section, around an inner region, which is to become a relatively low refractive index core region when the preform is drawn into a fiber,
 the preform further comprising
 second elongate elements, also supported or situated around the inner region, said second elements being arranged to generate a core boundary, at the interface between the photonic band-gap cladding and the core, when the preform is drawn into fiber,
 the arrangement of second elements being such that the core boundary comprises at least one relatively enlarged region when the preform is drawn into fiber.

23. An elongate waveguide for guiding light comprising:
 a core comprising an elongate region of relatively low refractive index;
 a microstructured region around the core comprising elongate regions of relatively low refractive index interspersed with elongate regions of relatively high refractive index; and
 a boundary at the interface between the core and the microstructured region, the boundary comprising, in the transverse cross-section, a boundary region of relatively high refractive index, which is connected to the microstructured region at a plurality of nodes, and at least one relatively enlarged region around the boundary, said enlarged region having a major dimension and a minor dimension, wherein the length of the major dimension divided by the length of the minor dimension is more than 3.0;
 wherein said microstructured region comprises a photonic band-gap structure and wherein said boundary region has a shape such that:
  a. in use, light guided by the waveguide is guided in a transverse mode in which, in the transverse cross-section, more than 95% of the guided light is in the regions of relatively low refractive index in the waveguide; and
  b. in use, light guided by the waveguide is guided in a transverse mode providing an F-factor of less than $0.23 \, \mu m^{-1}$ ($0.7 \, \Lambda^{-1}$).

24. The waveguide according to claim 23, wherein said relatively low refractive index regions make up more than 90% by volume of the photonic bandgap structure.

* * * * *